United States Patent [19]

Morishige et al.

[11] Patent Number: 5,092,198

[45] Date of Patent: Mar. 3, 1992

[54] CONTROL APPARATUS FOR STEPLESS TRANSMISSION

[75] Inventors: Chitoshi Morishige; Tomoo Sawasaki, both of Hiroshima, Japan

[73] Assignee: Mazda Motor Corporation, Hiroshima, Japan

[21] Appl. No.: 631,291

[22] Filed: Dec. 19, 1990

[30] Foreign Application Priority Data

Dec. 19, 1989 [JP] Japan .................................. 1-329872
Jul. 5, 1990 [JP] Japan .................................. 2-176249

[51] Int. Cl.$^5$ ..................... B60K 41/12; B60K 41/18
[52] U.S. Cl. ........................................ 74/866; 74/867; 74/868; 364/424.1
[58] Field of Search .................. 74/866, 867, 868; 364/424.1

[56] References Cited

U.S. PATENT DOCUMENTS

| | | | |
|---|---|---|---|
| 4,736,655 | 4/1988 | Kumura et al. | 74/866 |
| 4,785,689 | 11/1988 | Tanaka et al. | 74/868 X |
| 4,811,224 | 3/1989 | Kuerschner et al. | 74/866 X |
| 4,846,021 | 7/1989 | Hamano et al. | 74/866 |
| 4,930,374 | 6/1990 | Simonyi et al. | 74/866 |
| 4,956,972 | 9/1990 | Sasajima et al. | 74/866 X |
| 4,995,283 | 2/1991 | Sawasaki et al. | 74/866 |
| 5,007,147 | 4/1991 | Imai et al. | 74/866 |

FOREIGN PATENT DOCUMENTS 62-4958 1/1987 Japan .
63-53356 3/1988 Japan .

OTHER PUBLICATIONS

U.S. patent application No. 07/466,231 to Morishige, filed Jan. 19, 1990.

*Primary Examiner*—Leslie A. Braun
*Assistant Examiner*—Daniel Wittels

[57] ABSTRACT

A control apparatus for a transmission apparatus which controls the change ratio by varying, by hydraulic pressure, the effective radius of a drive pulley (primary pulley) and that of a follower pulley (secondary pulley) with a belt arranged therebetween. The apparatus a change ratio control valve for controlling the change ratio and a change ratio fixing valve for forcibly fixing the change ratio if the engine is about to rotate excessively so that the excessive rotation of the engine is prevented.

12 Claims, 23 Drawing Sheets

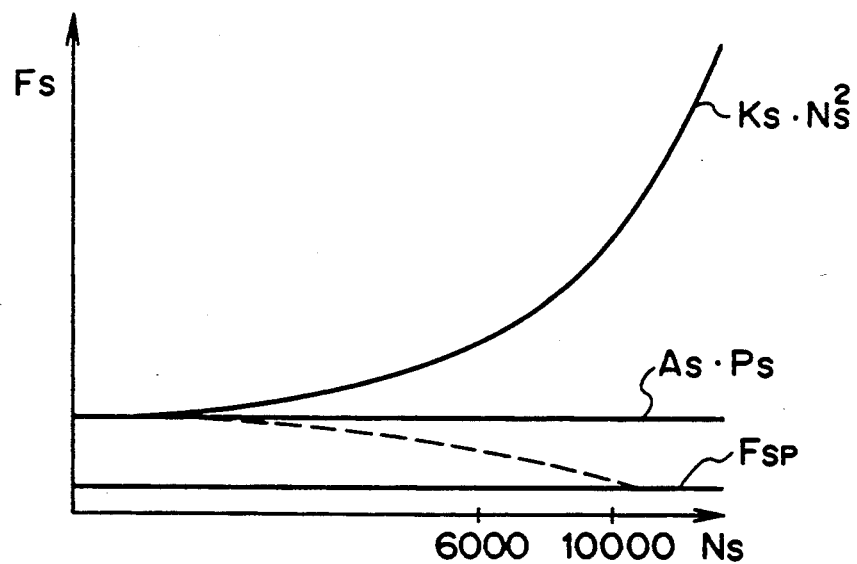
F I G. 8C
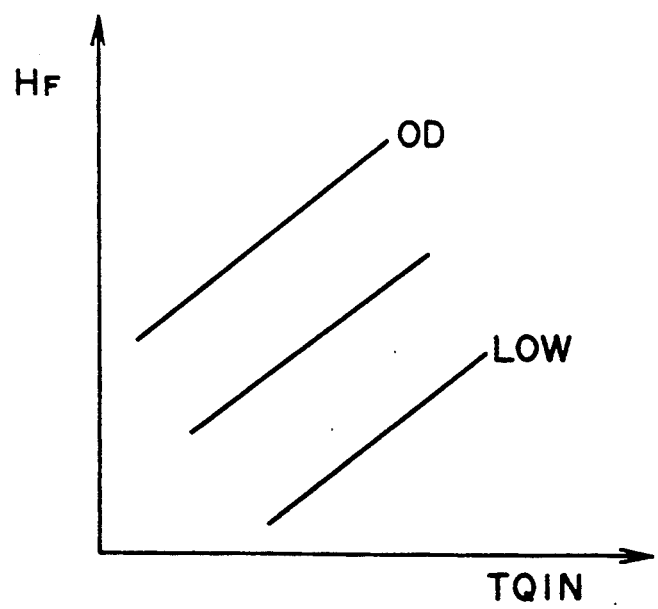
F I G. 8D

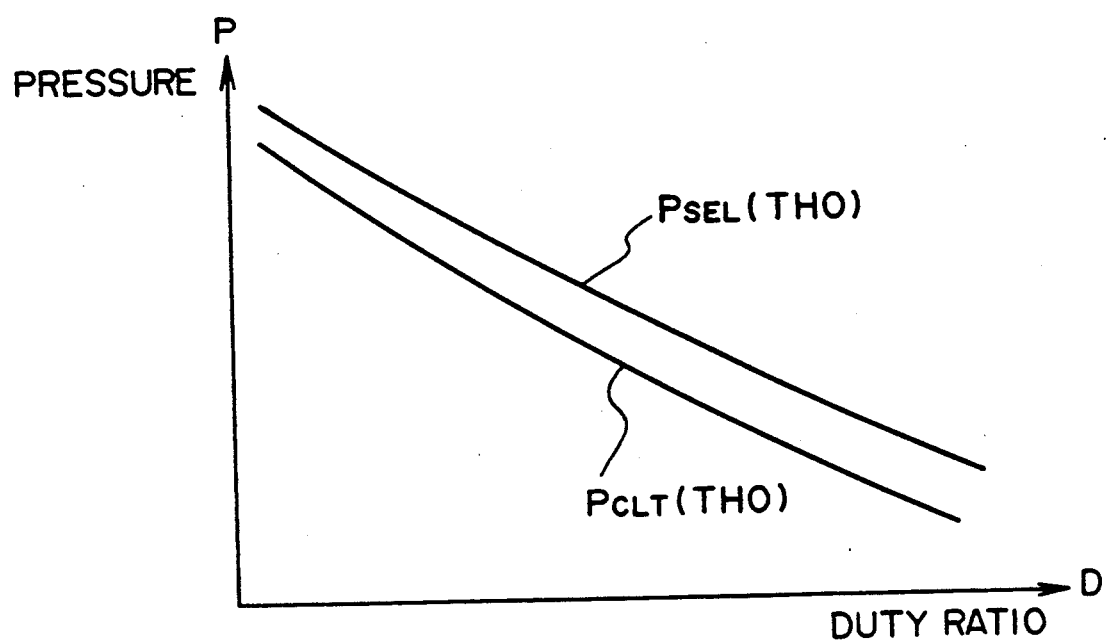
F I G. 11

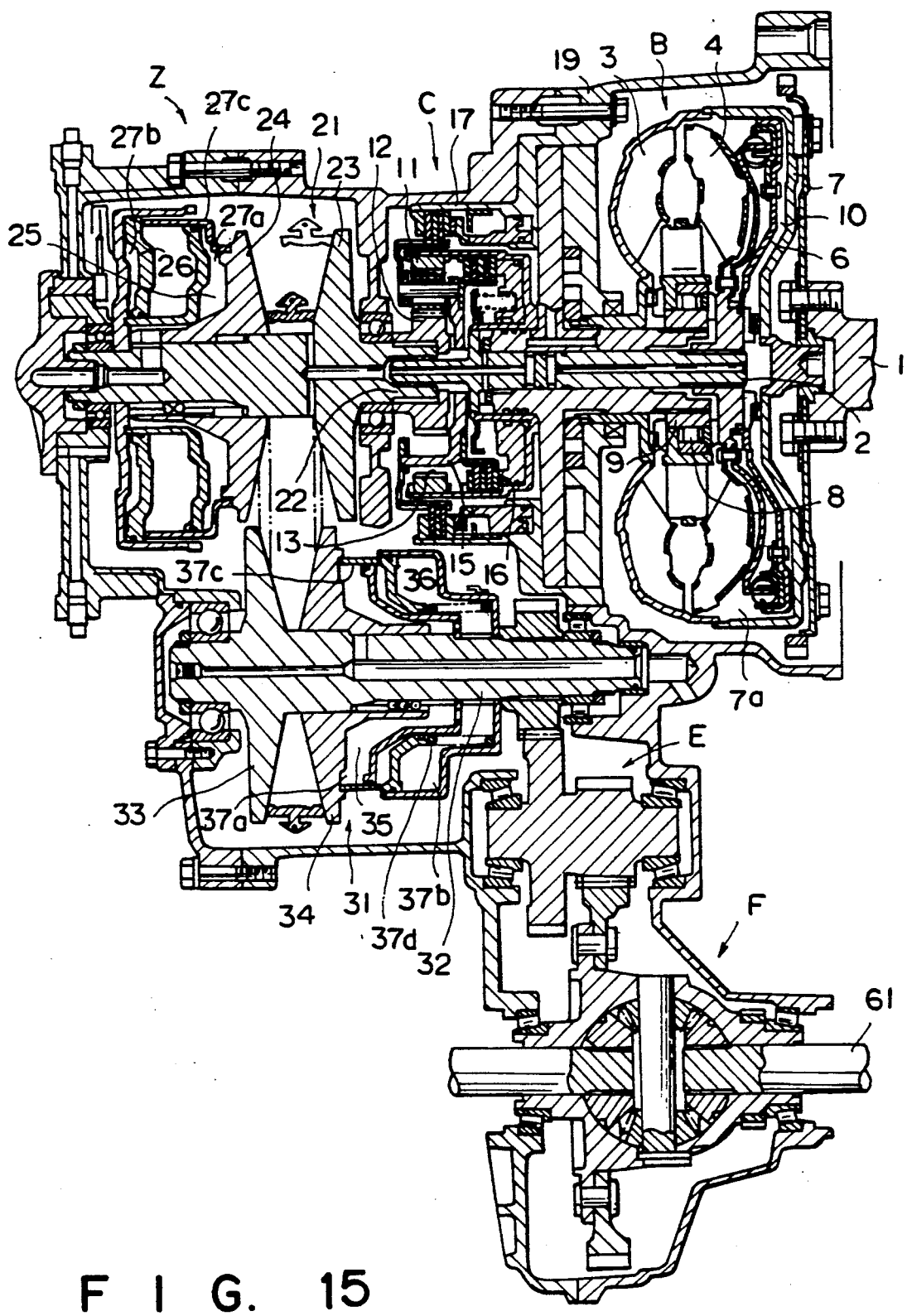
F I G. 15

CONTROL APPARATUS FOR STEPLESS TRANSMISSION

BACKGROUND OF THE INVENTION

The present invention relates to a control apparatus for controlling a stepless transmission having a drive pulley and a follower pulley the diameter of each of which is changed when hydraulic pressure is applied or discharged, and, more particularly, to a technology for preventing generation of an excessive engine rotation due to a failure or accident of the transmission.

Hitherto, as a control apparatus for a stepless transmission of the type described above, a structure has been disclosed in Japanese Patent Laid-Open No. 62-4958 and another structure has been disclosed in Japanese Patent Laid-Open No. 63-53356. According to the above-described disclosures, the structure is arranged to comprise a drive pulley (or primary pulley) and a follower pulley (or secondary pulley) the effective radius of each which can be varied, a belt arranged between the two pulleys and a change ratio control valve for applying/discharging hydraulic pressure from the hydraulic cylinder of the drive pulley. As a result, the effective radius of the drive pulley is adjusted by the change ratio control valve and the effective radius of the follower pulley is thereby changed so that the change ratio between the two pulleys is continuously varied.

The change ratio control valve is disposed in the operation oil passage which communicates with the hydraulic cylinder of the drive pulley. Furthermore, a drain passage is connected to the change ratio control valve. Hydraulic pressure is supplied from the operation oil passage to the hydraulic cylinder of the drive pulley. When the hydraulic cylinder of the drive pulley is allowed to communicate with the drain passage, the applied hydraulic pressure is discharged. As a result of the application/discharge of hydraulic pressure, the effective radius of the drive pulley is changed so that the change ratio is controlled.

In a conventional geared transmission, if a certain gear ratio is selected, the selected gear ratio, that is, the change ratio is stably maintained. In the stepless transmission of the type described above, in which the change ratio is controlled by hydraulic pressure, hydraulic pressure must continuously be controlled in order to obtain the desired change ratio. Namely, (1) In order to accurately set the actual change ratio with respect to the target change ratio, hydraulic pressure must be accurately controlled. (2) If the hydraulic control system fails, a means to overcome the failure must be provided. If both of the two conditions (1) and (2) are not met, the engine rotates excessively. The reason why the engine rotates excessively will be described.

In the structure disclosed in Japanese Patent Laid-Open No. 62-4958, when a driver operates an acceleration pedal at a considerably large degree and the engine speed is thereby rapidly raised, in particular, when the change ratio is subjected to a kick-down, the change ratio moves to a considerably larger value. In this case, the change ratio control valve acts to reduce the effective radius of the drive pulley by removing hydraulic pressure by connecting the hydraulic cylinder of the drive pulley to the drain passage. However, even after the change ratio has reached the target change ratio, the change ratio control valve continues to connect the hydraulic cylinder of the drive pulley to the drain passage due to the action of the change ratio control valve performed in a manner such that a certain response delay of the electric control system and the hydraulic system occurs. As a result, the effective radius of the drive pulley is excessively reduced, causing the engine to rotate excessively. The above-described problem will also take place in a case where the change ratio control valve becomes fixed to the side which communicates with the drain passage because of a failure of the magnetic solenoid or sticking.

The structure disclosed in Japanese Patent Laid-Open No. 63-53356 comprises a change ratio control valve for varying the change ratio, a change ratio fixing valve for fixing the change ratio by sealing the hydraulic pressure in the pulley hydraulic chamber, and a control solenoid for switching the previously-described two valves. The stepless transmission disclosed in Japanese Patent Laid-Open No. 63-53356 enables the transmission feeling to be improved by making the change ratio constant by sealing the hydraulic pressure in the hydraulic chamber of the pulley by switching the change ratio fixing valve to the position at which communication is cancelled.

A case in which the above-described change ratio control valve has become sticky will now be considered. In this case, draining of hydraulic pressure in the hydraulic chamber of the primary pulley continues. Therefore, the primary pulley rotates at an excessively high speed. The stepless transmission is arranged in a manner such that the operating fluid pressure level for the primary pulley and the secondary pulley is set so as to obtain the target change ratio, that is, the target ratio between the revolution of the primary pulley and that of the secondary pulley. Therefore, if the revolution of the primary pulley exceeds the target revolution, feedback control is performed so as to prevent the excessive rotation. However, in the case above-described in which the change ratio control valve sticks, the change ratio control valve is not operated if the feedback control is operated. Therefore, abnormal gear change cannot be prevented. That is, in the case where the valve sticks, fail safe control must performed by a system independent of the change ratio control system.

Furthermore, the structure disclosed in Japanese Patent Laid-Open No. 63-53356 comprises the change ratio control valve and the change ratio fixing valve whereby, when the fixing valve is operated, the change ratio can be maintained at a constant ratio regardless of the status of the change ratio control valve. Therefore, it might be considered that the structure is able to have a fail safe control function. However, since the structure disclosed in Japanese Patent Laid-Open No. 63-53356 was developed so as to improve the driving feeling, it has no means to detect a failure and control the change ratio fixing valve when a failure has been detected.

SUMMARY OF THE INVENTION

An object of the present invention is to provide a control apparatus for a stepless transmission capable of assuredly preventing excessive rotation of the engine.

In order to achieve the above-described object, an aspect of the present invention lies in a control apparatus for controlling a stepless transmission in which a V-belt is arranged between a primary pulley and a secondary pulley the effective radius of each of which is changed in accordance with the variation of the supplied hydraulic pressure, where torque is supplied to the primary pulley and speed is converted and transmitted from the secondary pulley, the control apparatus comprising: a change ratio control valve for controlling hydraulic pressure to be supplied to either of operation chambers for the two pulleys in accordance with the change ratio; predicting means for predicting the possibility of the generation of the abnormal gear change from the present gear change status; and change ratio fixing means for setting the change ratio realized by the change ratio control valve to a fixed value when the generation of the abnormal gear change is predicted by the predicting means.

Another object of the present invention is to provide a control apparatus for a transmission of a type arranged in a manner such that the change ratio control valve controls the hydraulic pressure acting on the cylinder of the primary pulley so that the excessive rotation of the engine is prevented.

Another object of the present invention is to provide a control apparatus capable of accurately fixing the change ratio when excessive rotation of an engine occurs by a structure in which the change ratio fixing means comprises: a change ratio fixing valve disposed between the change ratio control valve and the operation chamber of the primary pulley and acts to fix the change ratio realized by the change ratio control valve by closing the operation chamber; and control means for controlling the operation of the change ratio fixing valve in a manner such that, when a prediction is made that the change ratio fixing valve does not encounter the abnormal gear change, the control means allows the change ratio control valve and the operation chamber to communicate with each other and when a prediction is made that the abnormal gear change takes place, the control means allows the change ratio control valve and the operation chamber to be disconnected from each other.

According to the thus structured control apparatus, if the change ratio cannot be properly controlled due to an abnormality of the control system or the hydraulic circuit, abnormal gear change status is predicted. Furthermore, the change ratio is forcibly fixed upon the prediction so that excessive rotation of the engine can be prevented.

Another object of the present invention is to provide a control apparatus capable of assuredly preventing excessive rotation of the engine even if the change ratio is controlled to be raised toward the maximum ratio by a structure including the change ratio fixing means which comprises: a change ratio fixing valve disposed in a drain passage for the change ratio control valve so as to open/close the drain passage; and control means for controlling the operation of the change ratio fixing valve in a manner such that, when a prediction is made that the change ratio fixing valve does not encounter the abnormal gear change, the control means opens the drain passage and, when a prediction is made that the abnormal gear change takes place, the control means closes the drain passage.

According to the control apparatus of the present invention, when the engine revolution is rapidly raised when a driver operates the acceleration pedal by a considerably large stroke, the change ratio control valve causes the hydraulic cylinder of the drive pulley to communicate with the drain passage so as to considerably reduce the change ratio. Therefore, the oil in the hydraulic cylinder for the drive pulley is discharged so that the effective radius of the drive pulley is reduced by a degree which corresponds to the rise in the engine revolution. If the engine revolution has been raised to a predetermined level and causes a possibility of excessive rotation of the engine, the change ratio control valve continuously causes the hydraulic cylinder of the pulley to communicate with the drain passage due to the response delay in the control system or the hydraulic system. However, the engine excessive rotation prevention valve is operated in this state so as to close the drain passage. As a result, the discharge of hydraulic pressure in the hydraulic cylinder of the drive pulley is forcibly stopped. Therefore, the effective radius of the drive pulley is maintained at a certain radius at that time. Therefore, the change ratio is fixed to the ratio at that time, causing the rise in the engine revolution over the above-described predetermined revolution to be prevented. As a result, excessive rotation of the engine can be assuredly prevented.

According to an aspect of the present invention, the control means for performing control in a manner such that the change ratio control valve and the operation chamber are disconnected from each other is a solenoid valve.

According to a preferred aspect of the present invention, the change ratio fixing valve comprises: a spring; a spool urged by the spring; and a pilot chamber sectioned by the spool, whereby hydraulic pressure supplied from the solenoid valve is introduced into the pilot chamber so as to urge the spool against the force due to the spring.

According to a preferred aspect of the present invention, the control means for controlling the change ratio fixing valve so as to close the drain passage comprises: means for generating pitot hydraulic pressure which corresponds to the engine revolution; and the change ratio fixing valve including: a spring; a spool; and a pilot chamber sectioned by the spool, wherein the pitot hydraulic pressure is introduced into the pilot chamber in a manner such that the pitot hydraulic pressure pushes the spool against the spring.

According to a preferred aspect of the present invention, the prediction means predicts the possibility of generation of an abnormal gear change in accordance with revolution $N_P$ of a primary side pulley of the pair of pulleys.

According to a preferred aspect of the present invention, the prediction means predicts the possibility of the generation of the abnormal gear change in accordance with a deviation of revolution $N_P$ of a primary side pulley of the pair of pulleys from a target revolution.

According to a preferred aspect of the present invention, the prediction means predicts the possibility of the generation of an abnormal gear change in accordance with the time change of deviation of revolution $N_P$ of a primary side pulley of the pair of pulleys from a target revolution.

According to a preferred aspect of the present invention, the change ratio control valve controls hydraulic pressure of a line which communicates with a hydraulic pressure operation chamber for the primary side pulley via the change ratio fixing valve; and the change ratio fixing valve is controlled by an ON/OFF type solenoid, wherein, when the change ratio is fixed, the solenoid is turned off so as to close a line which communicates with the hydraulic pressure operation chamber. Therefore, the failure of the change ratio fixing valve for the fail-safe function can be subjected to the fail-safe operation. As a result, abnormality can further assuredly be prevented.

Other objects and advantages besides those discussed above shall be apparent to those skilled in the art from the description of a preferred embodiment of the invention which follows. In the description, reference is made to accompanying drawings, which form a part thereof, and which illustrates an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 7C is a schematic diagram illustrating a control for performing a centrifugal force correction or the like;

FIGS. 8A through 8D are a schematic diagram and graphs illustrating a status in which a problem arises when the centrifugal force correction is performed;

FIG. 11 is a graph illustrating the operation for converting target pressure into a duty ratio;

DESCRIPTION OF THE PREFERRED EMBODIMENTS

First and second embodiments of a control apparatus for a stepless transmission according to the present invention will now be described in detail. According to the two embodiments, means (a valve to fix the change ratio) to forcibly fix the change ratio is provided in order to prevent excessive rotation of the engine. The position at which the valve is disposed is different in each of the embodiments.

The first embodiment is arranged in a manner such that the state in which the change ratio control valve sticks is assumed to take place as an example of the abnormal gear change. Furthermore, a failure of the type described above is detected as an abnormality in the revolution $N_P$ of the primary pulley. If an abnormal gear change has been detected, the change ratio fixing valve is operated so as to forcibly fix the change ratio regardless of the setting of the change ratio control valve. The above-described change ratio fixing valve is disposed between the hydraulic operation chamber for the primary pulley and the change ratio control valve.

According to the second embodiment, the change ratio fixing valve is disposed on the drain passage for the change ratio control valve. When excessive rotation of the engine due to the failure of the hydraulic circuit or a possibility of the excessive rotation of the engine due to the response delay of the control system or the hydraulic system is detected, the fixing valve described above closes the drain passage. As a result, the position of the spool of the change ratio control valve is fixed. As a result, the change ratio is fixed so that excessive rotation of the engine is prevented.

FIRST EMBODIMENT

According to this embodiment, the structure and the operation of the change ratio control valve and the change ratio fixing valve will be made apparent by a description made with reference to FIG. 2. The above-described failure control will be made with reference to FIGS. 4B, 12 and 14.

STRUCTURE OF A TRANSMISSION APPARATUS ACCORDING TO FIRST EMBODIMENT

Figure 1:
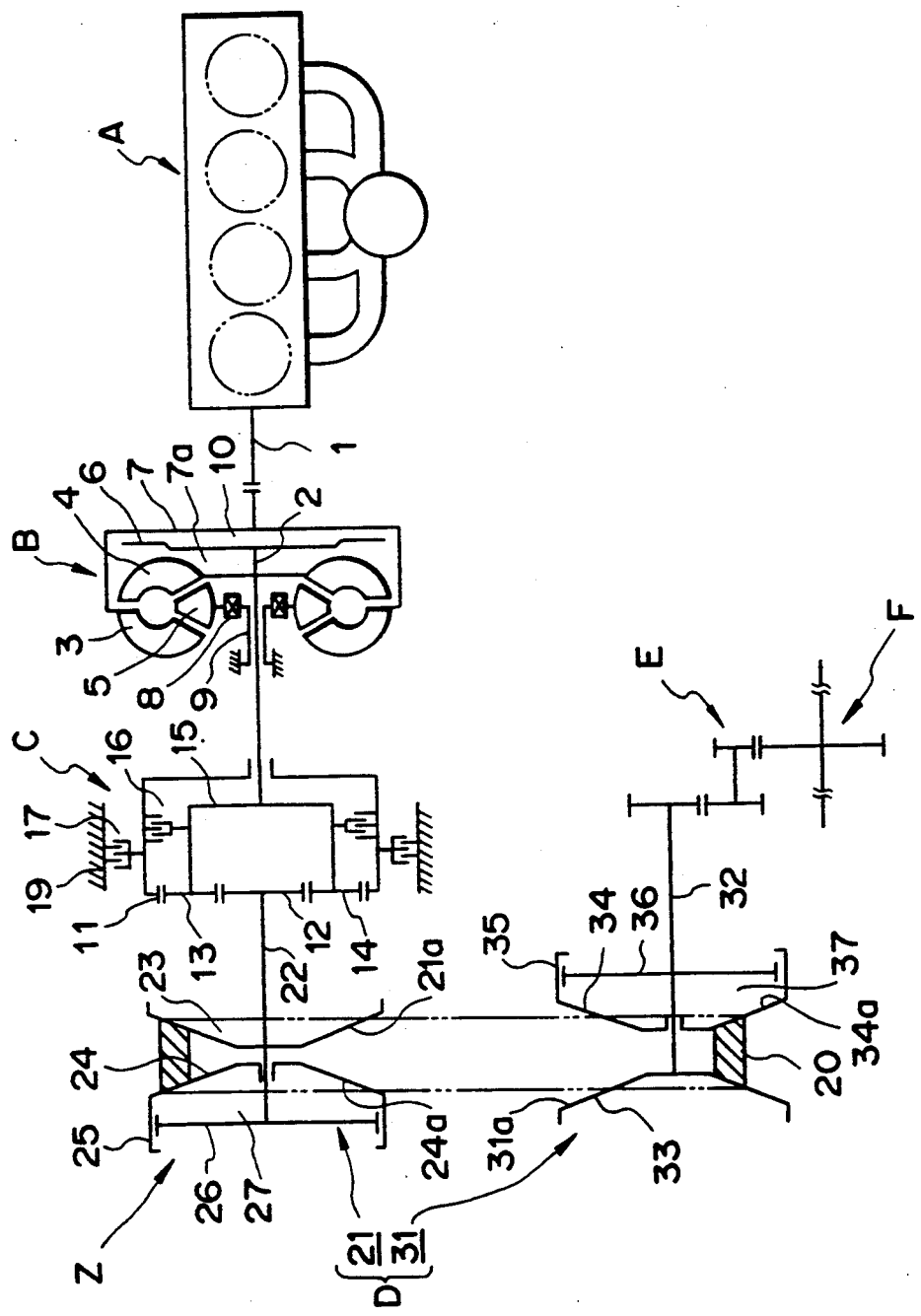
FIG. 1 is a schematic drawing which illustrates the structure of a stepless transmission to which an embodiment of the hydraulic differential type transmission according to the present invention is applied.
Figure 2A:
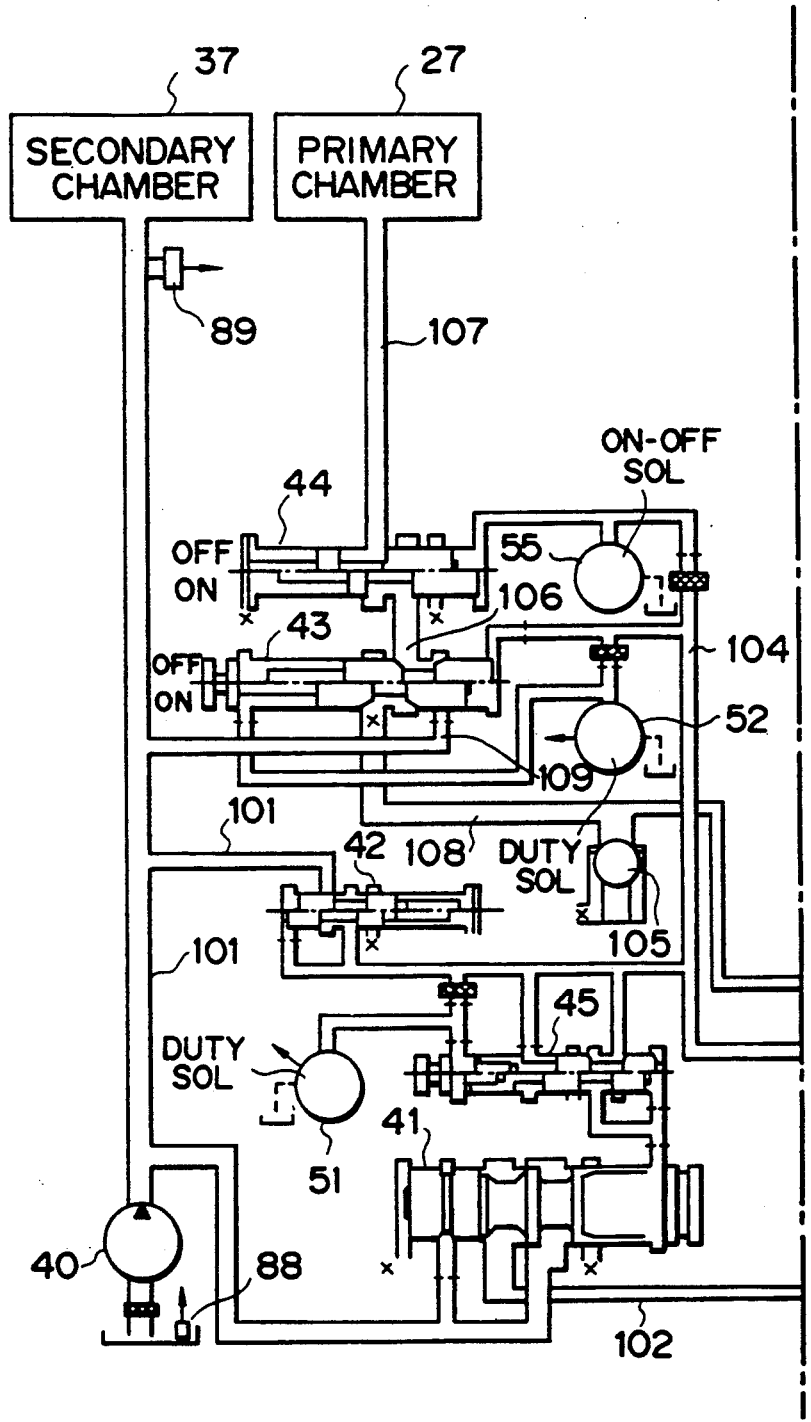
FIGS. 2A and 2B are circuit diagrams which illustrate the structure of a hydraulic circuit connected to the stepless transmission.
Figure 2B:
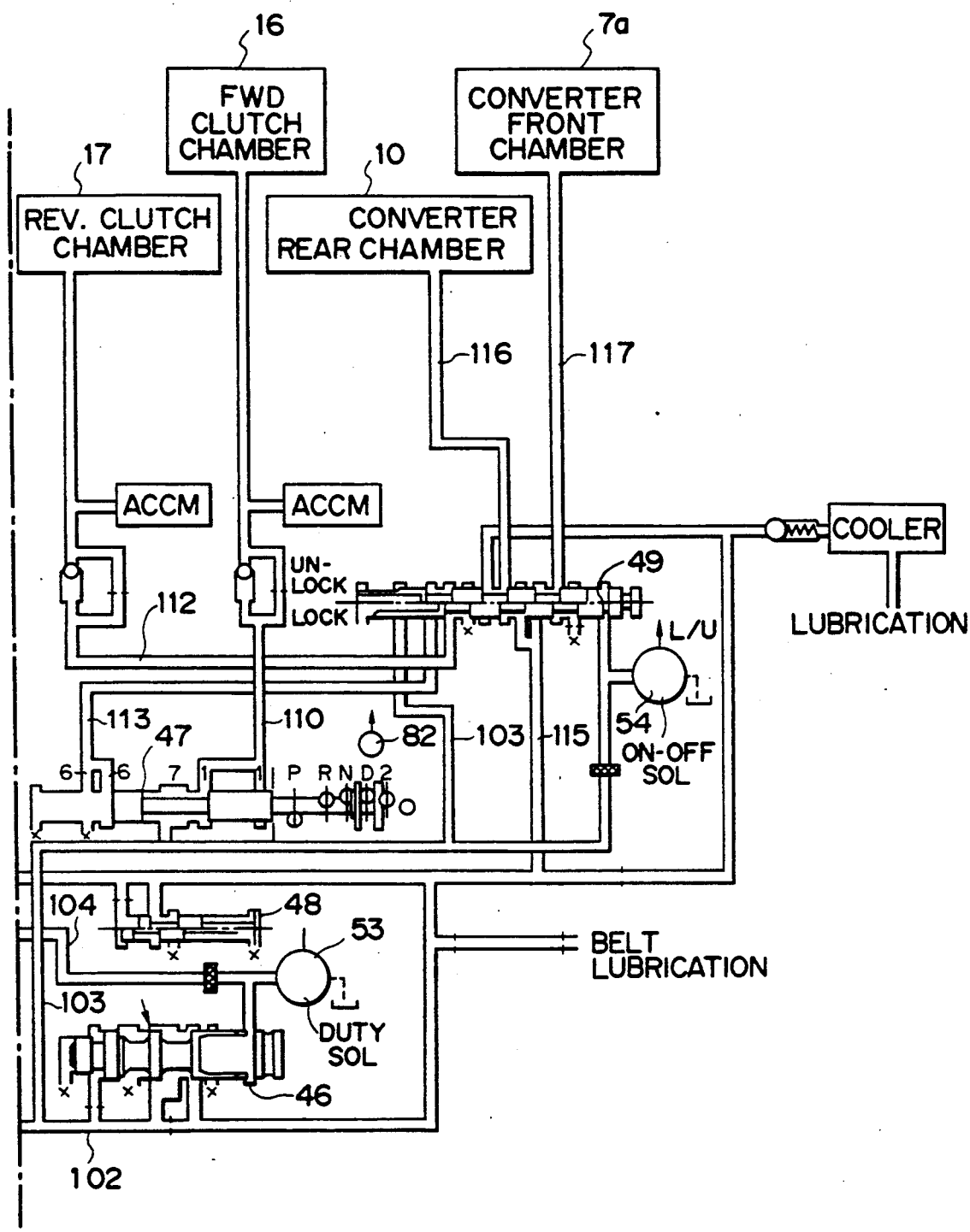
Figure 15:
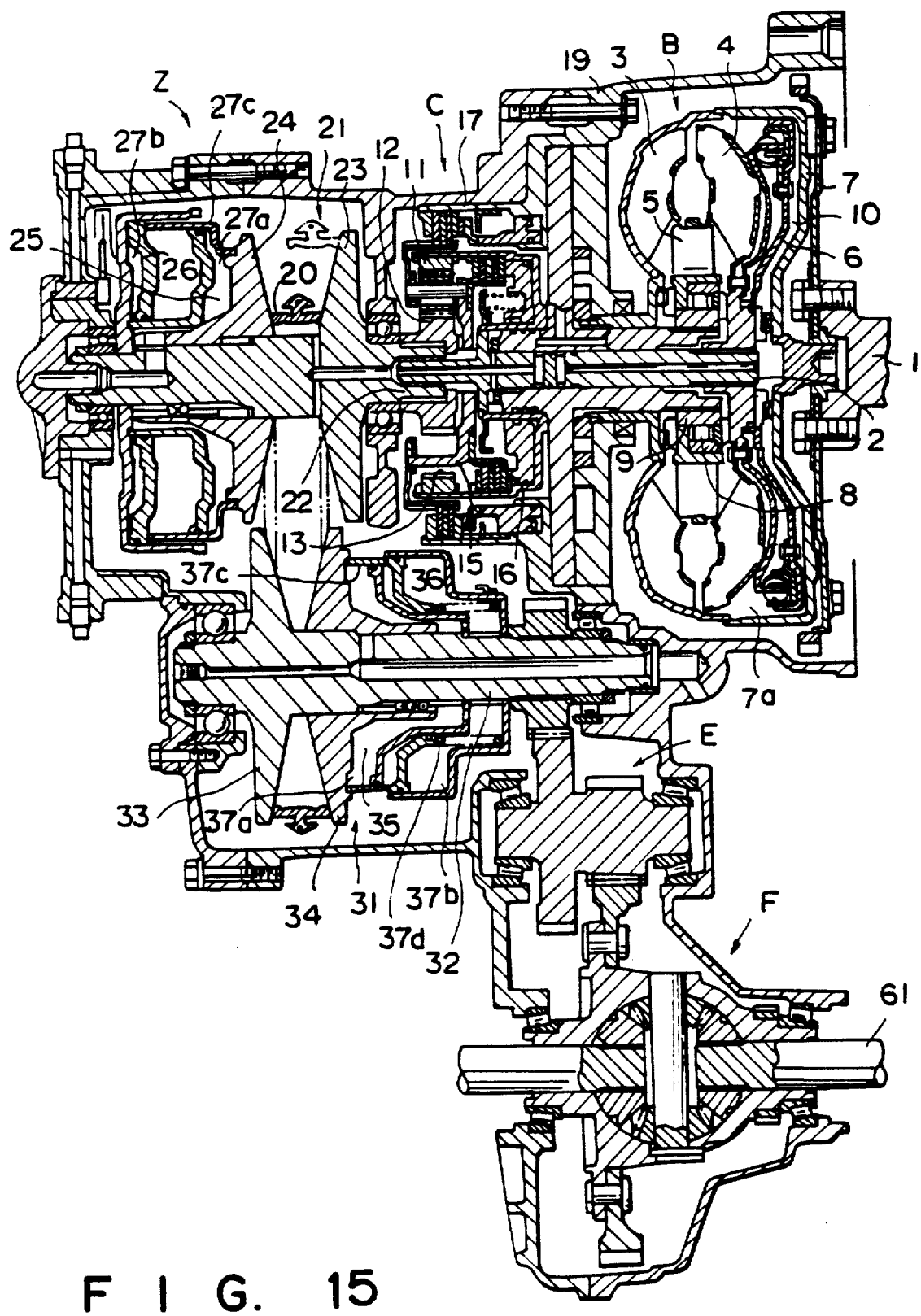
FIG. 15 is a specific structural view which illustrates the stepless transmission according to the first and second embodiments.

FIG. 1 is a schematic drawing which illustrates the overall structure of a stepless transmission Z. FIG. 2 (i.e., FIGS. 2A and 2B) illustrates a hydraulic circuit Q for the stepless transmission Z shown in FIG. 1. Since the schematic structure of the stepless transmission according to the first embodiment is essentially the same as that of the second embodiment, the description made with reference to FIG. 15 is also applied to the first embodiment.

First, the overall structure of the stepless transmission Z will be briefly described with reference to FIG. 1. Then, the structure of the hydraulic circuit Q having a line pressure control apparatus which is an essential portion of the present invention will be described with reference to FIG. 2.

OVERALL STRUCTURE OF STEPLESS TRANSMISSION Z

The stepless transmission Z serves as the stepless transmission for a front wheel drive vehicle basically comprising a torque converter B connected to an output shaft 1 of an engine A, a forward/reverse switch mechanism C, a belt transmission mechanism D, a reduction mechanism E and a differential mechanism F.

TORQUE CONVERTER B

The torque converter B comprises a pump impeller 3 secured to an end portion of a pump cover 7 connected to the engine output shaft 1, the pump impeller 3 being arranged to integrally rotate with the engine output shaft 1. The torque converter B further comprises a turbine runner 4 rotatably disposed in a converter front chamber 7a formed inside of the pump cover 7, the turbine runner 4 being disposed to confront the pump impeller 3. The torque converter B further comprises a stator 5 disposed between the pump impeller 3 and the turbine runner 4 so as to increase the torque. The turbine runner 4 is connected to a carrier 15 which is an input member of a forward/reverse switch mechanism C to be described later, the turbine runner 4 being connected as described above via a turbine shaft 2. The stator 5 is connected to a mission case via a one-way clutch 8 and a stator shaft 9.

Furthermore, a lockup piston 6 is disposed between the turbine runner 4 and the pump cover 7, the lockup piston 6 being fastened to the turbine shaft 2 so as to slide as desired. As a result of this, the lockup piston 6 comes in contact with the pump cover 7 when hydraulic pressure is introduced or discharged from the converter front chamber 7a and the converter rear chamber 10. Therefore, a lockup state in which the lockup piston 6 is integrated with the pump cover 7 and a converter state in which the same is moved away from the pump cover 7 can be selected. In the thus selected lockup state, the engine output shaft 1 and the turbine shaft 2 are directly connected to each other while placing no fluid therebetween. In the converter state, the engine torque is transmitted to the turbine shaft 2 via the fluid.

FORWARD/REVERSE SWITCH MECHANISM C

The forward/reverse switch mechanism C is arranged to selectively set a forward mode in which the rotation of the turbine shaft 2 of the torque converter B is, as it is, transmitted to a belt transmission mechanism D to be described later and a reverse mode in which the same is transmitted to the belt transmission mechanism D in a reversed manner. According to the first embodiment, the forward/reverse mechanism C comprises a double-pinion type planetary gear unit. That is, a first pinion gear 13 to be engaged to a sun gear 12 and a second pinion gear 14 to be engaged to a ring gear 11 are fastened to a carrier 15 connected, in a spline manner, to the turbine shaft 2. The sun gear 12 is connected, in a spline manner, to a primary shaft 22 of a belt transmission mechanism D to be described later.

Furthermore, an FWD clutch 16 for connecting/disconnecting the ring gear 11 and the carrier 15 is disposed between the ring gear 11 and the carrier 15. In addition, a REV clutch 17 for fixing the ring gear 11 to a mission case 19 is disposed between the ring gear 11 and the mission case 19.

Therefore, when the FWD clutch 16 is connected and the REV clutch 17 is disconnected, the ring gear 11 and the carrier 15 are integrated with each other. Furthermore, the ring gear 11 is enabled to rotate relative to the mission case 19. Therefore, the rotation of the turbine shaft 2 is transmitted from the sun gear 12 toward the primary shaft 22 while maintaining the present rotational direction (the forward mode).

On the other hand, when the FWD clutch 16 is disconnected and the REV clutch 17 is connected, the ring gear 11 is secured to the mission case 19 and the ring gear 11 and the carrier 15 are brought into a state in which they can rotate relative to one another. Therefore, the rotation of the turbine shaft 2 is transmitted from the sun gear 2 toward the primary shaft 22 while reversing the rotational direction via the first pinion gear 13 and the second pinion gear 14 (the reverse mode).

That is, in the forward/reverse switch mechanism, the forward mode and the reverse mode can be switched in accordance with the selection operation of the FWD clutch 16 and the REV clutch 17.

BELT TRANSMISSION MECHANISM D

The belt transmission mechanism D comprises a primary pulley 21 to be described later and disposed behind and coaxially with the above-described switch mechanism C. The belt transmission mechanism D further comprises a belt 20 arranged between the primary pulley 21 and a secondary pulley 31 disposed in parallel to the primary pulley 21 and positioned away from the same.

The primary pulley 21 comprises a fixed conical plate 23 having a predetermined diameter and a movable conical plate 24 which is able to axially move with respect to the position of the primary shaft 22. The plate 23 is coaxially disposed to the above-described turbine shaft 2, is integrally formed with the primary shaft 22, an axial end portion of which is connected to the sun gear 12 of the forward/reverse switch mechanism C. The conical frictional surface of the fixed conical plate 23 and the conical frictional surface of the movable conical plate 24 form a belt receiving groove 21a having an essentially V-shaped cross sectional shape.

A cylinder 25 is secured adjacent to an outer surface 24a of the movable conical plate 24. In addition, a piston 26 secured adjacent to the primary shaft 22, is inserted into a portion adjacent to the inner surface of the cylinder 25 in an oil-tight manner. The above-described piston 26, the cylinder 25 and the movable conical plate 24 form a primary chamber 27 which is arranged to receive line pressure from the hydraulic circuit Q to be described later.

The movable conical plate 24 of the primary pulley 21 is, by hydraulic pressure introduced into the primary chamber 27, moved in the axial direction so that the interval from the fixed conical plate 23 is changed. As a result, the effective diameter with respect to the belt 20 can be adjusted.

Basically, the secondary pulley 31 is structured similarly to the structure of the above-described primary pulley 21. The secondary pulley 31 is arranged in a manner such that its fixed conical plate 33 is disposed on a secondary shaft 32, the secondary shaft 32 being disposed parallel with but away from the primary shaft 22 at a certain interval. Furthermore, a movable conical plate 34 is disposed in a manner such that it is able to move on the secondary shaft 32. The conical frictional surface of the fixed conical plate 33 and a conical frictional surface 34a of the movable conical plate 34 form a belt receiving groove 31a having an essentially V-shaped cross sectional shape.

A cylinder 35 is coaxially secured adjacent to an outer surface of the movable conical plate 34. Furthermore, a piston 36, the portion of which is adjacent to the axial center, is secured to the secondary shaft 32 and oil-tightly inserted into a portion adjacent to the inner surface of the cylinder 35. Piston 36, cylinder 35 and movable conical plate 34 form a secondary chamber 37. The secondary chamber 37 is arranged to receive line pressure from the hydraulic circuit Q similar to the structure of the primary pulley 21.

The secondary pulley 31 is arranged to also change its effective diameter from the belt 20 by a method similar to that of primary pulley 21 by bringing the movable conical plate 34 to fixed conical plate 33 and moving the same away from fixed conical plate 33.

The area of the movable conical plate 34 which receives hydraulic pressure is arranged to be smaller than that of the movable conical plate 24 of the primary pulley 21.

Since the reduction mechanism E and the differential mechanism F are structured in a known manner, descriptions about them are omitted here.

OPERATION OF STEPLESS TRANSMISSION

The operation of the stepless transmission Z will now be briefly described.

The rotational direction of the torque transmitted from engine A to the forward/reverse switch mechanism C via the torque converter B is set to the forward or the reverse direction before it is transmitted to the belt transmission mechanism D.

In the belt transmission mechanism D, when the effective diameter of the primary pulley 21 is adjusted in accordance with the introduction/discharge of hydraulic operating fluid from its primary chamber 27, the effective diameter of the secondary pulley, which is arranged to be moved in synchronization with the primary pulley by the action of the belt 20, is adjusted. In accordance with the thus adjusted ratio of the effective diameter of primary pulley 21 and that of secondary pulley 31, the change ratio between the primary shaft 22 and the secondary shaft 32 is determined.

The rotation of the secondary shaft 32 is then decelerated by the reduction mechanism E before it is transmitted to the differential mechanism F, the rotation being then transmitted from the differential mechanism F to the front wheels (omitted from illustration).

HYDRAULIC PRESSURE CIRCUIT Q

In the above-described stepless transmission Z, the hydraulic circuit Q shown in FIG. 2 supplies adjusted hydraulic pressure to the converter front chamber 7a and the converter rear chamber 10 for locking the lockup piston 6 of the torque converter B, the FWD clutch chamber 16 and the REV clutch chamber 17 of the forward/reverse switch mechanism C, the primary chamber 27 for the primary pulley 21 of the belt transmission mechanism D and the secondary chamber 37 of the secondary pulley 31.

An oil pump 40 is provided so as to supply hydraulic pressure to the overall body of the hydraulic circuit Q, the oil pump 40 being operated by the engine A.

Figure 3:
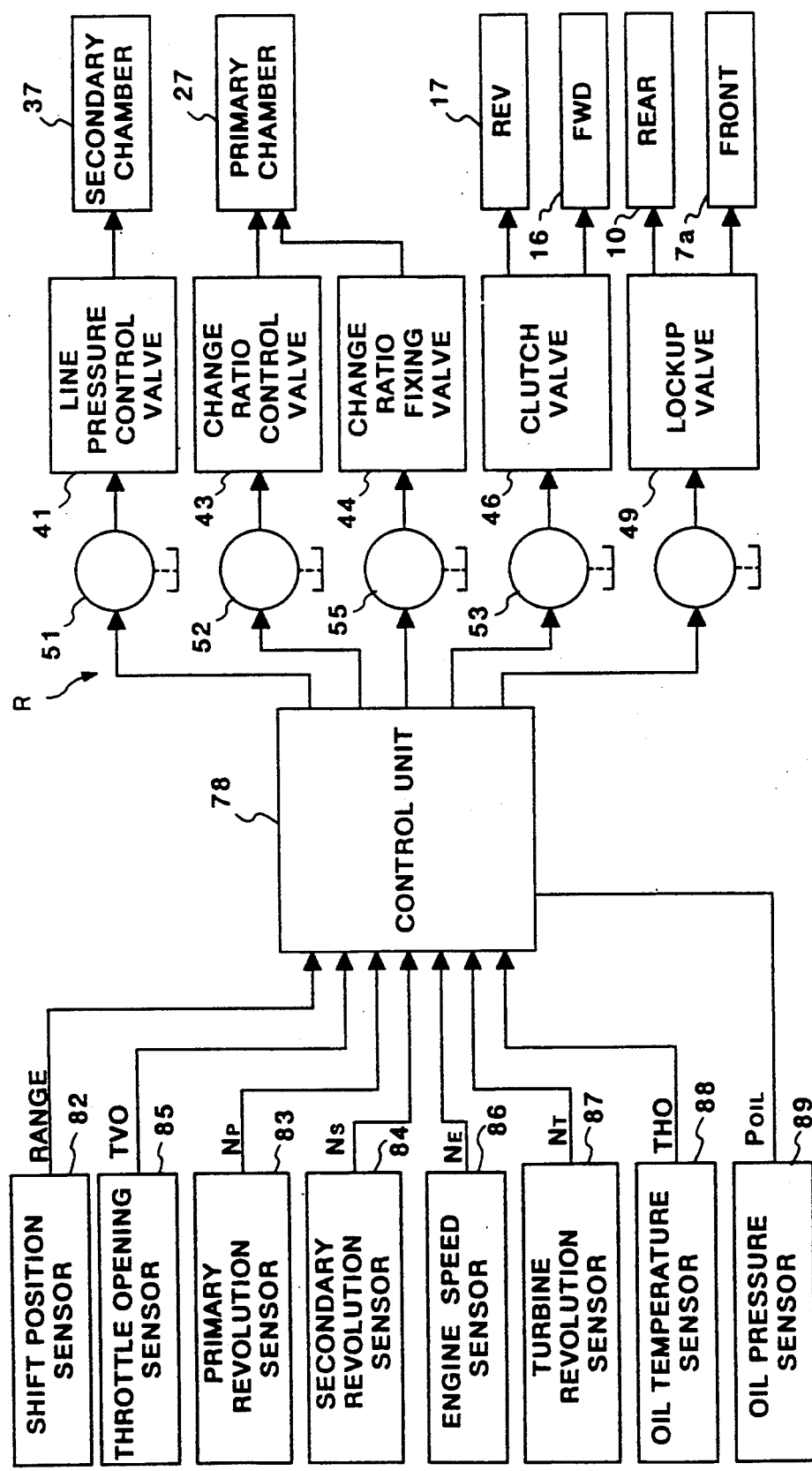
FIG. 3 is a block diagram which illustrates the connections of a control unit 78.

Referring to both FIG. 2 and FIG. 3 which are block diagrams which illustrate the control system according to the first embodiment, the correspondence between each of the control valves in the hydraulic circuit Q, duty solenoids or ON/OFF type solenoids for controlling them and the chambers to which hydraulic pressure which has been governed by the control valves is supplied will become apparent.

The hydraulic circuit comprises a line pressure adjustment valve 41, a pressure reducing valve 42, a change ratio control valve 43, a change ratio fixing valve 44, a hydraulic pressure modification valve 45, a clutch valve 46, a manual valve 47, a converter relief valve 48 and a lockup control valve 49.

As shown in FIGS. 2 and 3, the change ratio control valve 43 is directly controlled by a change ratio control valve 52. The change ratio fixing valve 44 is directly controlled by a clutch duty solenoid 53. The lockup control valve 49 is directly controlled by an ON/OFF type solenoid 54.

The hydraulic operating fluid discharged from the oil pump 40 is adjusted to a predetermined line pressure by the line pressure adjustment valve 41. Then, it is supplied to the secondary chamber 37 of the secondary pulley 31 via line 101. Another output from the line pressure adjustment valve 41 is, via line 102, supplied to the clutch valve 46. Clutch valve 46 causes the duty solenoid 53 to adjust hydraulic pressure at the line 102 to a predetermined level before sending it to the manual valve 47 and the lockup control valve 49 via a line 103.

The pressure reduction valve 42 reduces the level of the line pressure to be supplied to the secondary chamber 37 so that the pilot pressure to be supplied to the pressure modification valve 45, the change ratio control valve 43, the change ratio fixing valve 44 and the clutch valve 46.

The pilot pressure for controlling the line pressure (secondary pressure) can be adjusted by electrically controlling the duty ratio of a duty solenoid 51. That is, hydraulic pressure the level of which has been controlled by the solenoid 51 is introduced into the pilot chamber so that the pressure modification valve 45 is opened/closed in accordance with the level of the thus introduced hydraulic pressure. The fluid in the line 104 the level of which has been controlled in accordance with opening/closing of the pressure modification valve 45 is introduced into a pilot chamber of the line pressure adjustment valve 41 so that desired line pressure is obtained. Although line pressure adjustment valve 41 may directly control the pressure level by a duty solenoid or the like, another structure may be employed in which the pressure modification valve 45 is provided. In this case, a proper pressure level in which an oil leak or the like in the hydraulic circuit has been compensated can be obtained.

The change ratio control valve 43 is controlled by the primary duty solenoid 52. Hydraulic pressure the level of which has been generated by the change ratio control valve 43 is supplied to the primary chamber 27 via the change ratio fixing valve 44. The change ratio fixing valve 27 is controlled by the ON/OFF type solenoid 55. In a state where the solenoid 55 is turned on, a line 107 connected to the primary chamber 27 is allowed to communicate with a line 106, while the same is closed when the solenoid 55 is turned off. That is, the pressure which acts on the primary chamber 27 can be fixed to the present level, that is, the change ratio can be fixed regardless of the status of the change ratio control valve 43 by turning off the solenoid 55.

The change ratio control valve 43 is controlled by the primary duty solenoid 52. In a state where the solenoid 52 is turned on, hydraulic pressure in the primary chamber 27 is drained via lines 107, 106 and 108 and a relief ball 105. That is, no pressure is generated in the primary chamber 27. On the contrary, in a state where the solenoid 52 is turned off, the above-described drain passage 108 is closed and hydraulic pressure is introduced into the primary chamber 27 via an orifice 109 and the line 106. The control valve 43 accommodates two spools each of which has a tapered surface. Therefore, during a period in which the solenoid is always turned on or during a period in which the same is not always turned off, that is, during the duty status, the valve 43 is opened at an aperture ratio which is in accordance with the duty ratio of the solenoid 52. That is, since the supply of hydraulic pressure is performed via the orifice 109, the pressure in the primary chamber 27 does not rise rapidly.

The clutch valve 46 is controlled by the duty solenoid 53. Hydraulic pressure the level of which has been controlled by the solenoid 53 is supplied to the manual valve 47 and the lockup control valve via the line 103.

In the forward mode, the line pressure is applied to the FWD clutch chamber 16 via the 103, the valve 47 and a line 110. On the other hand, hydraulic pressure in the REV clutch chamber 17 is discharged via a line 112.

On the contrary, the supply of the line pressure is not limited to the FWD clutch chamber 16 via the line 110. That is, if the lockup control valve 49 is in a non lockup state, the line pressure is also supplied to the REV clutch chamber 17 via the lines 103, 113 and 112. Thus, the reverse mode is realized.

The lockup control valve 49 is controlled by the ON/OFF solenoid 54. In a state where the valve 49 performs the locking operation, a line 116 connected to the converter rear chamber 10 is allowed to communicate with the relief valve 48 via a relief line 115. Thus, the lockup status is realized.

Thus, hydraulic pressure level at the hydraulic circuit Q is controlled.

DETAILED DESCRIPTION OF LINE PRESSURE CONTROL

Connection of Control System

FIG. 3 illustrates signals to be supplied to a control unit 78 which controls the line pressure and signals to be transmitted from the same. As shown in FIG. 3, the control unit 78 is connected to each of the solenoid valves 51, 52 and 53 so that the each of the solenoid valves 51, 52 and 53 is controlled by the control unit 78. Referring to FIG. 3, the above-described control unit 78 is arranged to receive shift position signal RANGE supplied from a sensor 82 which detects the shift position (D, 1, 2, R, N and P) selected in accordance with the operation of a driver. Furthermore, the control unit 78 receives primary pulley revolution signal $N_P$ supplied from a revolution sensor 83 (omitted from illustration in FIG. 1) which detects the revolution $N_P$ of the primary shaft 22. In addition, the control unit 78 receives secondary pulley revolution signal $N_S$ (or vehicle speed) supplied from a revolution sensor 84 (omitted from illustration in FIG. 1) which detects revolution $N_S$ of the secondary shaft 32. The control unit 78 receives throttle opening degree signal TVO supplied from an opening degree sensor 85 (omitted from illustration in FIG. 1) which detects throttle opening degree TVO of the engine A. In addition, the control unit 78 receives revolution signal $N_E$ supplied from a revolution sensor 86 (omitted from illustration in FIG. 1) which detects engine revolution $N_E$. The control unit 78 further receives turbine revolution signal $N_T$ supplied from a turbine revolution sensor 87 (omitted from illustration in FIG. 1) which detects revolution $N_T$ of the turbine shaft 2 of the torque converter B. The control unit 78 further receives oil temperature THO supplied from a sensor 88 which detects the temperature of oil positioned in the hydraulic circuit Q and hydraulic pressure signal P supplied from a sensor 89 which measures the pressure level at the secondary chamber 37.

Therefore, the engine output torque is transmitted to the forward/reverse switch mechanism C via the torque converter B in a manner such that the torque is transmitted in the form of converter transmission torque which is transmitted via the turbine runner 4 and lockup clutch transmission torque which is transmitted via the lockup piston 6. Therefore, the turbine torque to be transmitted to the primary shaft 22 must be determined in consideration of the above-described two torque transmission patterns. That is the reason why the line pressure (to be abbreviated to "clutch pressure" hereinafter) at the line 102 must precisely be controlled. However, the line pressure at the line 101 realized by the line pressure adjustment valve 41 and the clutch pressure realized by the clutch valve 46 closely relate to each other. Therefore, the line pressure control and the clutch pressure control according to the first embodiment will be described.

In the description about the control of the line pressure and the clutch pressure, the fail-safe control at the abnormal gear change according to the first embodiment will be apparent.

Figure 4A:
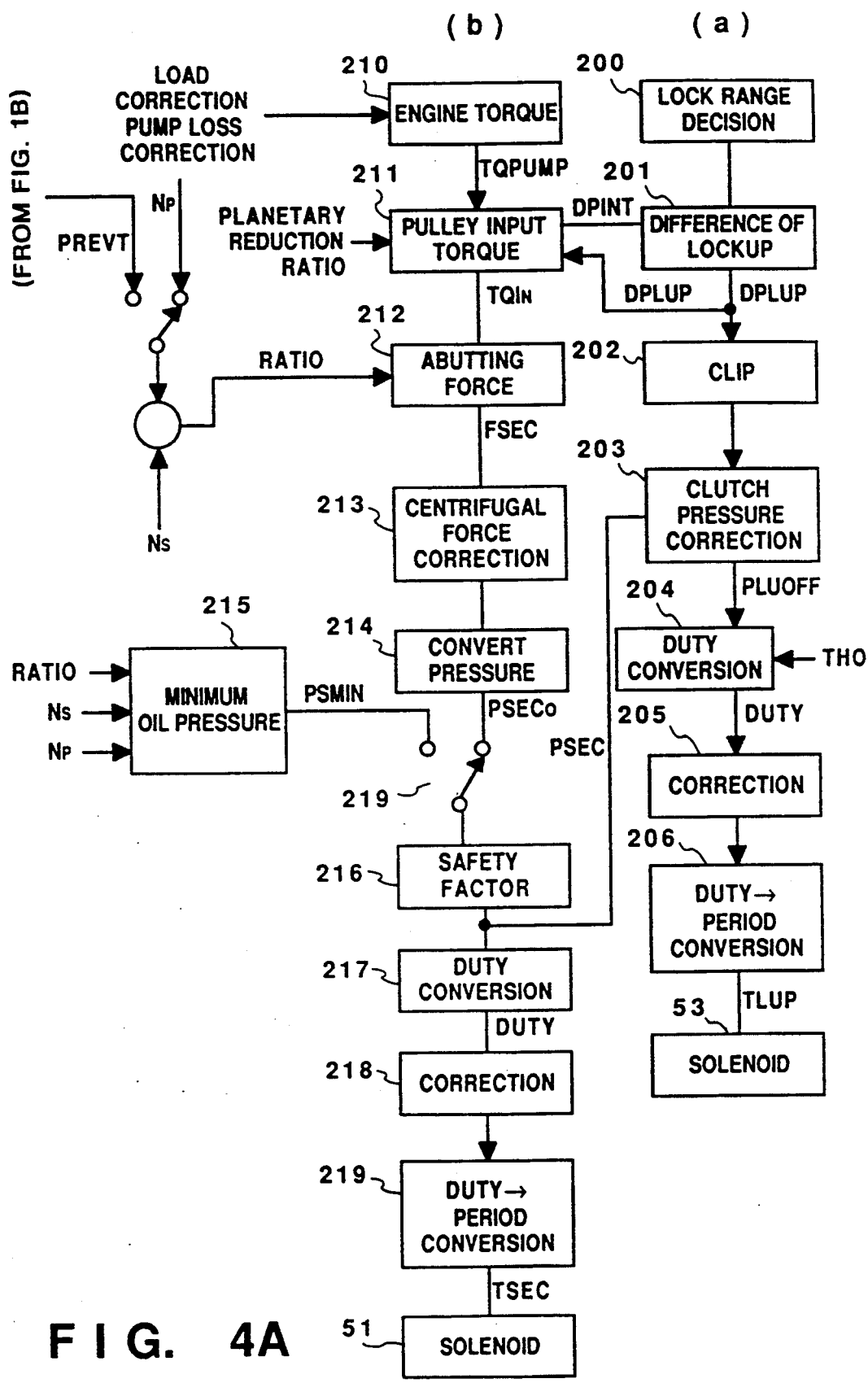
FIGS. 4A and 4B are block diagrams illustrating the overall portion of an embodiment of the control according to the present invention.
Figure 4B:
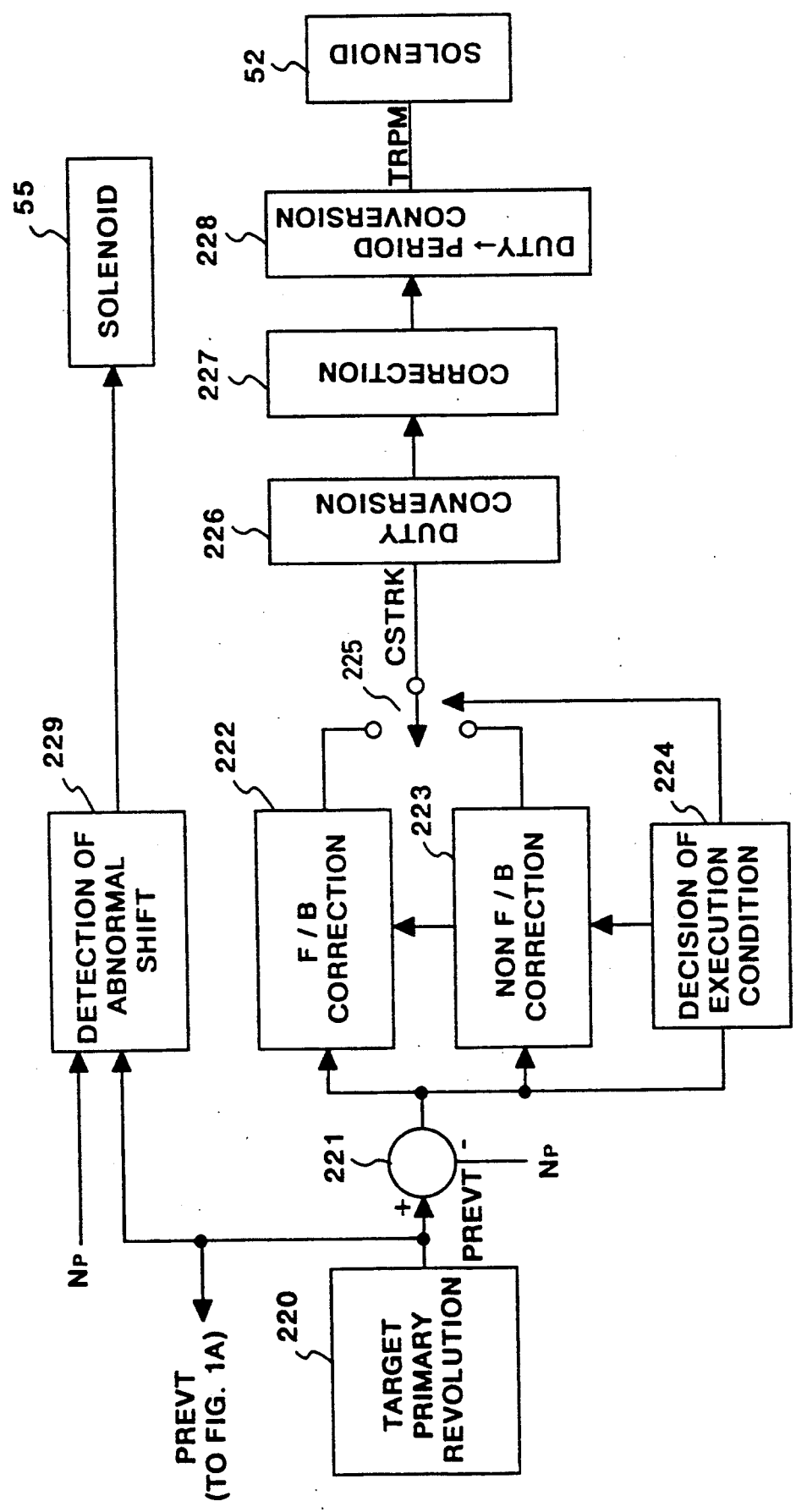

FIGS. 4A and 4B are overall block diagrams which illustrate the line pressure control according to the first embodiment. As shown in the two drawings, in the control operation according to this embodiment, three duty signals are transmitted which comprise signal TLUP to be supplied to the duty solenoid 53 for controlling hydraulic pressure acting on the lockup piston 6, that is, for controlling the pilot pressure to be supplied to the control valve 41, signal TSEC to be supplied to the duty solenoid 51 for controlling the basic line pressure and signal TPRM to be supplied to the duty solenoid 52 for controlling hydraulic pressure acting on the primary chamber 27, that is, for controlling the pilot pressure to be supplied to the control valve 44.

OUTLINE OF LOCKUP CLUTCH CONTROL

Figure 5A:
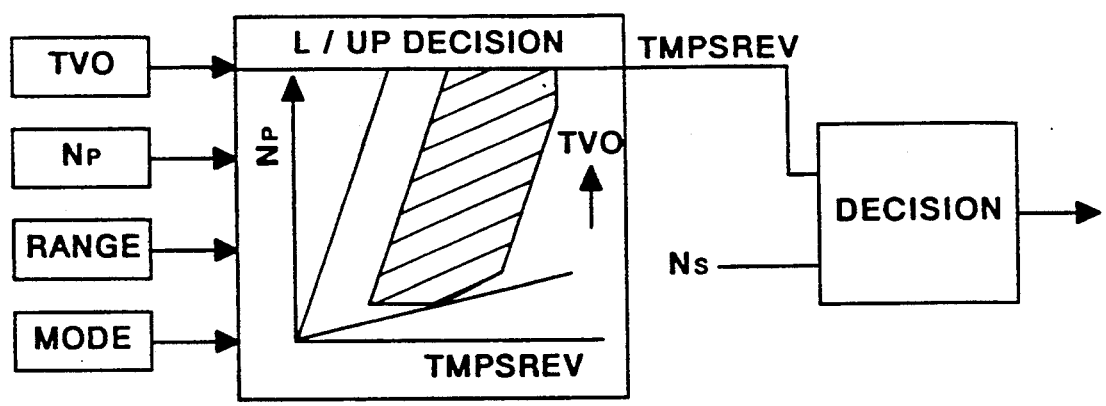
FIG. 5A is a schematic diagram illustrating the characteristics for determining the control range in a lockup operation.

Referring to FIG. 4A, the generation control of signal TLUP is performed as follows: if it has been, in step 200, determined that the present operation state is in a lock range, differential signal DPLUP is calculated in step 201. FIG. 5A illustrates the map characteristics for determining the lock range. If it has been determined that the present operation state is in the lock range in accordance with the logic shown in FIG. 5A, lockup clutch differential pressure DPLUP is, in step 203, in accordance with the lockup transmission torque initial value TQINT calculated from engine output torque TQPUMP (to be described later), DPLUP being the target value of the difference in hydraulic pressure across the piston 6.

Figure 5B:
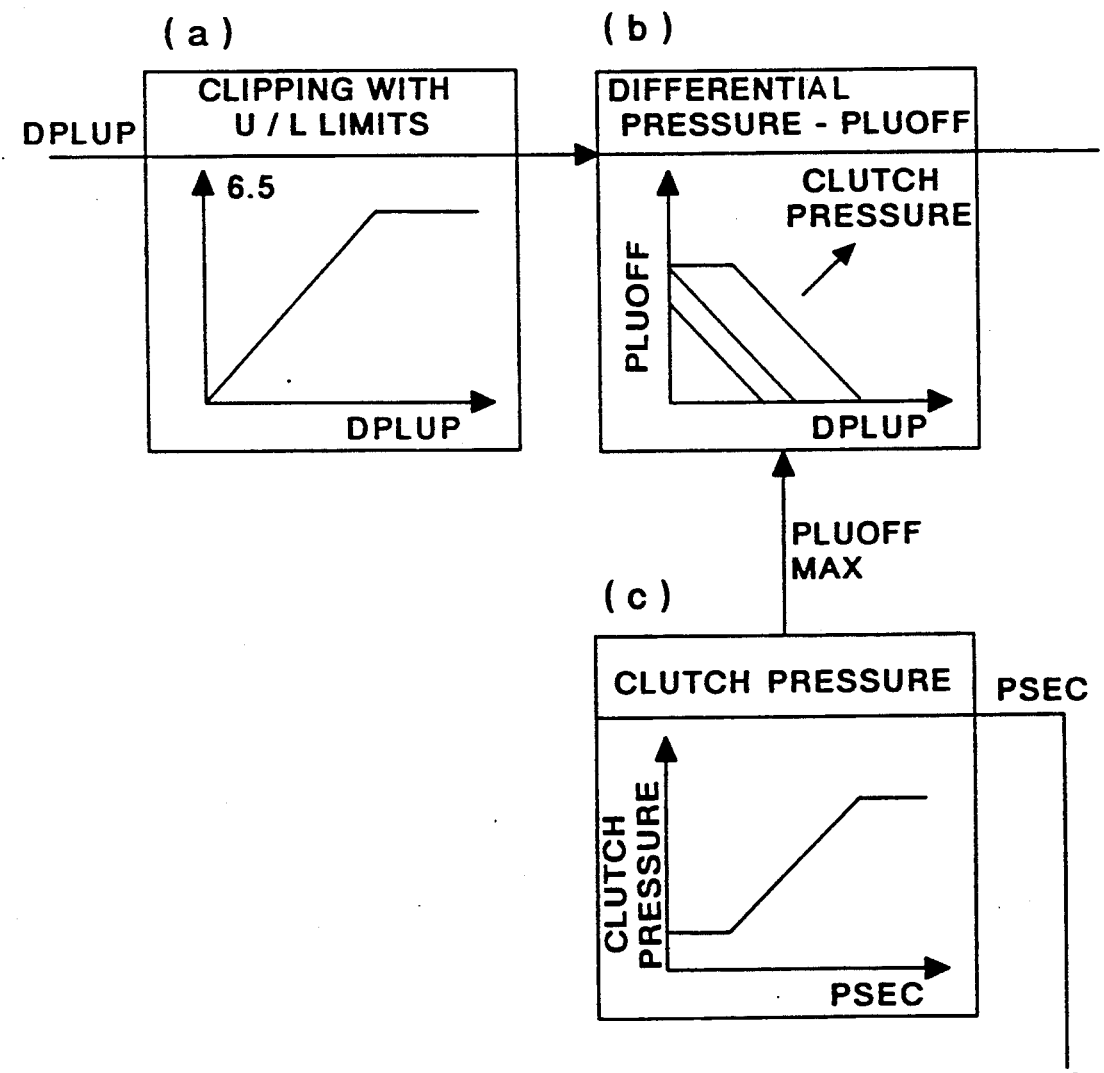
FIG. 5B is a schematic diagram illustrating a control for calculating the duty of a solenoid for a lockup clutch.

The lockup clutch differential pressure DPLUP is, in 202, then subjected to the limit correction in accordance with the characteristics shown in FIG. 5B (a) so that the excessive hydraulic pressure is not applied.

The thus clipped DPLUP is corrected in step 203 in consideration of the line pressure (which is determined by signal PSEC which determines hydraulic pressure to be applied to the secondary chamber 37). That is, referring to FIG. 5B (c), the maximum clutch pressure is calculated in accordance with line pressure PSEC. The thus obtained quantity is arranged to be maximum clutch pressure PLUOFF$_{MAX}$. While performing the limit control in which PLUOFF$_{MAX}$ thus calculated is arranged to be the maximum value, DPLUP is converted into clutch pressure PLUOFF in accordance with the characteristics shown in FIG. 5B (b). The clutch pressure PLUOFF is converted into the duty ratio in step 204 before it is subjected to the power supply voltage correction in step 205. Then, the corrected duty is converted into the cycle by step 206 so as to be transmitted to the solenoid 53. The duty conversion will be described later.

OUTLINE OF PRIMARY HYDRAULIC PRESSURE CONTROL

Figure 6:
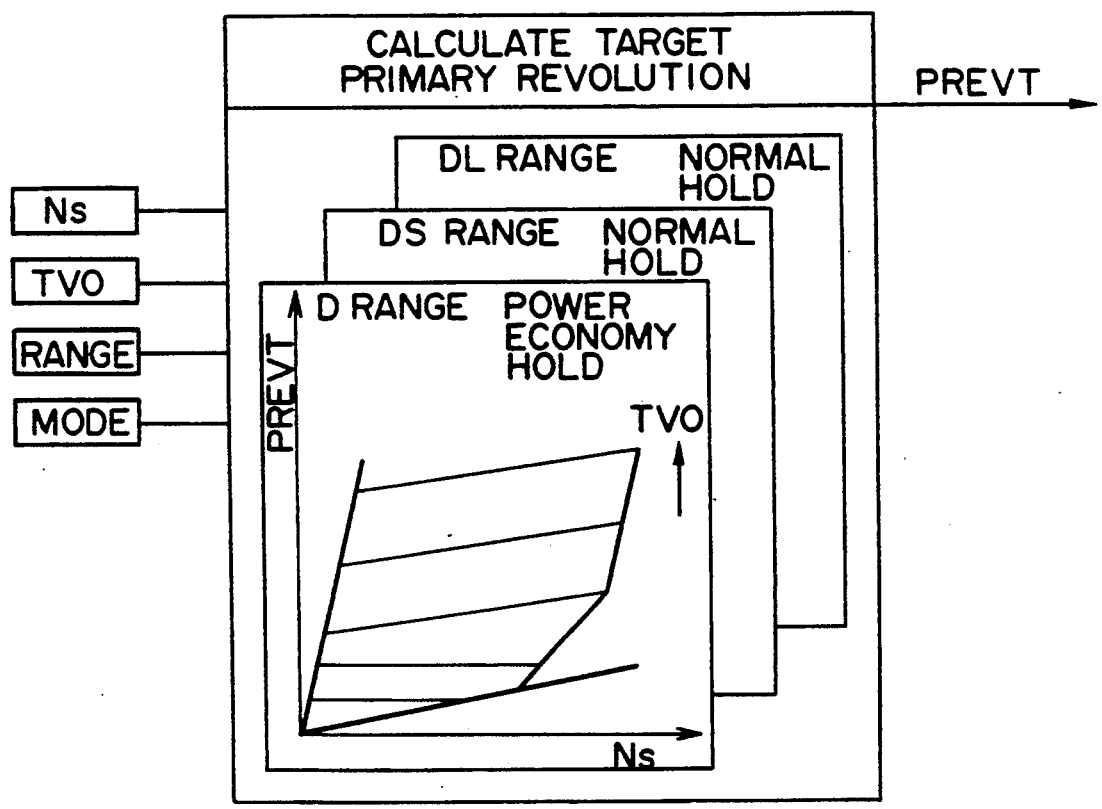
FIG. 6 is a schematic diagram illustrating a control for calculating the target revolution of a primary pulley.

Then, the outline of procedure of controlling hydraulic pressure at the primary chamber will be described. First, target value PREVT of the primary pulley revolution is, in step 220, read from the map in accordance with shift signal RANGE, throttle opening degree TVO, operation mode MODE and present revolution Ns of the secondary pulley. The characteristics of the map is shown in FIG. 6. Then difference DNP between target revolution PREVT and the present primary pulley revolution NP is calculated in step 221, the DNP thus obtained being then subjected to the feedback correction step 222 and the non-feedback control correction step 223 so that the duty of the solenoid 52 is controlled. In step 224, the execution conditions for the feedback control are determined. If the execution conditions are met, a selector 225 selects the DNP which has been subjected to the feedback correction. If the execution conditions are not met, the selector 225 selects the DNP which has not been subjected to the feedback correction. The thus selected DNP is transmitted to a duty conversion step 226. Duty conversion step 226 converts the output of the selector 225 to a duty ratio. The duty ratio is subjected at step 227 to a correction operation for correcting it when it exhibits an exceptional value. The corrected ratio is then subjected to a duty-period conversion at step 228, so that the solenoid is energized during the period corresponding to the ratio.

The conversion into the duty ratio is performed similarly to the above-described case of the lockup operation.

DETECTION OF ABNORMAL GEAR CHANGE

FIG. 4B also illustrates the status in which the solenoid 55 is controlled in a case where the abnormal gear change has been detected. The abnormal gear change is detected by step 229 as the abnormality in the primary pulley revolution N$_P$ or that in the target primary revolution PREVT. The operation of step 229 will be described below. That is, as will be apparent from the description made about the flow chart shown in FIG. 14, there are assumed three types of the operation status in the abnormal gear change. The first status is the status in which revolution N$_P$ is about to exceed a certain threshold N$_{TH}$, that is:

$$N_P \geq N_{TH}$$

The second status is the status in which the absolute value of the deviation from target revolution PREVT of primary revolution N$_P$, that is, the absolute value of $$\Delta N_P = PREVT - N_P$$

is about to exceed a certain threshold $\Delta_{TH}$ ($>0$), that is, in the following case:

$$|\Delta N_P| \geq \Delta_{TH}$$

The third case is the case in which the absolute value of the above-described speed change of the deviation, that is, the absolute value of $$\delta N_P = \Delta N_P(n) - \Delta N_P(n-1)$$

is about to exceed a certain threshold $\delta_{TH}$ ($>0$), that is, in the following case:

$$|\delta N_P| \geq \delta_{TH}$$

The reason for this lies in that primary revolution N$_P$, target primary revolution PREVT, deviation $\Delta N_P$ and deviation speed change $\delta N_P$ are not considerably changed, where symbol n denotes the quantity measured at the present cycle and n−1 denotes the quantity measured at the previous cycle.

The reason for the abnormal gear change might be considered to be a case in which the change ratio control valve 43 has become sticky, a case in which the wire in the solenoid 52 for controlling the change ratio control valve 43 has broken and a case in which a driver circuit (omitted from illustration) for the solenoid 52 has encountered a short circuit. The hydraulic circuit is designed in a manner such that fail-safe function automatically acts when a wire in the solenoid 52 and 55 has been broken. That is, when a wire in the solenoid 52 has been broken, the change ratio control valve 43 is always brought to the position at which it is turned off. Therefore, hydraulic pressure is applied to the primary chamber so that the revolution of the secondary pulley is controlled in a direction in which the same is lowered. When a wire in the solenoid 55 has been broken, the change ratio fixing valve is always brought to the position at which it is turned off. Therefore, the pressure at the primary chamber 27 is fixed. That is, the revolution of the secondary pulley is not raised.

OUTLINE OF CONTROL OF SECONDARY HYDRAULIC PRESSURE

Figure 7A:
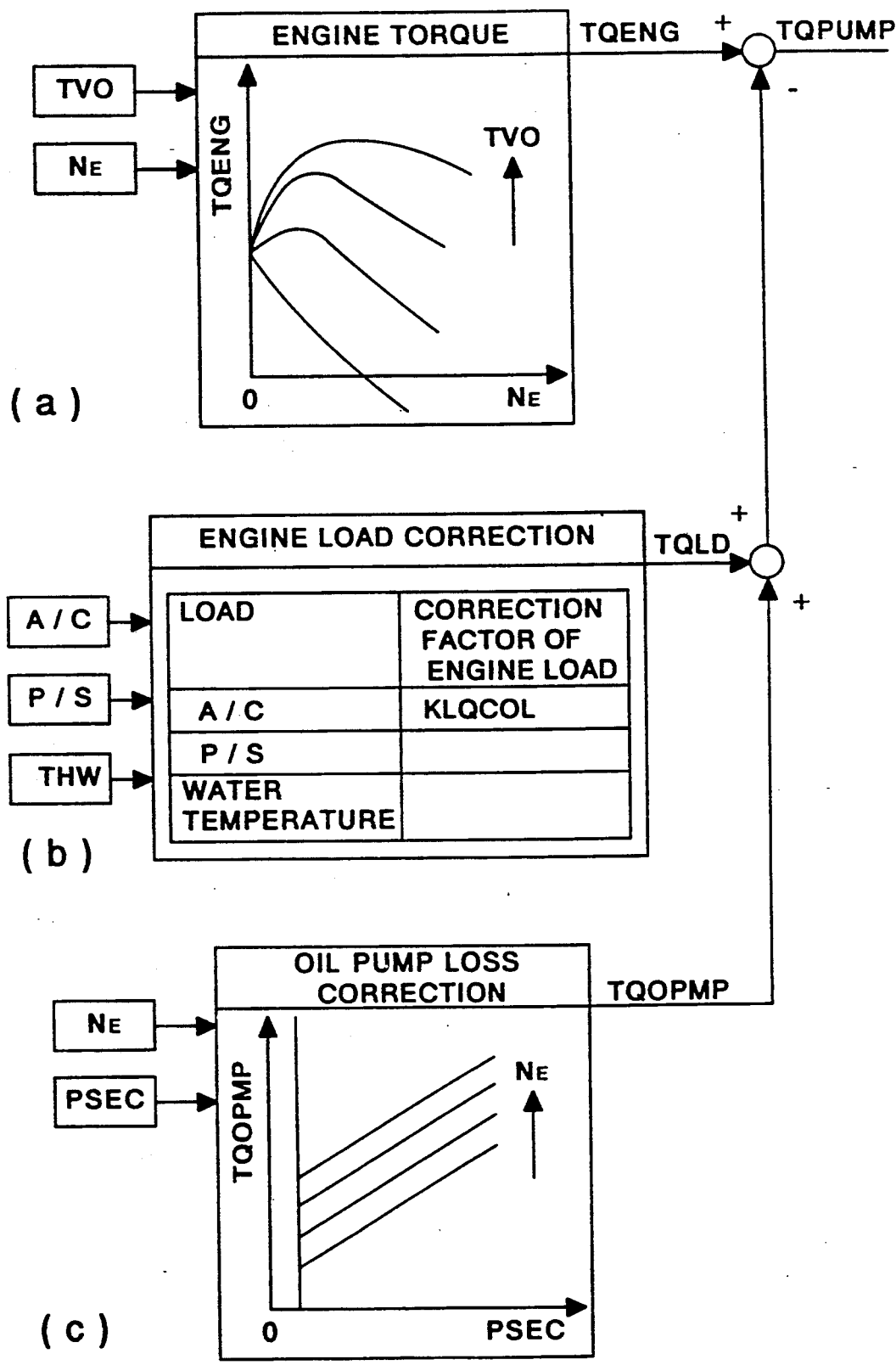
FIG. 7A is a schematic diagram illustrating a control for calculating engine torque TQPUMPA.

Referring back to FIG. 4, hydraulic pressure (which corresponds to the line pressure according to this embodiment) to be applied to the secondary chamber 37 and as shown in FIG. 4A (b) is controlled as follows:

First, engine output torque TQPUMP is calculated in step 210. As shown in FIG. 7A (a), the calculation of TQPUMP is performed in a manner such that load correction TQLD and correction quantity TQOPMP due to the oil pump loss are subtracted from engine output torque TQENG calculated in accordance with throttle opening degree TVO and engine revolution N$_E$. The engine load is exemplified by the load due to the air conditioner or the power steering or the like as shown in FIG. 7A (b). Furthermore, according to the first embodiment, the correction in accordance with engine water temperature THW is considered. The pump loss is, as shown in FIG. 7A (c), corrected by a calculation performed in accordance with line pressure PSEC to be applied to the secondary pulley and engine revolution N$_E$.

In accordance with engine torque TQPUMP calculated in consideration of the above-described correction, torque TQIN to be supplied to the primary pulley from the forward/reverse switch mechanism C is calculated in step 211. As is described later, the engine output torque TQPUMP is accurately divided into two portions, that is, torque TQLUP transmitted via the lockup clutch and torque TQCVD transmitted via the converter so as to accurately calculate the synthesized torque to be transmitted to the primary pulley. In step 212, TQIN thus obtained is inputted and force FSEC necessary to abut the pulley is calculated from change ratio RATIO which has been inputted. The calculation of FSEC will be described later with reference to FIG. 7C. Abutting force FSEC thus obtained is subjected to the centrifugal correction in step 213 before it is converted into pressure PSECO in step 214. Therefore, PSECO thus obtained is calculated by correcting force FSEC in accordance with centrifugal force, force FSEC being force necessary to properly transmit the output torque transmitted via the torque converter and the lockup mechanism to the primary pulley in accordance with change ratio RATIO.

On the other hand, in step 215, pressure PSMIN which is the minimum force necessary to perform the gear change operation is calculated in accordance with change ratio RATIO and primary pulley revolution $N_P$ and the like. A selector 219 selects the larger value upon the result of a comparison made between PSECO and PSMIN, the selected value being made to be a signal for operating the duty solenoid 1 which controls the line pressure. The process in which the centrifugal force is generated and the reason why the larger value is selected from a group consisting of PSECO and PSMIN by the selector 219 will be described with reference to FIGS. 7C and 8.

Then, the calculation of the torque to be supplied to the pulley performed in step 211 will be described with reference to FIG. 7B. As described above, that control is performed in a manner such that two types of torque to be transmitted via the turbine runner 4 and torque to be transmitted via the lockup piston 6 are taken into consideration when the engine output is transmitted to the primary pulley of the belt transmission mechanism D via the torque converter B and the lockup clutch. That is, engine output torque TQENG is divided into two directions toward the torque converter and the lockup mechanism. However, the thus divided torque passes through different transmission passages, causing the torque transmission ratio to the primary shaft 22 to become different. Therefore, in order to accurately recognize the torque to be transmitted to the shaft 22, the way in which the engine output torque TQENG is divided into two portions must be accurately recognized.

Figure 7B:
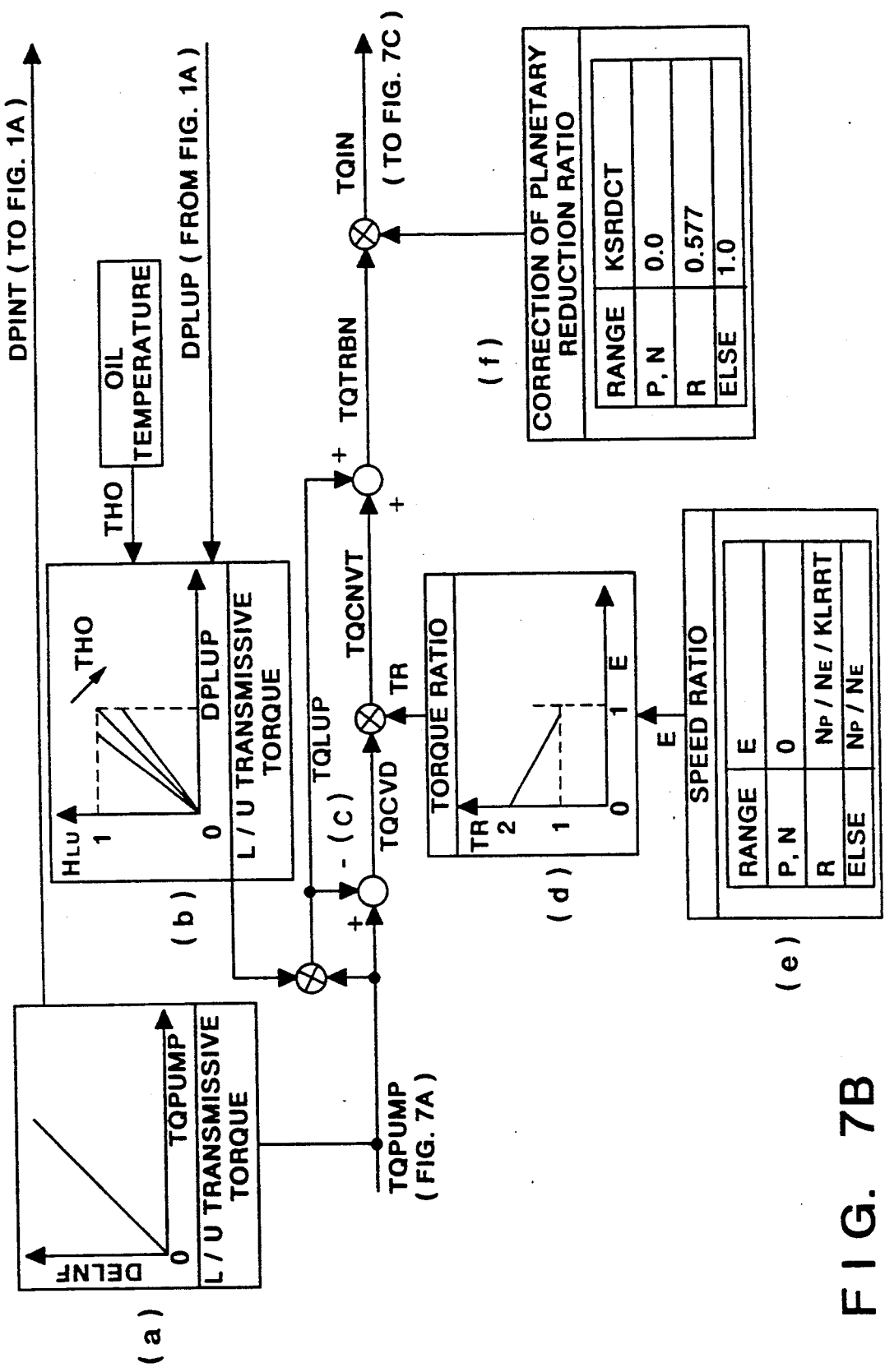
FIG. 7B is a schematic diagram illustrating a control for calculating turbine torque TQTRBN.

According to the first embodiment, the torque to be divided into two portions is calculated as shown in FIG. 7B in a manner such that torque TQLUP to be transmitted by the lockup is calculated, the thus obtained torque TQLUP being then subtracted from engine output torque TQPUMP so that torque TQCVD to be transmitted to the torque converter is obtained. The same may be calculated in a contrary manner arranged in a manner such that the torque to be transmitted to only the torque converter is obtained so as to obtain the torque to be transmitted to the lockup.

First, initial value DPINT of the differential pressure across the lockup piston is calculated from engine output TQPUMP and in accordance with the characteristics shown in FIG. 7B (a). The characteristics shown in FIG. 7B (a) are uniquely determined in accordance with the lockup mechanism. As described above, DPINT is converted into differential pressure DPLUP in step 201 shown in FIG. 4A while taking the determination conditions for the lockup range (see FIG. 5A) into consideration, differential pressure DPLUP showing the pressure level to be transmitted to the lockup piston 6. The torque to be actually transmitted to the piston 6 is determined in accordance with the viscosity (that is, the temperature of oil) in the converter front chamber 7a. Therefore, in accordance with the characteristics shown in FIG. 7B (b), that is, in accordance with oil temperature THO, lockup transmission ratio $H_{LU}$ is determined so as to cause torque in inverse proportion to THO to be transmitted to the piston 6, transmission ratio $H_{LU}$ being the quantity range from 0 to 1 as shown in FIG. 7B (b). In accordance with transmission ratio $H_{LU}$ and engine torque TQPUMP, torque TQLUP to be actually transmitted to the lockup piston 6 is, as shown in FIG. 7B (c), calculated from the following equation:

$$TQLUP = TQPUMP \times H_{LU}$$

Therefore, torque TQCVD of the engine output to be solely supplied to the torque converter becomes as follows:

$$TQCVD = TQPUMP - TQLUP$$

Therefore, torque TQCNVT to be transmitted from only the converter is calculated in consideration of torque ratio TR shown in FIG. 7B (e), resulting as follows:

$$TQCNVT = TQCVD \times TR = (TQPUMP - TQLUP) \times TR$$

Therefore, composite torque TQTRBN from the lockup and the converter becomes as follows:

$$TQTRBN = TQLUP + TQCNVT$$

The thus obtained torque is supplied to the switch mechanism C before it is transmitted to the primary pulley. Since the above-described switch mechanism C has a planetary mechanism fastened thereto, final torque TQIN is calculated as follows from TQTRBN in consideration of reduction ratio KSRDCT due to the planetary mechanism:

$$TQIN = TQTRBN \times \text{reduction ratio}$$

The value of reduction ratio KSRDCT is shown in FIG. 7B (f).

Then, the procedure of calculating torque ratio TR will be described with reference to FIGS. 7B (d) and (f). The torque ratio is the ratio of the torque of the input torque to be transmitted by the converter, the torque ratio being obtained from speed ratio E. The speed ratio E is determined in accordance with the ratio $(N_P/N_E)$ between primary revolution $N_P$ and engine revolution $N_E$ and speed change range (RANGE) in a manner shown in FIG. 7B (e). Assuming that KLRRT is the reduction constant at the reverse mode (when the REV position is selected) of the forward/reverse mechanism, speed ratio $E_R$ becomes $N_P/N_E/KLRRT$. When RANGE is positioned at P or N, E becomes "0". The torque ratio is determined in accordance with the characteristics shown in FIG. 7B (d). The characteristics is set to maximum value "2" when speed ratio E is zero, that is, when the vehicle is stopped, the same being gradually reduced from "2" when speed ratio E is gradually enlarged from zero. When speed ratio reaches about 0.8, torque ratio TR circulate to 1 and is then maintained at "1".

As described above, the torque to be supplied to the pulley, that is, torque TQIN to be transmitted to the primary pulley shaft 22 can be accurately obtained in step 211.

Then, the procedure of calculating secondary pressure PSEC will be described by describing the control performed in steps through 212 to 216.

First, the procedure of calculating the force to be abutted in step 212 shown in FIG. 4A will be described with reference to FIG. 7C. The abutting force is the force to be applied to the piston 36 in order to maintain the necessary effective diameter of the primary pulley and that of the secondary pulley against the tension of the belt. Since the effective diameter is changed in accordance with the change ratio, the abutting force must be changed in accordance with change ratio RATIO.

Figure 7C:
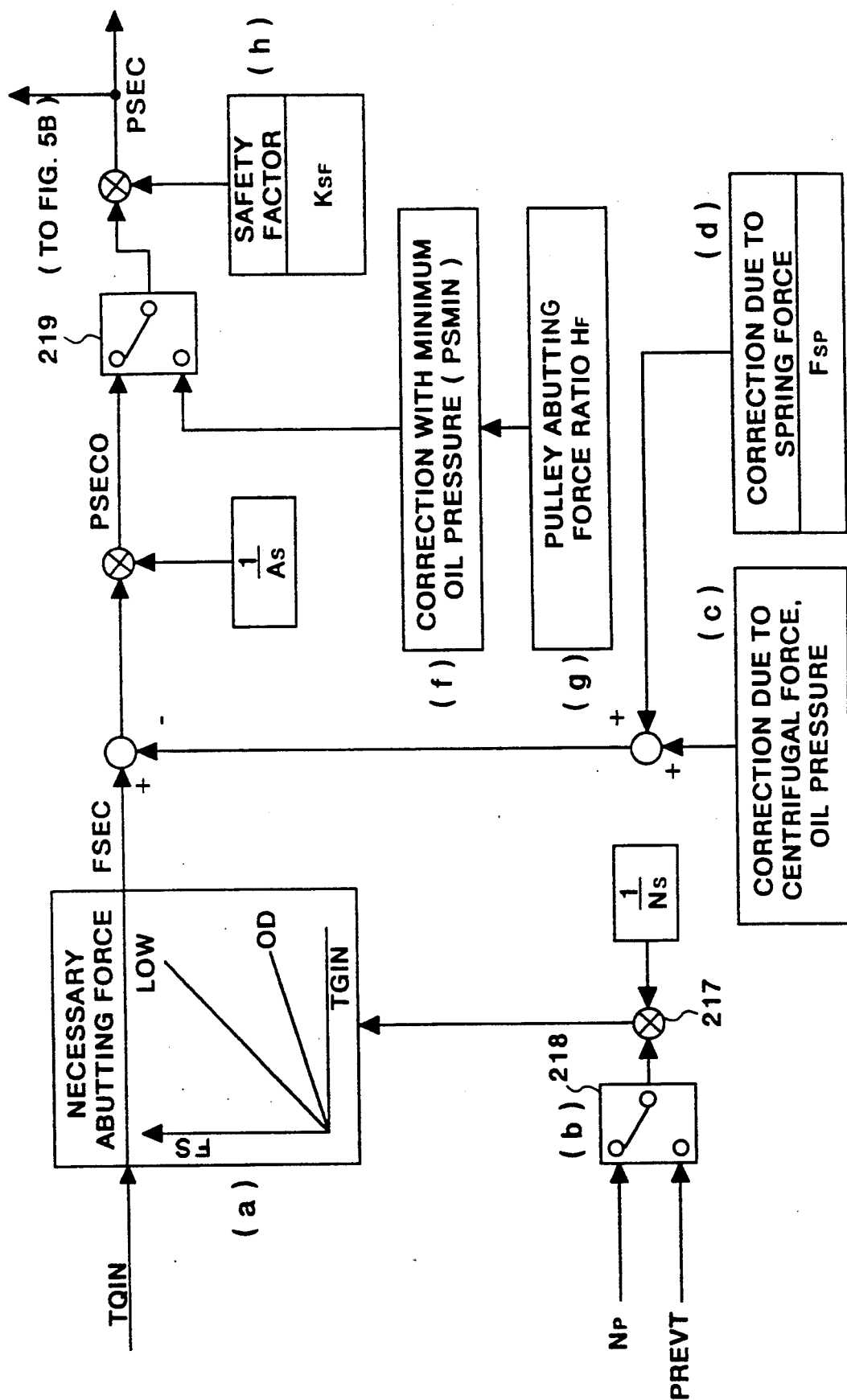

Change ratio RATIO is calculated in a procedure as shown in FIG. 7C.

First, as shown in FIG. 7C (b), a comparison is made in selector 231 between present primary pulley revolution $N_P$ and target pulley revolution PREVT calculated in step 220. The reason for this lies in that the force determined to be larger between the abutting force necessary to maintain the present change ratio and the abutting force necessary after the gear change must be generated in order to obtain the necessary abutting force. Assuming that it has been determined by the selector 231 that NP is larger than PREVT, RATIO can be expressed in 231 as follows:

$$\text{RATIO} = \frac{N_P}{N_S}$$

The division of $N_P$ by $N_S$ is performed by multiplier 232 by $$\frac{1}{N_s}$$

In accordance with the thus obtained RATIO and input torque TQIN, abutting force FSEC is calculated in accordance with the characteristics shown in FIG. 7C (a). In this case, the necessary abutting force is in proportion to the degree of the change ratio, that is, degree of overdriving.

Then, the detailed procedure of correcting the centrifugal hydraulic pressure will be described. The reason why the centrifugal hydraulic pressure correction must be performed as shown in FIGS. 7C (c) through (g) and problems taken place in accordance with that centrifugal hydraulic pressure correction will be described with reference to FIG. 8.

Figure 8A:
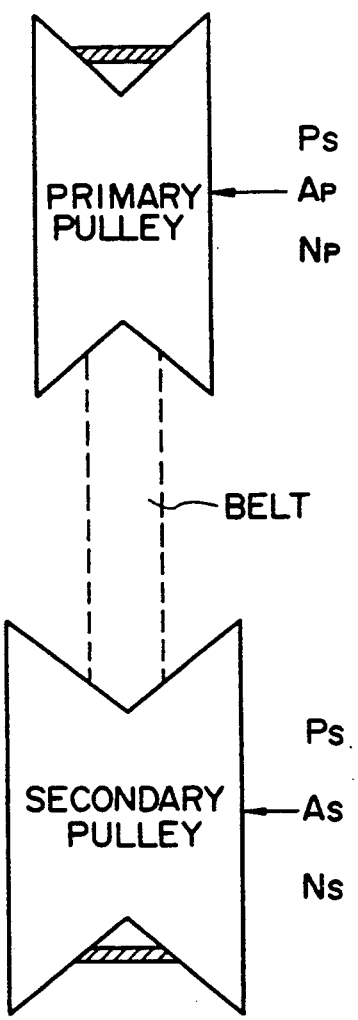

As shown in FIG. 8A, when line pressure $P_S$ (which is determined by the solenoid 51 on the secondary side) which is commonly applied to the primary pulley having effective cross sectional area $A_P$ and the secondary pulley having effective cross sectional area $A_S$ in a case where the above-described two pulleys are rotated by a belt is taken into consideration, abutting force $F_P$ and that $F_S$ to be applied to the corresponding pulleys become as follows:

$$F_P = A_P P_S + K_P N_P^2 \qquad (1)$$

$$F_S = A_S P_S + K_S N_S^2 + F_{SP} \qquad (2)$$

where symbol K denotes predetermined constant, the second term is the force due to the centrifugal force and the third term of the second equation is the force due to the spring (represented by 38 in FIG. 2). It is an essential fact that ratio HF (to be expressed by the following equation) of the abutting forces to be applied to the pulleys must be maintained at a predetermined value. If it cannot be set to a proper value, a problem will arise, for example, in that the effective diameter of the secondary pulley is not changed although that of the primary pulley has been reduced.

$$HF = \frac{F_P}{F_S} \qquad (3)$$

Figure 8B:
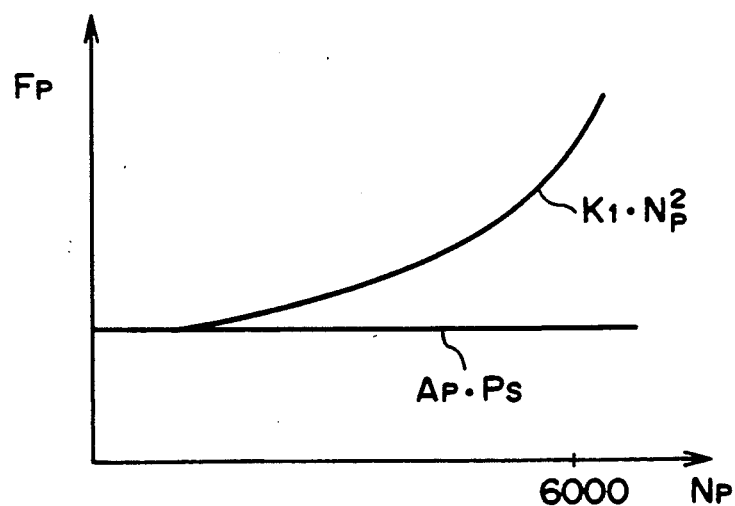

FIG. 8B is a graph which illustrates the change characteristics of $F_P$ with respect to primary pulley revolution $N_P$. FIG. 8C is a graph which illustrates those of $F_S$ with respect to the same. As shown in those drawings, the abutting force due to the centrifugal force is increased proportional to the square of revolution $N_P$ ($N_S$). Since the centrifugal force acts in a direction in which the pulley is abutted, the degree corresponding to it is subtracted from the line pressure, causing the load to be applied to the hydraulic pump to be reduced. Therefore, the fuel consumption can be reduced. A dashed line of FIG. 8C denotes the change in pressure $A_S \times P_S$ in a case where line pressure $P_S$ has been reduced by a degree corresponding to the contribution due to the pressure caused from the centrifugal force. Since the ratio of the areas of the two pulleys becomes as follows:

$$A_P \cdot A_S = 2:1$$

the reduction in $A_P \cdot A_S$ becomes too large although $F_S$ can be maintained at a substantially constant value when line pressure $P_S$ is reduced by a degree corresponding to the centrifugal correction. Therefore, abutting force ratio $H_F$ cannot be maintained at the proper value. The reason for this lies in that the absolute value of the contribution of the centrifugal force is insufficient although the contribution of the centrifugal force acts in proportion to the revolution. Therefore, when the degree of the centrifugal correction is enlarged considerably, the line pressure is excessively reduced. Therefore, there arises a fear in that the line pressure will be lowered below the necessary level (this tendency becomes apparent the more the operation speed is high since revolution $N_S$ of the secondary pulley is raised). That is, assuming that line pressure $P_S$ has reduced by $\Delta P$ due to the centrifugal force correction, the change in the abutting force becomes $A_P \times \Delta P$. Therefore, according to this embodiment, the reduction in $P_S$ is supervised so as to perform the limit correction in the case where the line pressure is reduced below the necessary level. In this case, lower limit value PSMIN is defined by the following equation which is the solution of Equation (3) for S:

$$PSMIN = \frac{(K_S \cdot N_S^2 + F_{SP}) \times H_F - K_P \cdot N_P^2}{A_P - A_S \cdot H_F} \quad (4)$$

Referring back to FIG. 7C, necessary abutting force FSEC is subjected to the centrifugal correction and the spring force correction as shown in FIGS. 7C (c) and 7C (d). Then, pressure PSECO applied to the piston 36 of the secondary pulley is calculated from piston area $A_S$, that is, $$PSECO = \frac{FSEC - (K_S \cdot N_S^2 + F_{SP})}{A_S}$$

Then, the selector 219 selects PSECO or PSMIN which has been determined to be relatively smaller. Then, as shown in FIG. 7C(e), the selected factor is multiplied by safety factor KSF at step 216 (FIG. 4A) in order to ensure the operation as shown in FIG. 7C (h), the result of this multiplication being arranged to be PSEC. As illustrated in FIG. 4A, duty conversion step 217 converts the output of the selector to a duty ratio. The duty ratio is then subjected at step 218 to a correction operation for correcting it when it exhibits an exceptional value. The corrected ratio is then subjected to a duty-period conversion at step 209, so that the solenoid 51 is energized during the period corresponding to the ratio.

Thus, line pressure PSEC can be secured so that the gear change operation is reliably performed regardless of the change ratio, that is, pulley revolution $N_S$.

Then, the control to which the solenoids 51, 52 and 53 are subjected will be described. That control is performed in a manner such that the operation frequency for the duty solenoid is controlled in accordance with the quantity of the hydraulic pump discharge (that is, engine revolution $N_E$) and the duty ratio in order to reduce the pulsation of hydraulic pressure and to improve the durability of the solenoid.

Figure 9:
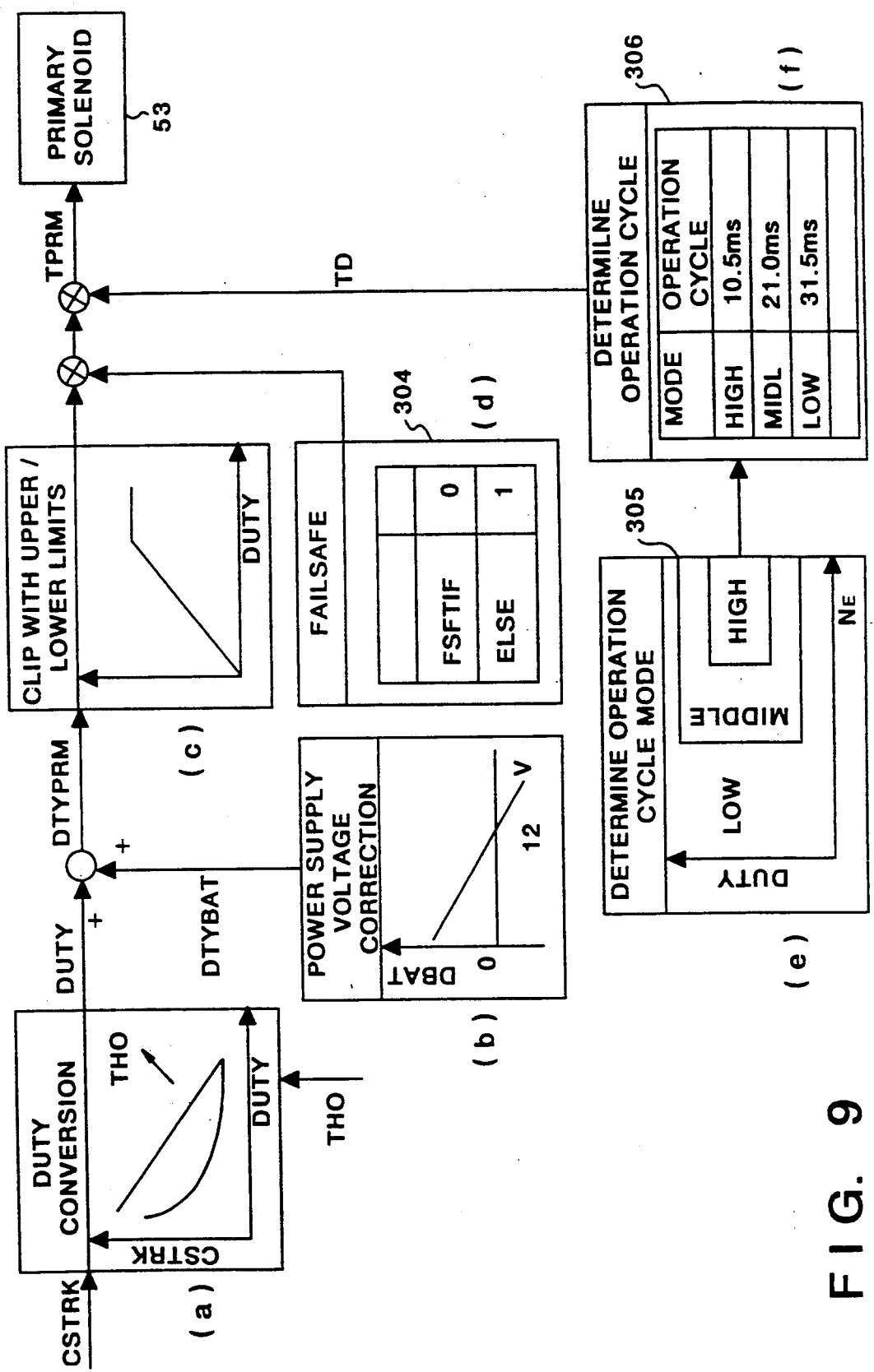
FIG. 9 is a schematic diagram illustrating a method of controlling the operation cycle of a duty solenoid.

FIG. 9 illustrates the above-described control.

Since the controls to be respectively applied to the above-described three solenoids are the same, the duty conversion for the solenoid 52 will be described. First, signal CSTRK is converted into the duty referring to FIG. 9 (a). When oil temperature THO is high, output duty is set to be a relatively large value. Referring to FIG. 9 (b), the duty is subjected to the correction of the battery power supply voltage. Then, referring to FIG. 9 (c), the upper and the lower limits are clipped before the fail-safe process is performed in step 304 of FIG. 9 (d), wherein XSFT1F is a flat for storing the generation of the fail safe status. The fail safe is a control performed so as to overcome a fail including the above-described abnormal gear change.

On the other hand, the mode of the operation cycle for the solenoid is, referring to step 305 of FIG. 9 (e), set in accordance with engine revolution NE and DUTY obtained referring to FIG. 9 (a). According to this embodiment, the cycle mode is arranged to be LOW, MIDDLE and HIGH by determining the zone. Then, referring to step 306 of FIG. 9 (f), the operation cycle is determined to any of 10.5 ms (LOW), 21.0 ms (MIDDLE) and 31.5 ms (HIGH) in accordance with the zone determination. As described above, according to the first embodiment, the duty control is performed in a manner such that operating frequency is controlled in accordance with engine revolution $N_E$ and duty value.

The reason why the frequency control method is employed lies in that the arrangement in which the duty ratio is varied while making the frequency constant will cause the pulsation to easily influence the pump output. According to this embodiment, the operation frequency is arranged to be higher proportional to the quantity of discharge from the hydraulic pump 40. The reason for this lies in that the operation cycle is shortened so as to reduce the ripple since the more the discharge quantity becomes the larger the amplitude of the oil pulsation becomes.

Control Procedure

Thus the line pressure in the hydraulic control apparatus and the duty solenoid in the hydraulic circuit are controlled in the stepless transmission including a torque converter having a lockup. The above-described control may be performed by a digital computer or a analog computer. Then, the procedure of the above-described control performed by a digital computer will be described with reference to FIGS. 10 through 14.

MAIN PROCEDURE

Figure 10:
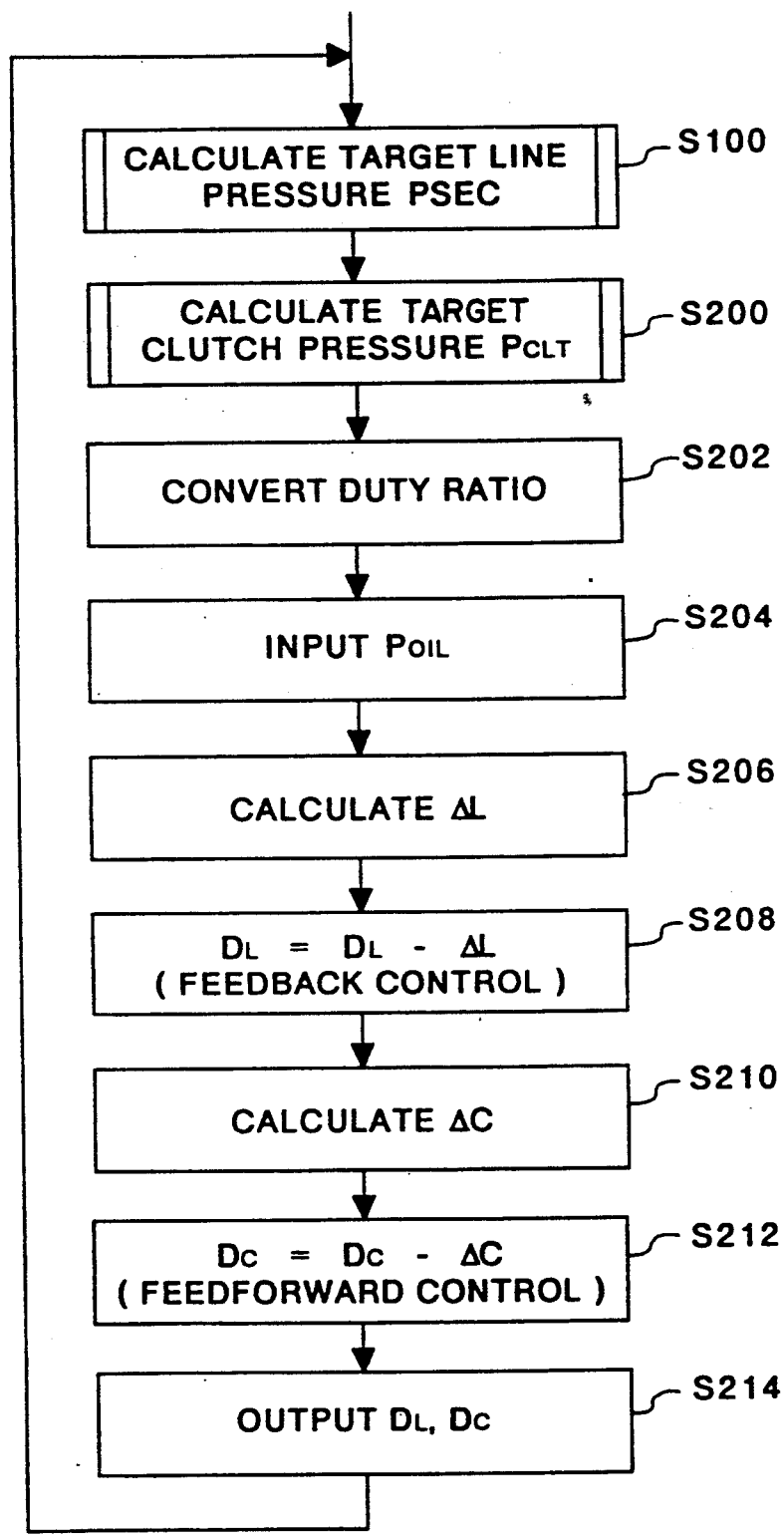
FIG. 10 is a flow chart which illustrates the overall control procedure according to an embodiment of the present invention.

FIG. 10 is a flow chart which illustrates the overall procedure of the control. In step S100, target value PSEC of the line pressure at the line 101 to be supplied to the secondary chamber is calculated. As for details of this calculation, see FIG. 12. In step S200, target value $P_{CLT}$ of the clutch pressure at which the pressure supplied to the forward/reverse clutch chamber is restored to the original pressure is calculated. The target value $P_{CLT}$ of the clutch pressure is determined in accordance with the torque to be supplied via the torque converter and is determined to be the value which corresponds to TQTRBN (step S122) of a line pressure control procedure (see FIG. 12) to be described later. In step S202, PSEC and PCLT are respectively converted into target duty ratios $D_L$ and $D_C$ in consideration of oil temperature THO or the like in accordance with, for example, the characteristics shown in FIG. 12. In step S204, oil temperature $P_{OIL}$ necessary to perform the feedback control is read from the sensor 89. In step S206, control quantity $\Delta_L$ in the feedback control with respect to duty value $D_L$ is calculated from the difference between target value PSEC and $P_{OIL}$ as follows:

$$\Delta_L = k \cdot (PSEC - P_{OIL})$$

In step S208, $D_L$ is corrected in accordance with the following equation:

$$D_L = D_L - \Delta_L$$

Figure 13A:
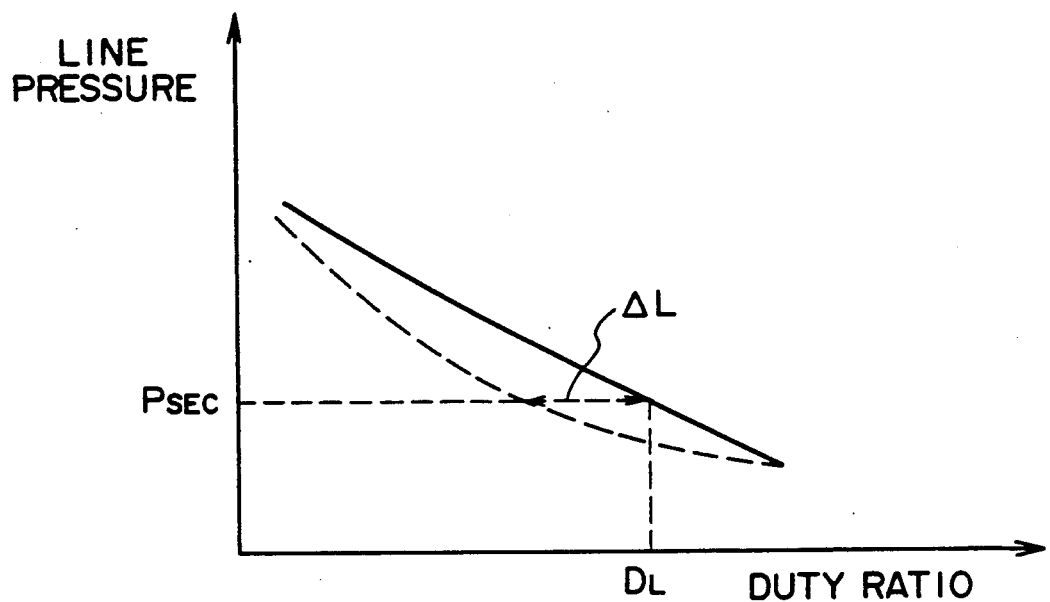
FIGS. 13A and 13B are graphs illustrating the correspondence between a feedback control and a forward control.
Figure 13B:
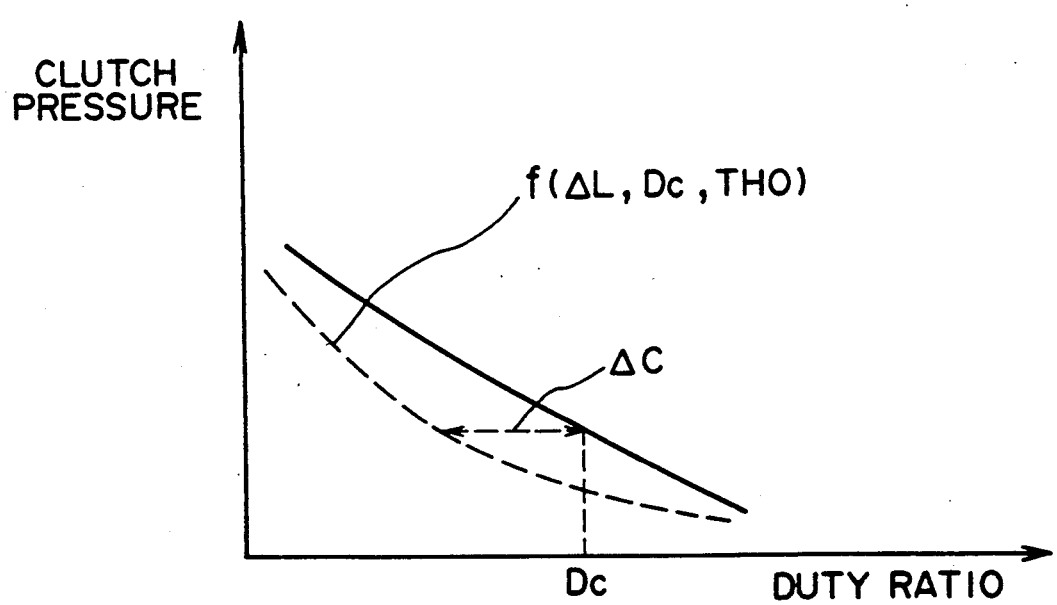

In step S210, correction quantity $\Delta_C$ with respect to duty $D_C$ of the clutch pressure is calculated from the map shown in FIG. 13B and in accordance with feedback control quantity $\Delta_L$ for the line pressure and target clutch pressure $P_{CLT}$ before the flow advances to step S212 in which the duty value which corresponds to the final clutch pressure is calculated in accordance with the following equation:

$$D_C = D_C - \Delta_C$$

In step S214, thus obtained duty values $D_L$ and $D_C$ are respectively transmitted to the solenoids 51 and 53.

CALCULATION OF PSEC

Prior to the description of the meaning of the control shown in steps S204 through S212, the procedure of the calculations for obtaining target line pressure PSEC performed in step S100 will be described referring to FIG. 12.

Figure 12:
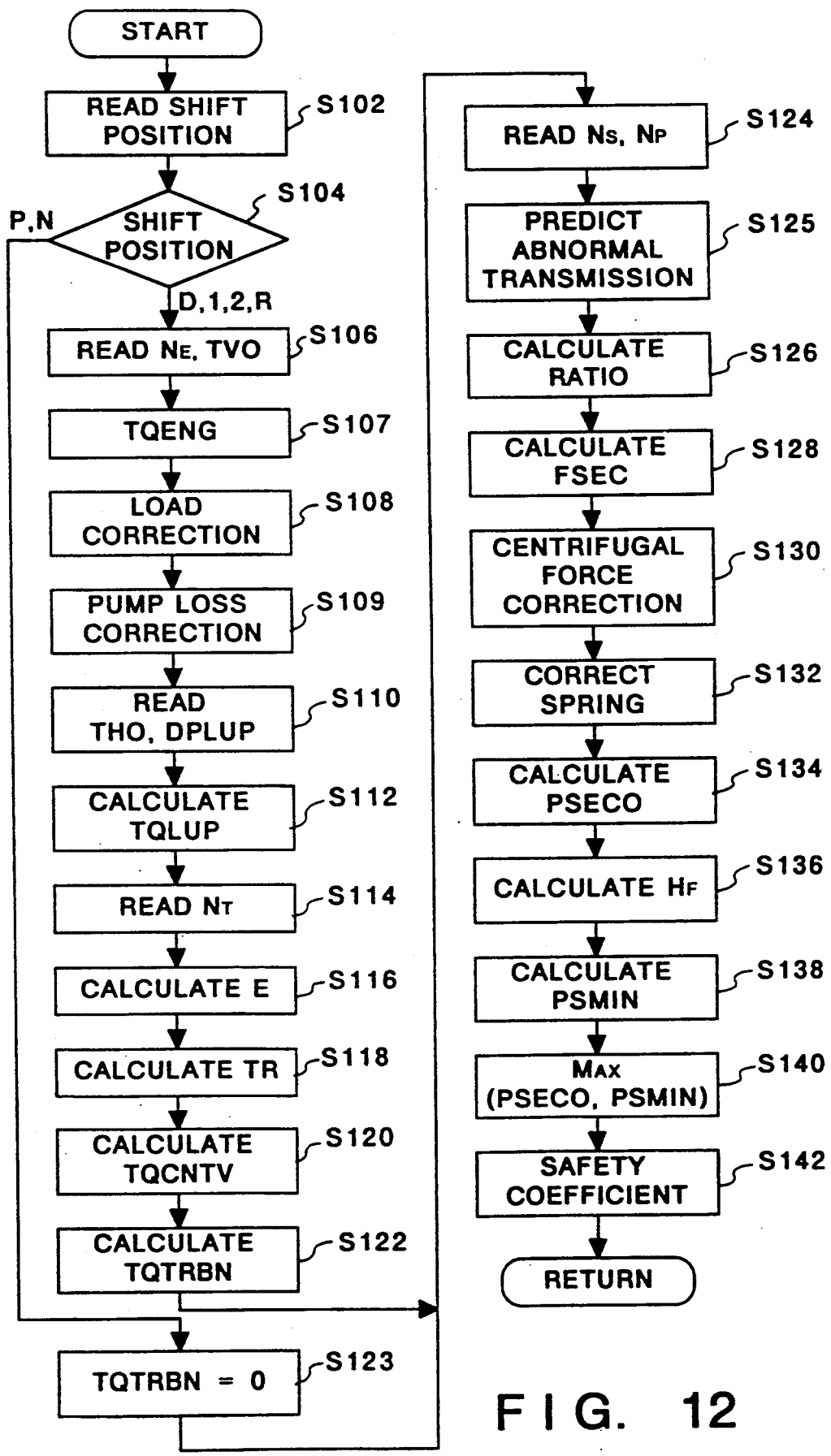
FIG. 12 is a flow chart which illustrates a line pressure control in detail.

Referring to FIG. 12, shift position signal RANGE is read from the sensor 82 in step S102. In step S104, when the shift position is at P or N, the transmission is not operated. Therefore, turbine torque TQTRBN is, in step S123, made to be "0" before the flow advances to step S124.

When the shift position is at any of D, 1, 2 or R, the flow advances to step S106 in which engine revolution $N_E$ and throttle opening degree TVO are read from the corresponding sensors 86 and 85. In step S107, engine torque TQENG is calculated in accordance with $N_E$ and TVO and the like and by a manner shown in FIG. 7A (a). In step S108, the load is corrected in accordance with the procedure shown in FIG. 7A (b) before the torque loss in the oil pump is corrected in step S109. As a result, engine output torque TQPUMP is obtained.

In step S110, oil temperature THO is read from the sensor 88, and initial value DPINT of the differential pressure of the lockup clutch is calculated in accordance with TQPUMP and by a procedure shown in FIG. 7B (a). In accordance with initial value DPINT, differential pressure DPLUP is calculated in the control in which the primary side duty is calculated as described above. Then, Lockup clutch transmission ratio $H_{LU}$ is calculated from DPLUP in accordance with the procedure shown in FIG. 7B (b). In step S112, lockup clutch transmission torque TQLUP is calculated in accordance with thus obtained DPLUP and HLU, that is, the same is calculated as follows:

$$TQLUP = DPLUP \cdot H_{LU}$$

In step S114, turbine revolution $N_T$ of the torque converter is read from the sensor 87. In step S116, speed ratio E is obtained from the following equation:

$$E = \frac{N_T}{N_E}$$

where symbol $N_T$ is equivalent to $N_P$ (or $N_P \times KLRRT$) shown in FIG. 7B (e). In step S118, torque ratio TR is calculated as described with reference to FIGS. 7B (d) and 7B (e). Then, in step S120, converter transmission torque TQCNVT is calculated, that is, the same is calculated as follows:

$$TQCNVT = (TGPUM - PTQLU) \cdot TR$$

Then, in step S122, composite torque TQTRBN of the transmission torque TQLUP via the lockup clutch and transmission torque TQCNVT via the converter are calculated, that is, $$TQTRBN = TQLUP + TQCNVT$$

The thus composite torque TQTRBN is subjected to the planetary reduction ratio correction so as to make the result to be TQIN.

In step S124, secondary pulley revolution $N_S$ and primary pulley revolution $N_P$ are read from sensors 84 and 83. In step S125, the abnormal gear change is detected/controlled in a manner shown in a flow chart shown in FIG. 14. In step S126, change ratio RATIO ($= N_P/N_S$) is calculated. In step S128, force FSEC necessary to abut the pulley is calculated from TQIN and RATIO as described with reference to FIG. 7C (a). In steps S130 and S132, the centrifugal correction and the spring correction are performed in accordance with the procedures shown in FIGS. 7C (c) and 7C (d) so that line pressure PSECO is obtained in step S134, PSECO being the piston pressure on the secondary pulley side.

Since PSECO is sometimes reduced below the minimum line pressure due to the centrifugal correction, lowest line pressure PSMIN which corresponds to the current change ratio or the like is calculated in accordance with the following procedure. That is, in step S136, pulley abutting force ratio $H_F$, is calculated in accordance with Equation (3). Then, in step S138, lowest line pressure PSMIN necessary for the gear change is calculated in accordance with Equation (4). In step S140, PSECO or PSMIN which is relatively larger is then selected. In step S142, the correction with safety factor $K_{SF}$ is corrected in accordance with a procedure shown in FIG. 7C (h).

The thus selected PSECO or PSMIN which has been determined to be relatively larger becomes target line pressure PSEC in step S100. The thus obtained PSEC is converted into duty ratio $D_L$ in step S202 before it is subjected to the feedback control in accordance with actual line pressure $P_{OIL}$ in steps S204 through step S208 as described above.

FIG. 13A illustrate a status in which duty ratio DL which corresponds to target line pressure PSEC is corrected by $\Delta_L$ in the feedback control. The quantity $\Delta_L$ is automatically determined when the conduit resistance and the characteristics of the solenoid 51 which controls the line pressure adjustment valve 41 have been determined. Also the clutch pressure control performed at the clutch valve 46 is performed on the basis of the line pressure adjustment valve 41. That is, line pressure PSEC and clutch pressure $P_{CLT}$ are closely related to each other and their relationship can be previously known. Namely, $\Delta_C$ closely relates to $\Delta_L$.

FIG. 13B illustrates a status $\Delta_C$ is obtained in accordance with feedback control quantity $\Delta_L$, target clutch pressure $P_{CLT}$ and oil temperature THO. Referring to FIG. 13B, a dashed line for obtaining $\Delta_C$ is the function of feedback control quantity $\Delta_L$, target clutch pressure $P_{CLT}$ and oil temperature THO. Thus, the clutch pressure is subjected to the precise feedback control at substantially the same accuracy realized in the feedback control performed in accordance with the sensor 89 which measures the line pressure supplied to the secondary chamber. That is, the number of hydraulic pressure sensors can be reduced to one.

FAIL-SAFE CONTROL AGAINST ABNORMAL GEAR CHANCE

Then, the procedures in step S125 shown in FIG. 12 will be described with reference to FIG. 14.

Figure 14:
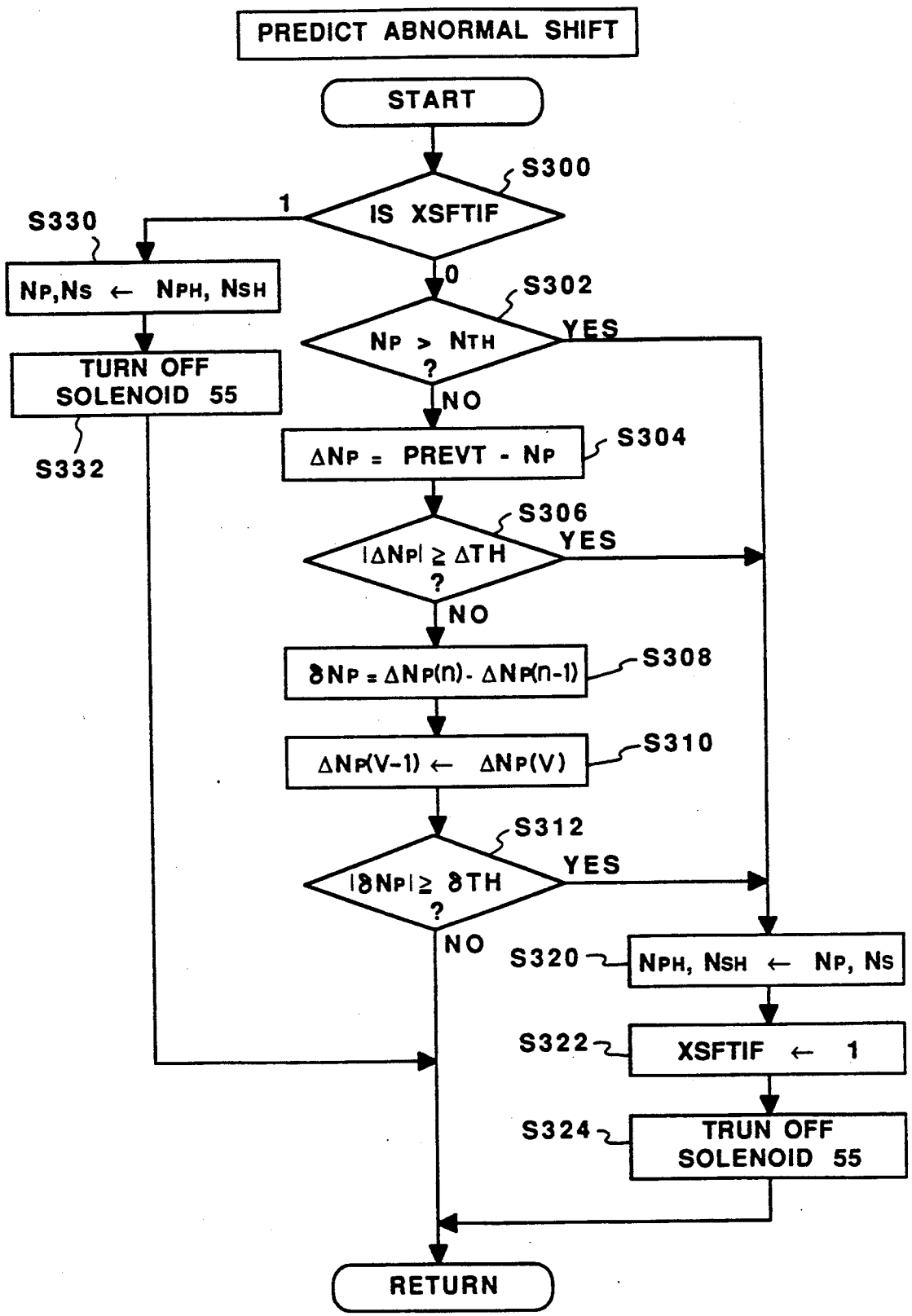
FIG. 14 is a flow chart which illustrates the procedure for detecting abnormal gear change and prevention control.

When pulley revolutions $N_S$ and $N_P$ are obtained by the sensor in step S124 shown in FIG. 12, the procedure to be performed in step S300 shown in FIG. 14 is executed. In step S300, the status of setting flag XSFT1F for storing the fail status is checked. If no failure has been taken place, the flag is zero, causing the flow to be shifted to step S302. In steps S302 through S312, the above-described three types of abnormal gear changes generated are detected.

In step S302, the abnormally excessive revolution $N_P$ is detected. That is, in the following case, it is determined that the failure has taken place:

$$N_P \geq N_{TH}$$

In step S304, the deviation from target primary revolution PREVT of primary revolution $N_P$ is calculated as follows:

$$\Delta N_P = PREVT - N_P$$

In step S306, when the absolute value of the deviation holds the following relationship:

$$|\Delta N_P| \geq \Delta_{TH}$$

a determination is made that the abnormal gear change has taken place. In step S308, change ratio of deviation $\Delta N_P$ is calculated as follows:

$$\delta N_P = \Delta N_P(n) - \Delta N_P(n-1)$$

In step S310, present $\Delta N_P(n)$ is saved as $\Delta N_P(n-1)$ so as to prepare for the next detection operation. In step S312, it is determined whether or not the following relationship is held:

$$|\delta N_P| \geq \delta_{TH}$$

If the above-described relationship is held, a determination is made that the abnormal gear change has been taken place. If all of the above-described three determinations have been made affirmatively, a determination is made that the abnormal gear change has taken place. If all of the above-described three determinations have been made negatively, the abnormal gear change has not taken place. Therefore, the flow returns to step S126 in the original flow chart shown in FIG. 12.

If any of the above-described three determinations is made affirmatively, the flow advances to step S320 in which present pulley revolutions $N_S$ and $N_P$ are stored as $N_{PH}$ and $N_{SH}$. In step S322, fail flag XSTF1F is then set. In step S324, the solenoid 55 is turned off. As described above with reference to FIG. 1, when the solenoid 55 is turned off, the primary chamber 27 is closed, causing the present change ratio to be forcibly maintained. The flow returns to step S126 shown in FIG. 12 from the flow chart shown in FIG. 14, the above-described control procedure is repeated. In step S126, pulley revolution $N_S$ and $N_P$ at the time when the gear change was detected are used to calculate RATIO. Since the above-described pulley revolutions are the revolutions when the abnormal gear change was first detected, they can be used to calculate RATIO since the value does not show the runaway.

When fail flag XSTF1F is set in step S322, revolutions $N_P$ and $N_S$ at that time are held as $N_{PH}$ and $N_{SH}$ in step S320. The flow then advances from step S300 to step S330, $N_{PH}$ and $N_{SH}$ saved in step S320 are afterwards used as pulley revolutions $N_P$ and $N_S$. Furthermore, the status in which the solenoid 55 is turned off is maintained in step S332.

Then, thresholds $N_{TH}$, $\Delta_{TH}$ and $\delta_{TH}$ are determined so as to serve as the subject of the comparisons made in steps S302, S306 and S312. The above-described values must be in a range with which the generation of a failure can be detected. If the values are respectively determined to be small values in order to improve the detection sensitivity, an erroneous detection takes place. If the values are respectively determined to be large values, the detection cannot be performed quickly, causing the values of $N_P$ and $N_S$ to meet the specifications in step S330. Therefore, the thresholds are determined in consideration of the above-described conditions.

Thus, the excessive rotation of the engine can be prevented according to the first embodiment. According to the first embodiment, a case in which the change ratio control valve has become sticky is assumed to be an example of the abnormal gear change, and the failure status of this type is detected as the abnormality of revolution $N_P$ of the primary pulley. Furthermore, if the abnormal gear change has been detected, the change ratio fixing valve is operated so as to forcibly fix the change ratio regardless of the status of the setting of the change ratio control valve. The above-described change ratio fixing valve is disposed between the hydraulic operation chamber for the primary pulley and the change ratio control valve.

SECOND EMBODIMENT

According to a second embodiment, the change ratio fixing valve is disposed on the drain passage for the change ratio control valve. When a failure of generation of excessive rotation of the engine due to a failure of the hydraulic circuit or that due to the response delay of the control system or the hydraulic system is detected, the above-described fixing valve closes the drain passage so that the spool position of the change ratio control valve is fixed. As a result, the excessive rotation of the engine can be prevented by fixing the change ratio.

FIG. 15 illustrates the specific structure of the stepless transmission according to the second embodiment of the present invention. Referring to this drawing, the stepless transmission basically comprises a torque converter B connected to the output shaft 1 of an engine (not shown), a forward/reverse switch mechanism C, a stepless transmission mechanism Z, a reduction mechanism E and a differential mechanism F.

TORQUE CONVERTER B

The torque converter B comprises a pump cover 7 connected to an engine output shaft 1, a pump impeller 3 secured to an end portion of the pump cover 7 so as to integrally rotate with the engine output shaft 1, a turbine runner 4 rotatably disposed on the inside of the pump cover 7 so as to confront the pump impeller 3, a stator 5 disposed between the turbine runner 4 and the pump impeller 3 so as to enlarge the torque and a turbine shaft 2 secured to the turbine runner 4. The stator 5 is connected to a mission case via a one-way clutch 8 and a stator shaft 9. A lockup piston 6 arranged in a manner such that it can slide on the turbine shaft 2 is disposed between the turbine runner 4 and the pump cover 7. When hydraulic pressure is introduced/discharged from a lockup locking chamber 7a and a lockup unlocking chamber 10 formed on the two sides of the lockup piston 6, the lockup piston 6 and the pump cover 7 are connected and disconnected.

FORWARD/REVERSE SWITCH MECHANISM C

The forward/reverse switch mechanism C comprises single pinion type planetary gear mechanism in order to reduce the size. That is, it comprises a carrier 15, a pinion gear 13 supported by the carrier 15 and a sun gear 12 connected to a primary shaft 22 of a stepless transmission mechanism Z in a spline manner, to be described later, and arranged to engage to the pinion gear 13. The forward/reverse switch mechanism C further comprises a ring gear 11 arranged to engage to the pinion gear 13, the ring gear 11 being connected to the turbine shaft 2 of the torque converter B in a spline manner. Furthermore, a forward clutch 16 for connecting/disconnecting the ring gear 11 and the carrier 15 is disposed between the ring gear 11 and the carrier 15. In addition, a reverse brake 17 for selectively fixing the carrier 15 to the mission case 7 is disposed between the carrier 15 and the mission case 7. As a result, in the forward range in which the forward clutch 16 is connected and the reverse brake 17 is disconnected, the ring gear 11 and the carrier 15 are connected to each other in a manner such that they can integrally rotate. Therefore, the rotation of the turbine shaft 2 is as it is transmitted to the primary shaft 22 of the stepless transmission mechanism Z. On the other hand, in the reverse range in which the reverse brake 17 is connected and the forward clutch 16 is disconnected, the carrier 15 is fixed to the case 7 in a manner such that it cannot be rotated. As a result, the rotation of the ring gear 11 is transmitted to the sun gear 12 via the pinion gear 13 and the like. Therefore, the rotation of the turbine shaft 2 is reversed and transmitted to the primary shaft 22 of the stepless transmission mechanism Z. When both the forward clutch 16 and the reverse brake 17 are disconnected, the rotational force of the engine is not transmitted from the turbine shaft 2 to the primary shaft 22 of the stepless transmission mechanism Z (neutral or parking state).

STEPLESS TRANSMISSION MECHANISM Z

The stepless transmission mechanism Z comprises a primary pulley 21 serving as a drive pulley, a secondary pulley 31 serving as a conventional pulley and a V-belt 20 arranged between the two pulleys 21 and 31.

The primary pulley 21 comprises a primary shaft 22 coaxially disposed on the turbine shaft 2, a fixed conical plate 23 secured to the primary shaft 22 and a movable conical plate 24 supported by the primary shaft 22 in a manner such that it can slide. When the movable conical plate 24 is moved, the position at which the V-belt 20 is held is shifted, causing the effective pitch diameter to be changed. That is, when the movable conical plate 24 approaches the fixed conical plate 23, the effective pitch diameter is enlarged. When the movable conical plate 24 is moved away from the fixed conical plate 23, the effective pitch diameter is reduced.

The secondary pulley 31 is basically structured similarly to the primary pulley 21. That is, the secondary pulley 31 comprises a secondary shaft 32 disposed to run parallel to the primary shaft 22, a fixed conical plate 33 secured to the secondary shaft 32 and a movable conical plate 34 supported by the same in a manner such that it can slide. When the movable conical plate 34 is moved, the effective pitch diameter is changed.

Furthermore, hydraulic cylinders 25 and 35 for sliding the corresponding movable conical plates 24 and 34 are disposed behind the movable conical plates 24 and 34 for the pulleys 21 and 31. In order to change the change ratio between the two pulleys 21 and 31, hydraulic pressure is introduced/discharged into a hydraulic cylinder 25 of the primary pulley 21. On the contrary, hydraulic pressure is introduced/discharged from a hydraulic cylinder 35 of the second pulley 31 in order to maintain the tension of the V-belt at a proper value. When hydraulic pressure is introduced into the hydraulic cylinder 25 of the primary pulley 21, the position in the primary pulley 21 at which the V-belt 20 is held is moved outwards. As a result, the effective pitch diameter of the primary pulley 21 is enlarged and as well as the position in the secondary pulley 31 at which the V-belt 20 is held is moved inwards. As a result, the effective pitch diameter of the secondary pulley 31 is reduced. Therefore, the change ratio between the primary shaft 22 and the secondary shaft 32 is reduced (changed in a direction in which the speed is raised). When hydraulic pressure is discharged from the hydraulic cylinder 25, the effective pitch diameter of the primary pulley 21 is reduced and as well as the effective pitch diameter of the secondary pulley 31 is enlarged. As a result, the change ratio between the primary shaft 22 and the secondary shaft 32 is enlarged (changed in a direction in which the speed is reduced).

The structure of the hydraulic cylinder 25 for the primary pulley 21 will be specifically described. The hydraulic cylinder 25 comprises a first hydraulic pressure chamber 27a formed on the rear side of the movable conical plate 24, a movable piston 26 for abutting the rear end portion of a member 27c connected to the outer end portion of the movable conical plate 24 and a second oil chamber 27b formed on the rear side of the movable piston 26. As a result, hydraulic pressure is supplied to the first and second oil chambers 27a and 27b so that the movable conical plate 24 is moved to the right when viewed in FIG. 15.

The hydraulic cylinder 35 of the secondary pulley 31 is structured similarly by a first oil chamber 37a formed on the rear side of the movable conical plate 34, a movable piston 36 for abutting the rear end portion of a member 37c connected to the outer end portion of the movable conical plate 34, a second oil chamber 37b formed on the rear side of the movable piston 36 and a spring 37d accommodated in the second oil chamber 37b while being contracted in this chamber 37b so as to urge the movable piston 36. When hydraulic pressure is supplied to the first and second oil chambers 37a and 37b, the movable conical plate 34 is moved to the left when viewed in FIG. 15.

The total pressure receiving area of the first and second oil chambers 27a and 27b of the hydraulic cylinder 25 of the primary pulley 21 is arranged to be two times the total pressure receiving area of the first and second oil chambers 37a and 37b of the hydraulic cylinder 35 of the secondary pulley 31.

The reduction mechanism E and the differential mechanism F are arranged to have known structures so that the rotation of the secondary shaft 32 is transmitted to a wheel shaft 6.

Thus, the stepless transmission according to the second embodiment is structured similarly to that according to the first embodiment.

HYDRAULIC CIRCUIT

Then, a hydraulic circuit for controlling the operation of each of the lockup piston 6 of the torque converter B, the forward clutch 16 of the forward/reverse switch mechanism C and the reverse brake 17 of the stepless transmission, and the primary pulley 21 and the secondary pulley 31 of the stepless transmission mechanism Z will be described with reference to FIG. 16.

The hydraulic circuit comprises a large-capacity oil pump 810 arranged to be operated by the engine (not shown). The oil supplied from the oil pump 810 is adjusted to a predetermined line pressure by a line pressure adjustment valve 820. Then, it is supplied, as operation pressure, to the hydraulic cylinder 35 of the secondary pulley 31 via a line 121. Furthermore, the same is supplied to the hydraulic cylinder 25 of the primary pulley as the final operating pressure via a line 122 which is allowed to branch from the line 121.

The line pressure adjustment valve 820 comprises a spool 828 composed of a main spool 821 and a sub-spool 822 disposed in series. The main spool 821 and the sub-spool 822 constituting the spool 828 are connected in a manner such that an end portion of the sub-spool 822 is positioned in contact with an end portion of the main spool 821. A larger-diameter portion 822a the cross sectional area of which is larger than the area of contact (the cross sectional area of the connection portion) with the main spool 821, is formed in another end portion of the sub-spool 822. In a portion corresponding to the central portion of the main spool 821, a governing port 823 into which oil from the oil pump 810 is introduced and a drain port 824 which communicates to the suction side of the oil pump 810 are disposed. Therefore, when the main spool 821 is shifted to the left when viewed in the drawing, the communication between the governing port 823 and the drain port 824 is cancelled. When the main spool 821 is shifted to the right when viewed in the drawing, the communication between the governing port 823 and the drain port 824 is cancelled. When the main spool 821 is shifted to the right when viewed in the drawing, the communication between the governing port 823 and the drain port 824 is established. At a position which corresponds to the position at which the main spool 821 and the sub-spool 822 are connected to each other, a first pilot chamber 825 is formed. In the first pilot chamber 825, a spring 826 for urging the main spool 821 to the left when viewed in the drawing is interposed. In the larger-diameter portion 822a of the sub-spool 822, a second pilot chamber 827 which communicates with the first pilot chamber 825 is formed.

Thus, controlling pressure the level of which has been adjusted by a first duty solenoid 910 during its passage through a pilot passage 123a acts on the first and the second pilot chambers 825 and 827, the controlling pressure being supplied from a line 123 after its level has been reduced to a predetermined level by a reducing valve 830. The above-described controlling pressure acts in the same direction as the direction in which the urging force of the spring 826 acts. Furthermore, hydraulic pressure in the line 121 acts, against the urging force and the control pressure, on the other end portion of the main spool 821. As a result of the thus established relationship of the force, the spool 828 is shifted so as to communicate/cancel the communication between the governing port 823 and the drain port 824. Therefore, the line pressure is controlled to a level which corresponds to the controlling pressure the level of which is controlled by the first duty solenoid valve 910.

In the line 122, that is, in the hydraulic operating fluid passage which communicates with the oil chambers 27a and 27b of the hydraulic cylinder 25 of the primary pulley 21 and to which the line pressure is thereby supplied, a change ratio control valve 850 is disposed. The change ratio control valve 850 comprises a spool 851, a spring 852 for urging the spool 851 in the right direction when viewed in the drawing, a line pressure port 853 connected to the upper stream portion in the line 122, a drain port 854 to which the drain passage 120 is connected, a reverse port 855 opened on the side on which the spring 852 is disposed and connected to a shift valve 870 via the line 124 and a pilot chamber 856 formed on the opposite side to the side on which the spring 852 is formed and on which the controlling pressure acts. The pilot chamber 856 is connected to a second duty solenoid valve 920 via a pitot valve 860 and to a pitot pressure generation means 900 for generating pressure (pitot pressure) which corresponds to the revolution of the engine A. Therefore, the pitot pressure generated by the pitot pressure generation means 900 or the controlling pressure the level of which has been controlled by the second duty solenoid valve 920 can be selectively caused to act on the pilot chamber 856 by the pitot valve 860. Therefore, if the second duty solenoid valve 920 fails, the pitot pressure can be, as the controlling pressure, introduced from the pitot pressure generation means 900 to the pilot chamber 856.

In the change ratio control valve 850, hydraulic pressure is, via the shift valve 870, drained from the reverse port 855 in a forward mode (when the shift valve 870 is positioned at any of shift positions D, 2 or 1). As a result, the spool 851 is shifted due to the relationship of the controlling pressure acting on the pilot chamber 856 and the urging force of the spring 852. As a result, when the line pressure port communicates with the hydraulic cylinder 25 of the primary pulley 21, hydraulic pressure in the line (hydraulic operating fluid passage) 122 is supplied to the hydraulic cylinder 25. When the line pressure port 853 is closed and the hydraulic cylinder 25 of the primary pulley 21 communicates with the drain port 854, oil in the hydraulic cylinder 25 of the primary pulley 21 is discharged from the drain passage 120 via a pressure maintaining valve 980 to be described later. When the above-described supply/discharge is repeated, the level of the operating pressure acting on the hydraulic cylinder 25 of the primary pulley 21 is controlled in accordance with the controlling pressure acting on the pilot chamber 856 in the forward mode. As a result, the change ratio between the primary pulley 21 and the secondary pulley 31 is varied.

In the reverse mode (when the shift valve 870 is positioned at the shift position R), hydraulic pressure (operating pressure to be described later) from the reverse port 855 is introduced, causing the spool 856 to be fixed while being abutted against the right portion of the drawing. Therefore, the oil in the hydraulic cylinder 25 of the primary pulley 21 is drained from the drain port 854 via the pressure maintaining valve 980 to be described later. As a result, the effective radius of the primary pulley 21 is reduced to the minimum radium so that the change ratio is maintained at the maximum change ratio.

The drain passage 120 which communicates with the drain port 854 of the change ratio control valve 850 has an engine excess rotation prevention valve 150 at a position the upper stream from the pressure maintaining valve 980 to be described later. The engine excess rotation prevention valve 150 comprises a spool 150a and a spring 150b which is disposed at the right portion of the spool 1052 while being contracted so as to urge the spool 150a to the left. The pitot pressure generated in the pitot pressure generation means 900, that is, the pressure which is proportionally raised to the rise in the revolution of the engine A acts on the left side of the spool 150a via the line 151. The urging force of the spring 150b is set to the pitot pressure which is being generated at this time immediately before the engine revolution reaches the excessive rotation. When the engine revolution is less than the predetermined revolution immediately before the same reaches the excessive revolution, the spool 150a moves to the left when viewed in the drawing by the urging force of the spring 150b so that the drain passage 120 is opened. When the engine revolution is about to rise to high revolution exceeding the predetermined revolution which is immediately before the above-described excess rotation, the spool 150a is moved to the right when viewed in the drawing against the urging force of the spring 150b. As a result, the drain passage 120 is closed.

In the neutral and parking mode (when the shift valve 870 is at either the shift position N or P) in which the transmission of the rotational force of the engine A to the wheel shaft 61 is stopped by the forward/reverse switch mechanism C, the same status as that in the reverse mode is realized.

Then, oil in the oil pump 810 and governed by the line pressure adjustment valve 820 is supplied to the line 125 as well as the line 121. The oil supplied to the line 125 is controlled to operating pressure the level of which has been adjusted to a predetermined level by the operating pressure adjusting valve 880 before it is supplied to the lines 126 and 127.

The operating pressure adjusting valve 880 comprises a spool 881, a pilot chamber 882 formed at an end portion of the spool 881, a spring 883 disposed in the pilot chamber 884, a first governing port 883 connected to the line 125, a second governing port 885 connected to the line 127 and a drain port 886. The pilot chamber 882 is, via a pilot passage 123a, connected to the first duty solenoid valve 910. Therefore, the control pressure the level of which has been controlled by the first duty solenoid valve 910 is arranged to act on the pilot chamber 882. The control pressure acts in the same direction as the direction in of the urging force of the spring 883. In addition, hydraulic pressure in the line 125 acts at another end portion of the spool 881 against the urging force and the controlling pressure. As a result of the relationship of the forces, the spool 881 is moved so that the communication established between the first and second governing ports 884 and 885 and the drain port 886 is maintained/cancelled. As a result, the level of the operation pressure to be supplied to the forward clutch 16 and the reverse brake 17 is controlled to the level which corresponds to the level of the controlling pressure controlled by the first duty solenoid valve 910.

The oil from the oil pump 810 supplied to the line 126 is supplied to the hydraulic pressure chamber 16a of the forward clutch 16 of the forward/reverse switch mechanism C via the line 129 when the shift valve 870 is positioned at any of the shift positions D, 2 or 1. When the shift valve 870 is positioned at the shift position R, the same is supplied to the hydraulic pressure chamber 17a of the reverse brake 17 of the forward/reverse switch mechanism C via the line 128. Furthermore, it is supplied to the reverse port 855 of the change ratio control valve 850 via the line 124. On the other hand, the operating fluid in the hydraulic pressure chambers 16a and 17a of the forward clutch 16 and the reverse brake 17 of the forward/reverse switch mechanism C is arranged to be discharged through the lines 129 and 128 when the shift valve 870 is positioned at any of the shift positions R, N or P. Therefore, the forward clutch 16 and the reverse brake 17 of the forward/reverse switch mechanism C are connected/disconnected in accordance with the shift position of the shift valve 870. Furtehrmore, the change ratio of the stepless transmission mechanism Z is maintained at the maximum change ratio at the above-described shift positions R, N and P.

The oil from the oil pump 810 supplied to the line 127 is then supplied the lockup locking chamber 7a or the lockup unlocking chamber 10 of the torque converter B via the lockup control valve 890. The lockup control valve 890 is arranged in a manner such that the operation of its spool 891 is controlled by the controlling pressure the level of which has been controlled by the third duty solenoid valve 930. When the level of the above-described controlling pressure has been reduced, the spool 891 is moved to the right when viewed in the drawing so that the operating fluid is supplied from the line 127 to the lockup locking chamber 7a. Furthermore, the operating fluid in the lockup unlocking chamber 10 is drained. When the level of the controlling pressure has been raised, the spool 891 is moved to the left when viewed in the drawing. As a result, the operating fluid is supplied form the line 127 to the lockup unlocking chamber 10. In addition, the operating fluid in the lockup locking chamber 7a is drained.

Figure 16A:
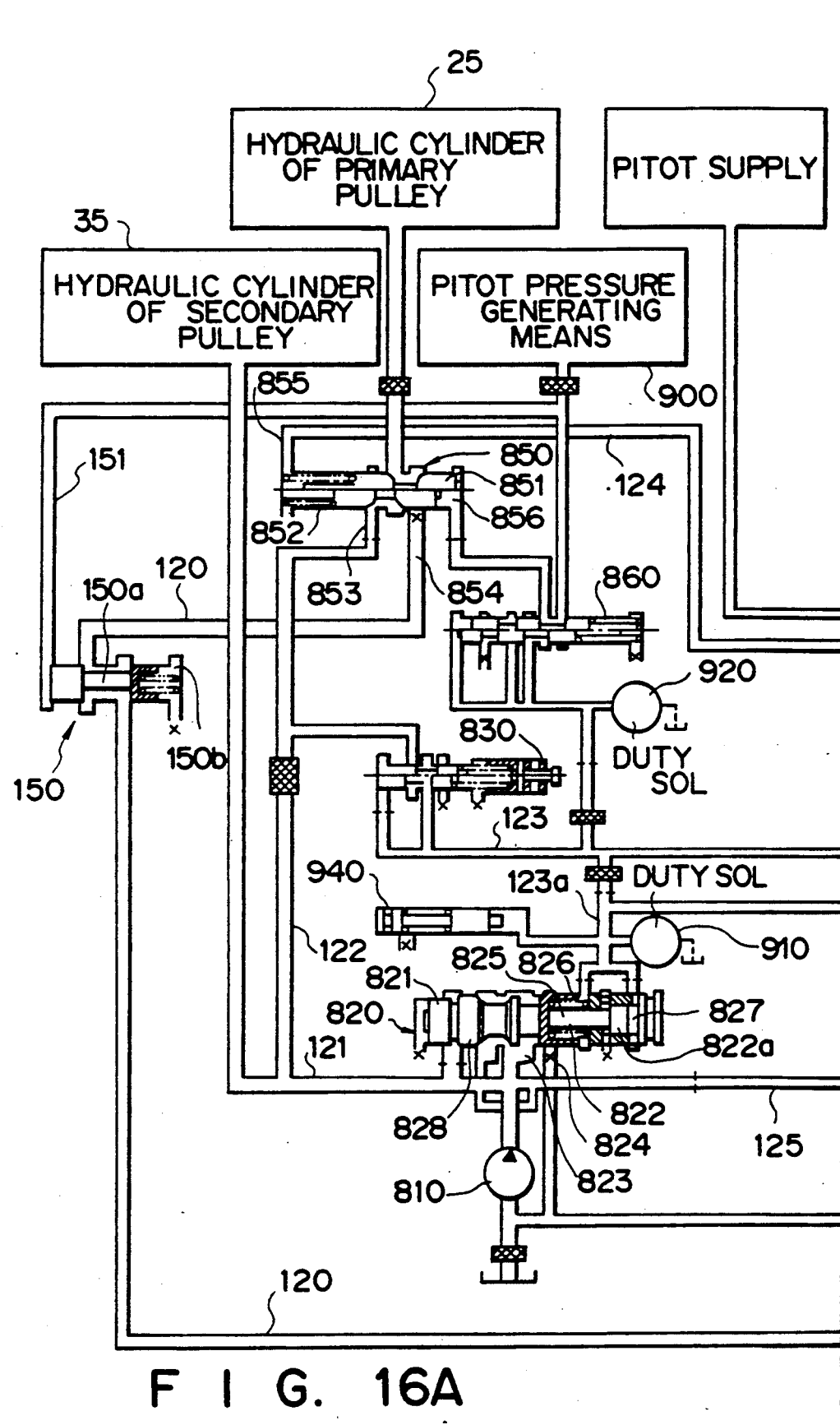
FIGS. 16A and 16B are schematic diagrams illustrating a hydraulic control circuit for the control apparatus according to the second embodiment.
Figure 16B:
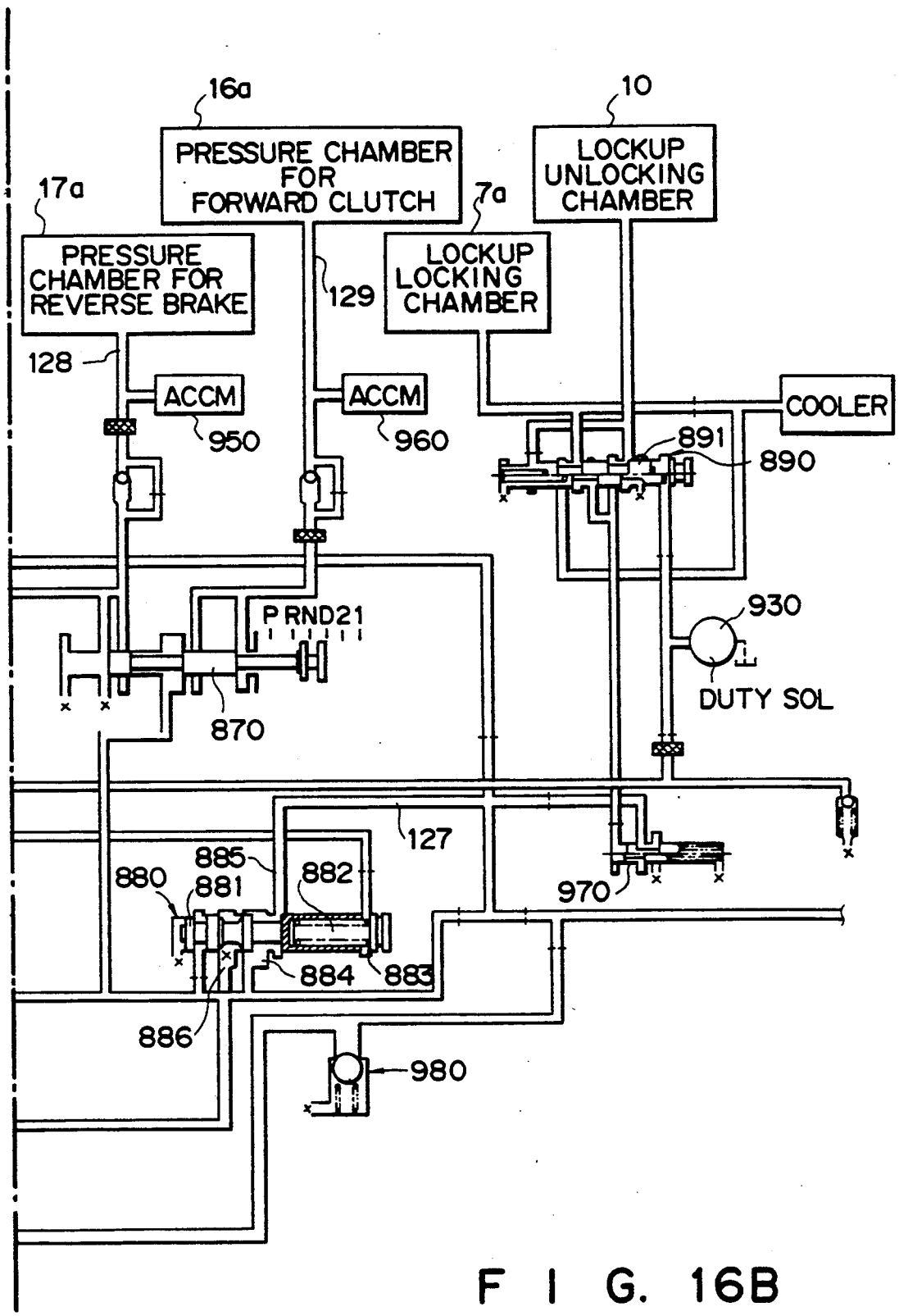
Figure 16B:
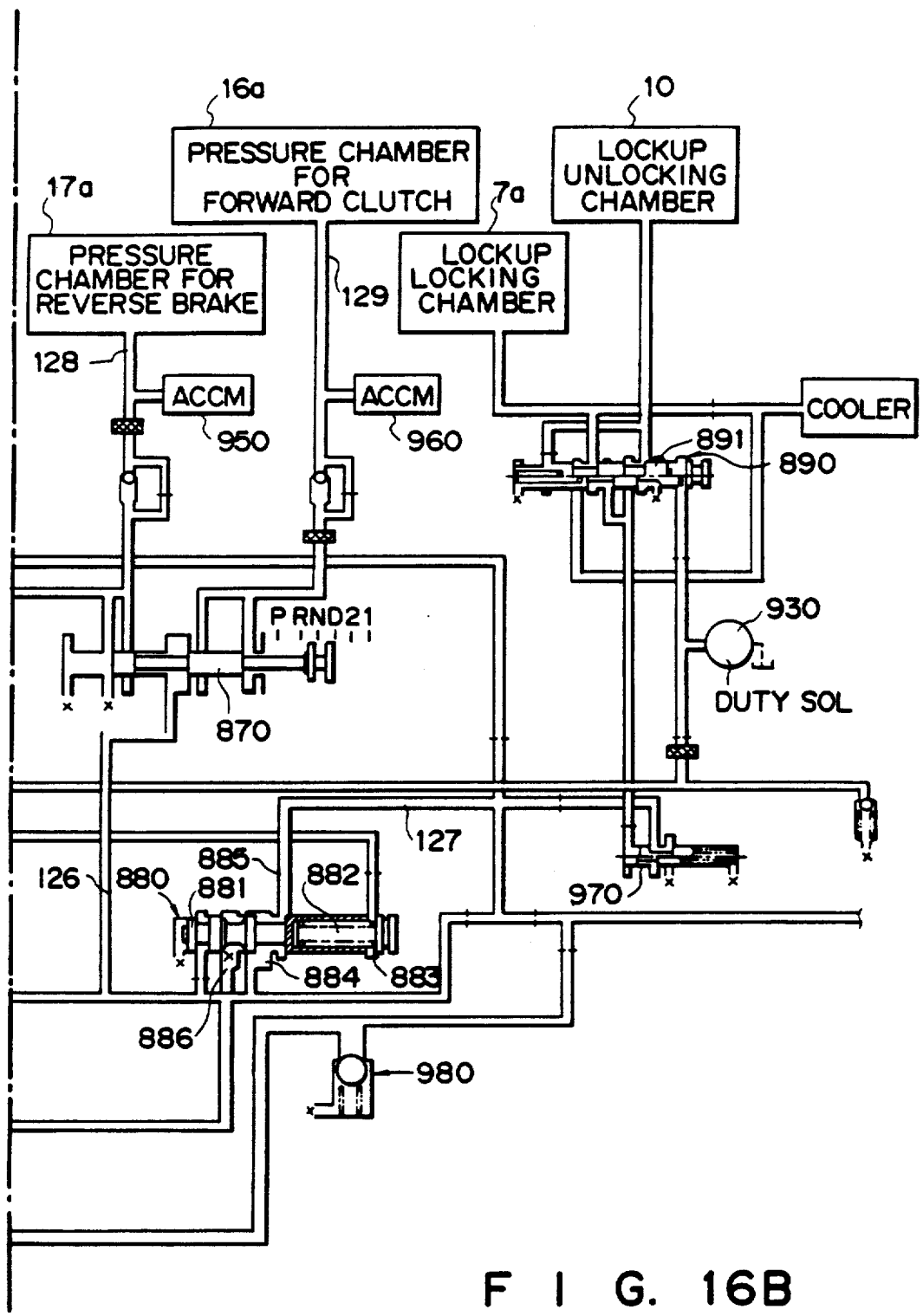

Referring to FIG. 16, reference numeral 940 represents an accumulator valve acting so as to prevent the pilot pressure of the pilot passage 123a from the pulsation when the first duty solenoid valve 910 has been turned on/off. Reference numerals 950 and 960 represent accumulators for absorbing the shock generated at the time when the forward clutch 16 and the reverse brake 17 are connected. Reference numeral 970 represents a relief valve. Reference numeral 980 represents a pressure maintaining valve acting in a manner such that, when oil in the hydraulic cylinder 25 of the primary pulley 21 is drained, all of the oil is not discharged but a portion of the oil with which no abutting force is not generated is left in the hydraulic cylinder 25. Therefore, the responsibility in rising in hydraulic pressure is maintained for the next oil supply operation.

ELECTRIC CONTROL SYSTEM ACCORDING TO SECOND EMBODIMENT

Figure 17:
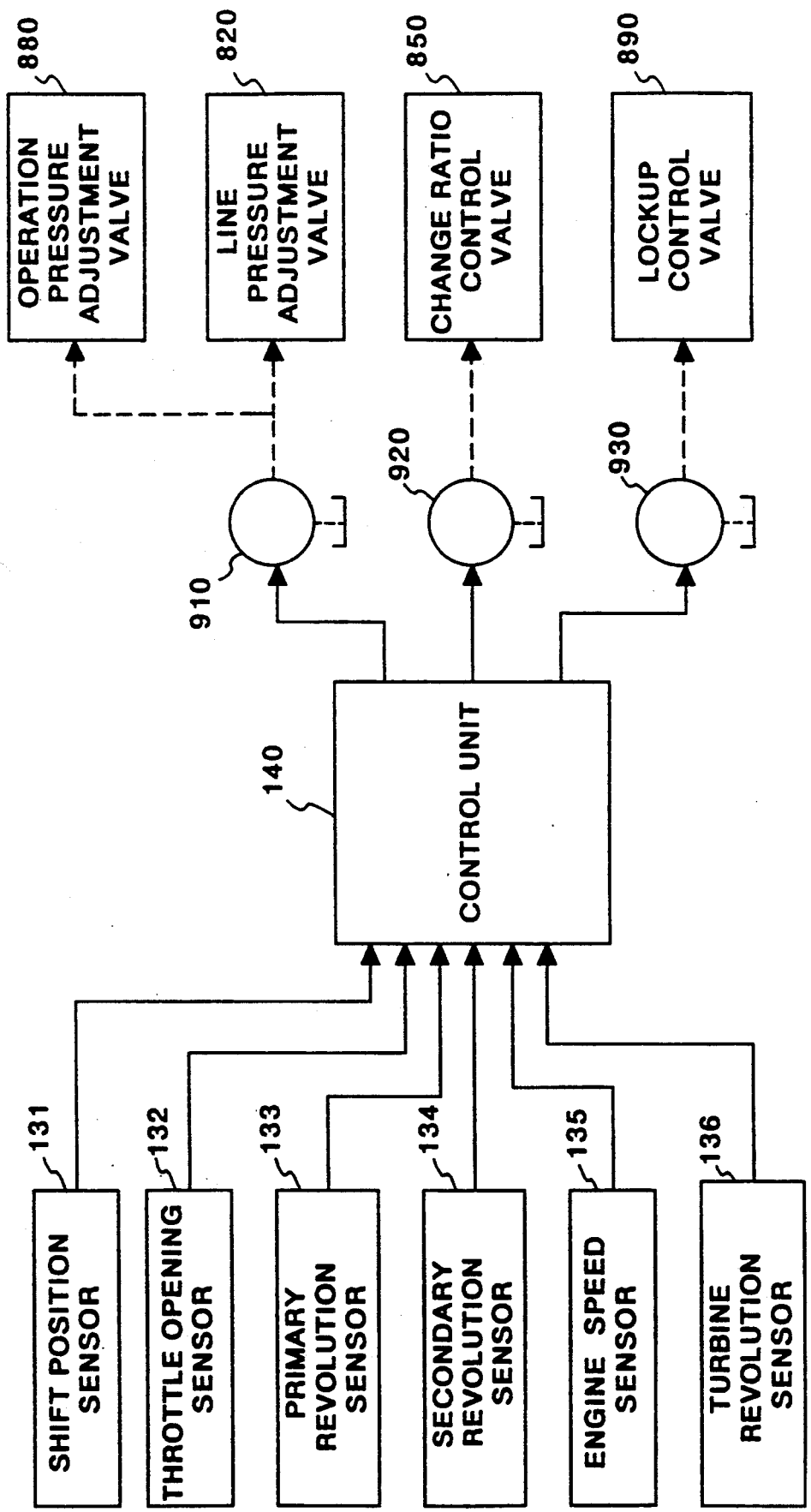
FIG. 17 is a block diagram which illustrates an electric control system for the control apparatus according to the second embodiment.
Figure 3:
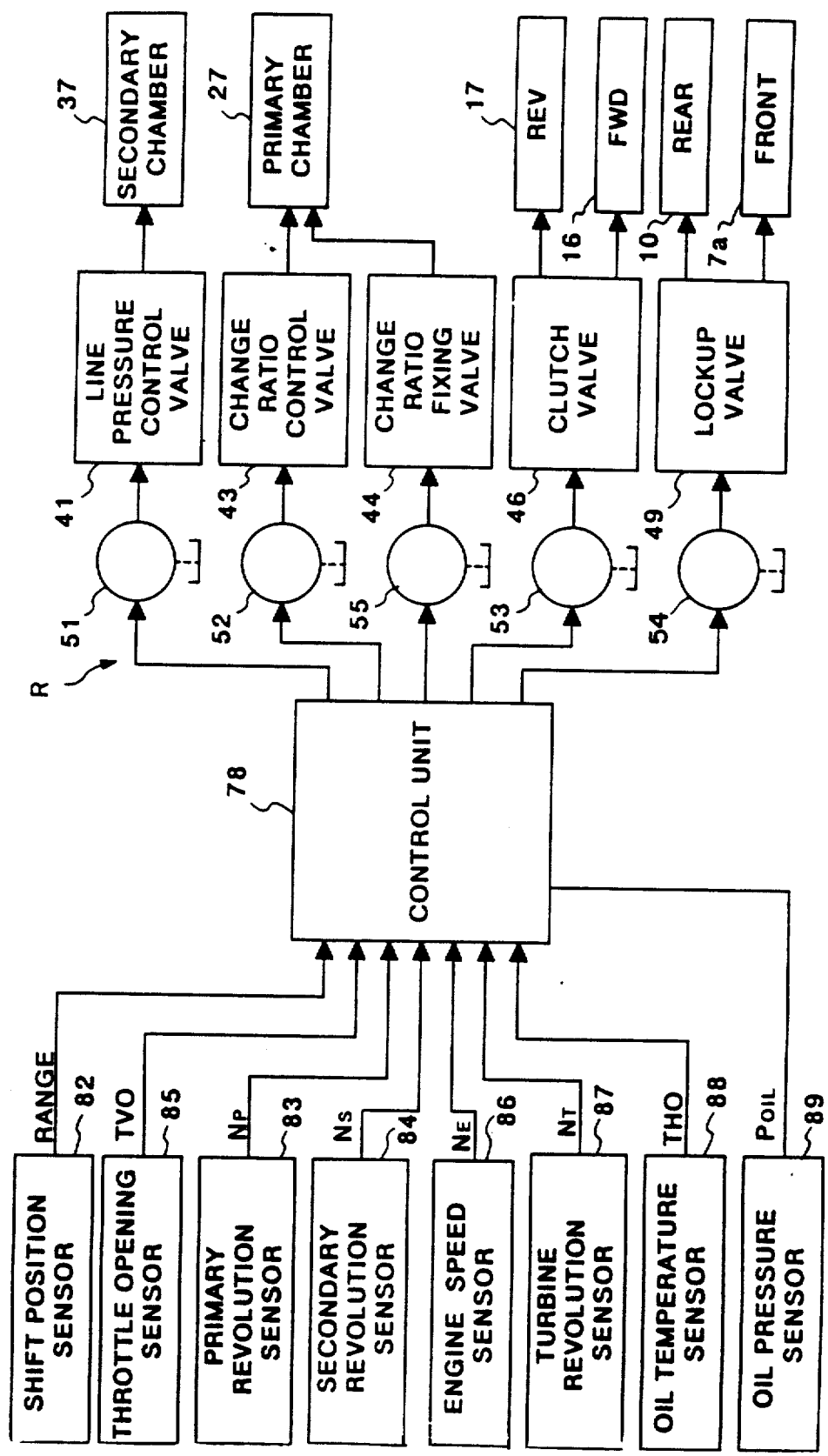
Figure 4A:
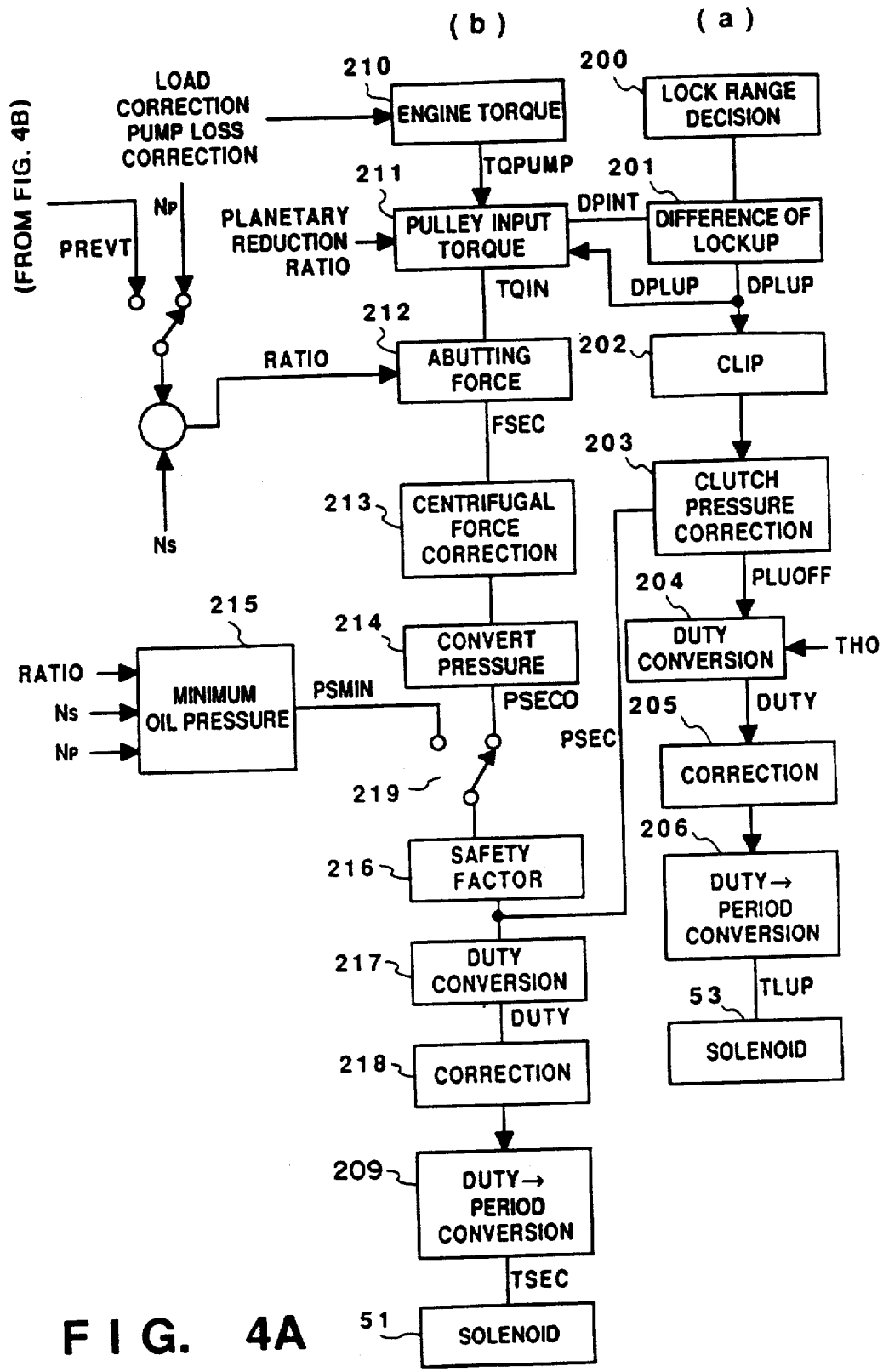
Figure 4B:
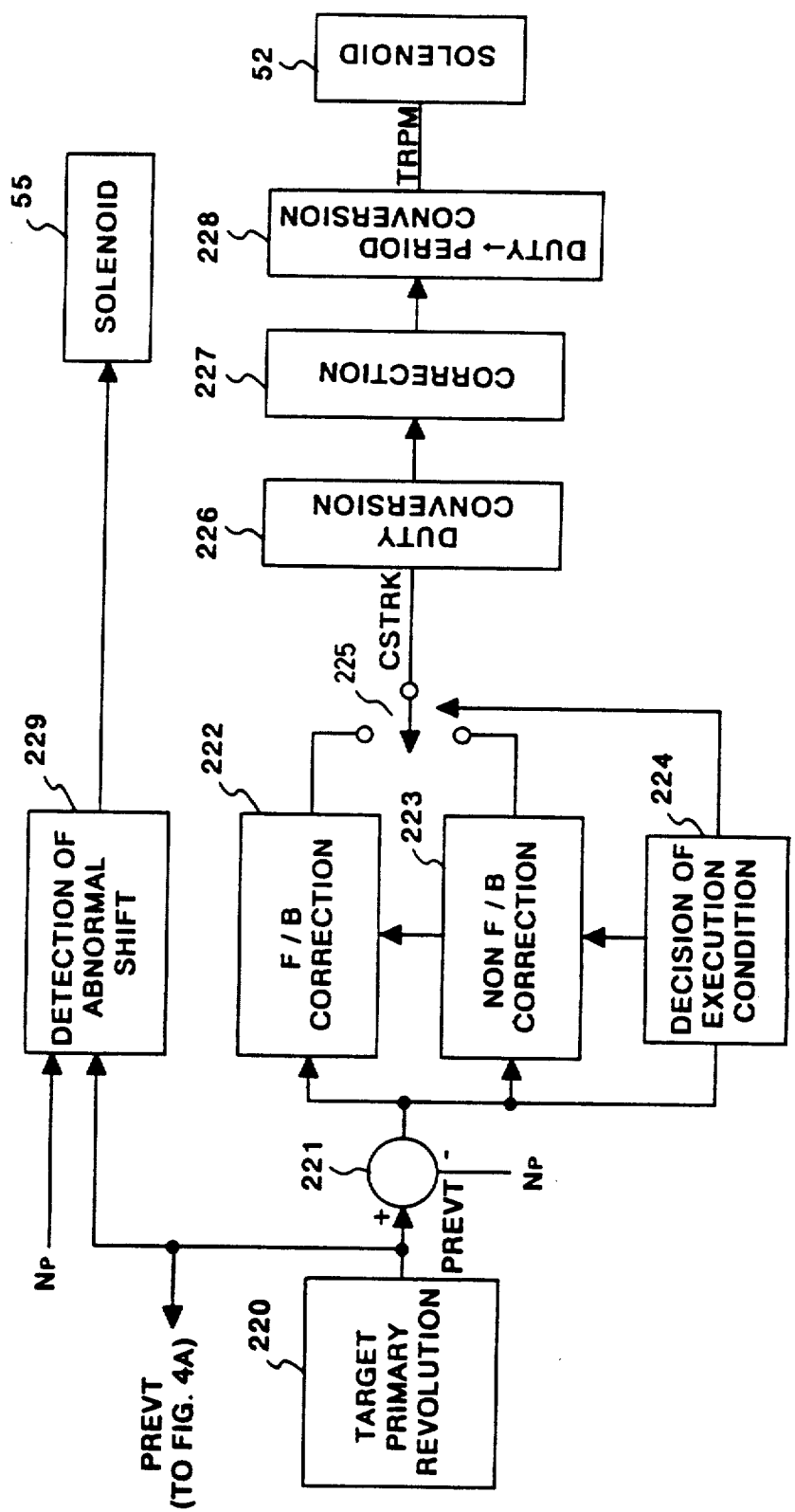
Figure 7B:
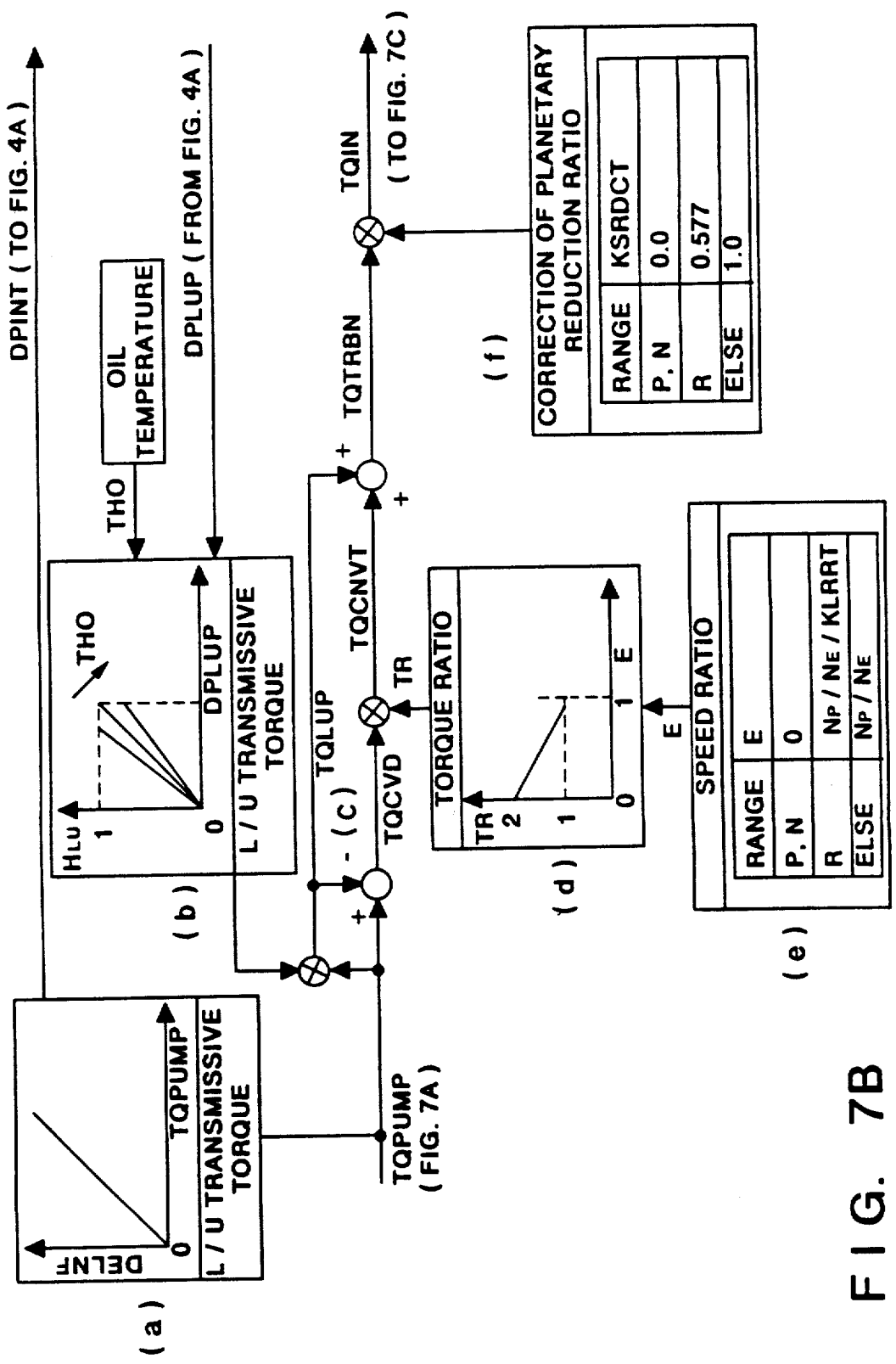
Figure 7C:
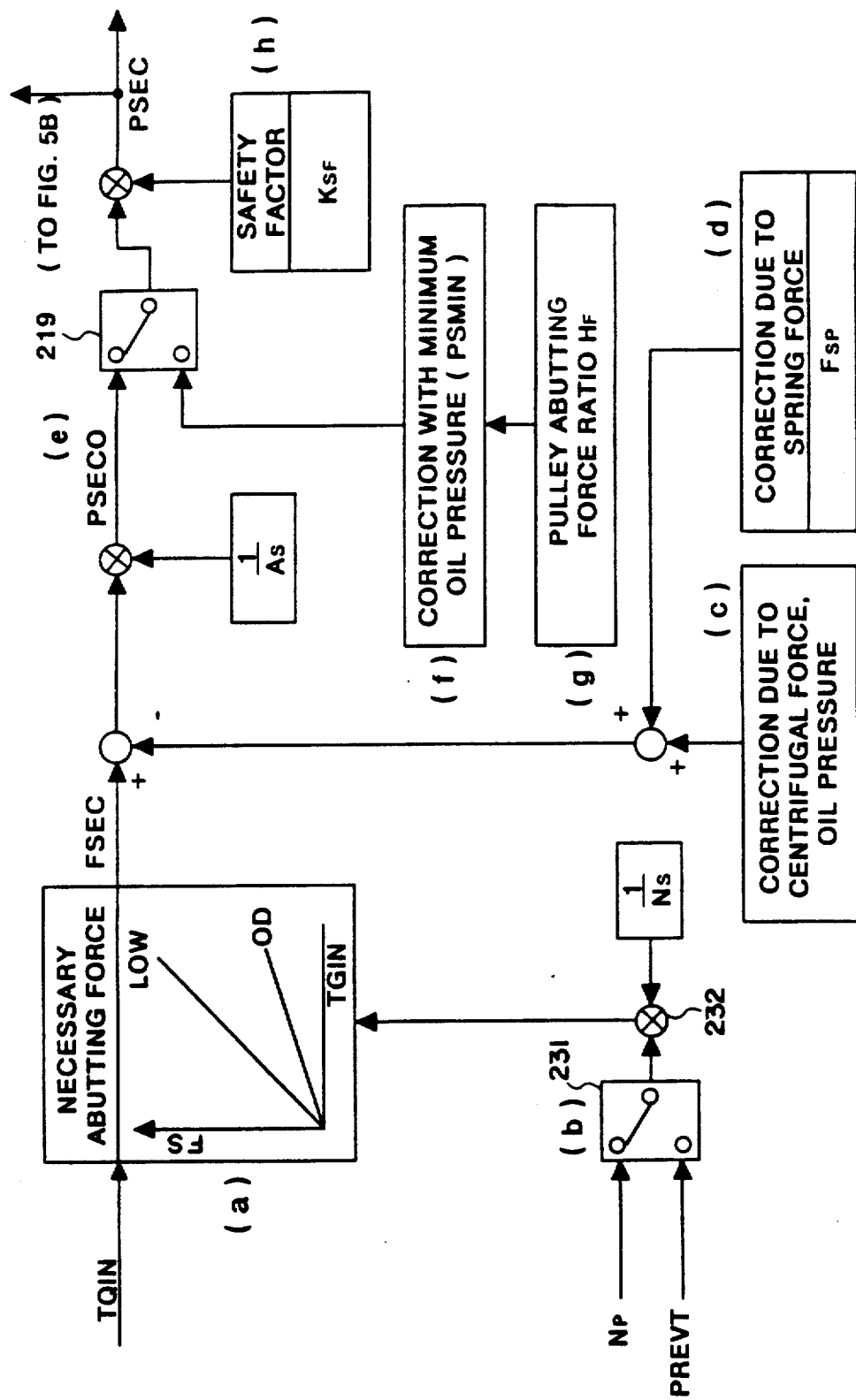
Figure 9:
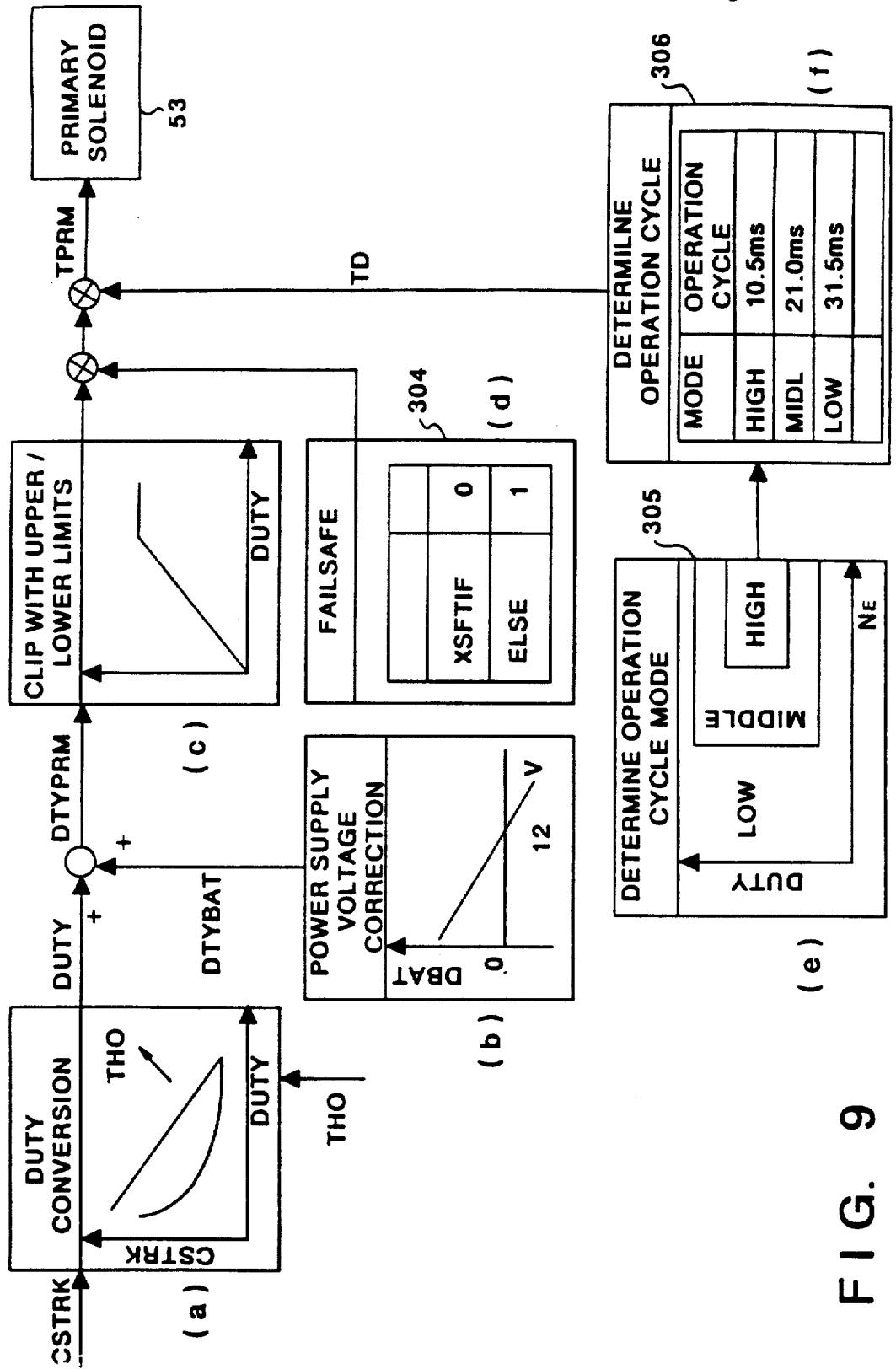
Figure 14:
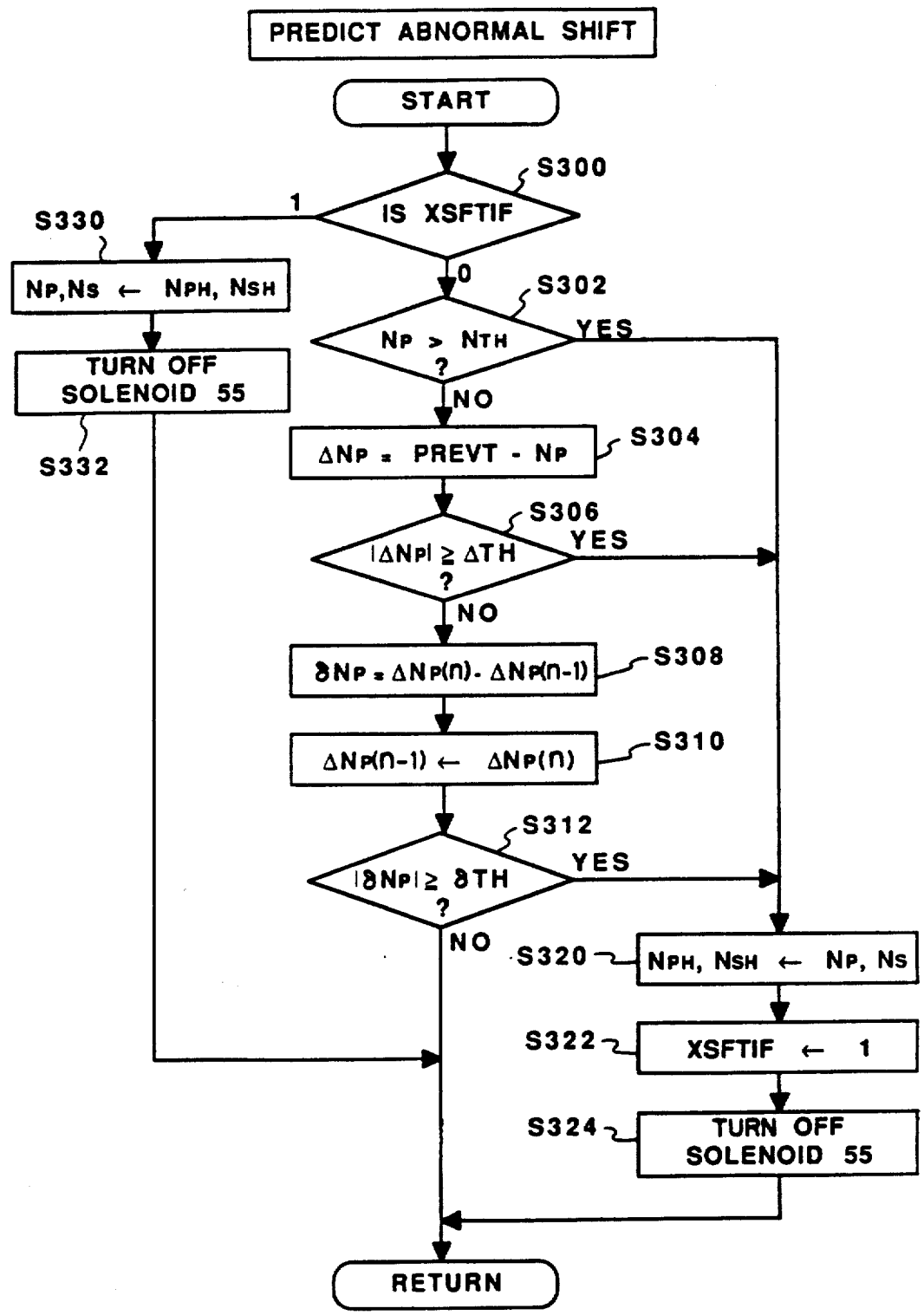

FIG. 17 illustrates an electric control circuit for the stepless transmission.

As described with reference to FIG. 16, according to the second embodiment, the excessive rotation of the engine is detected in accordance with the balance kept between the pitot pressure generated by the pitot pressure generation means 900 in accordance with the engine revolution and the spring 150b of the excessive rotation detection valve 150. If it has been detected that the engine revolution is too fast, the valve 150 is closed so as to fix the change ratio realized by the change ratio control valve 850. As a result, the further rise in the engine revolution is prevented. On the other hand, according to the first embodiment, the excessive rise in the engine revolution is electronically/electrically detected so as to electrically operate the change ratio fixing valve via the duty solenoid 55. As a result, the change ratio is fixed. As described above, according to the second embodiment, the overall portion of the control for preventing the excessive rotation of the engine is performed by the hydraulic pressure control system.

Referring to FIG. 17, a control unit 140 including a microcomputer or the like is arranged to receive a shift position signal supplied from a shift position sensor 131 which detects the shift position (D, 1, 2, R, N and P)

selected by an operation of a driver. The control unit 140 further receives a primary pulley revolution signal supplied from a primary revolution sensor 133 which detects revolution $N_P$ of the primary shaft 22. The control unit 140 further receives a secondary pulley revolution signal supplied from a secondary revolution sensor 134 which detects revolution $N_S$ of the secondary shaft 32. The control unit 140 further receives a throttle valve opening degree signal supplied from a throttle opening degree sensor 132 which detects throttle valve opening degree TVO of the engine A. The control unit 140 further receives an engine revolution signal supplied from an engine revolution sensor 135 which detects revolution $N_E$ of the engine A. The control unit 140 further receives a turbine revolution signal supplied from a turbine revolution sensor 136 which detects revolution $N_T$ of the turbine shaft 2 of the torque converter B.

The control unit 140 controls the duty of each of the first to third duty solenoid valves 910 through 930 in response to the above-described input signal. As a result, the level of the control pressure acting on the line pressure adjustment valve 820, the operating pressure adjustment valve 880, the change ratio control valve 850 and the lockup control valve 890 is controlled.

Therefore, according to the second embodiment, in the case where a driver operates the acceleration pedal by a considerably large degree so as to realize the kickdown state during the operation of the engine A, the engine revolution is rapidly raised due to the above-described operation of the acceleration pedal. At this time, the change ratio control valve 850 causes the hydraulic cylinder 25 of the primary pulley 21 to communicate with the drain port 854 so as to discharge the oil in the hydraulic cylinder 25 via the drain passage 120 and the pressure maintaining valve 980 in order to make the change ratio of the transmission mechanism Z to be on the maximum side (the speed reduction side). At this time, the engine excessive rotation prevention valve 150 maintains the drain passage 120 at the opened status since the pitot pressure is lower than the urging force of the spring 150b when the engine revolution is slower than the predetermined revolution which is slightly lower than the excessive revolution.

However, the engine revolution can be further raised to exceed the above-described predetermined revolution. That is, the change ratio control valve 850 involves the response delay of the control system and the response delay of the hydraulic system. In this state, the change ratio control valve 850 is causing the hydraulic cylinder 25 of the primary pulley 21 to communicate with the drain port 854. When the pitot pressure is about to exceed the urging force of the spring 150b of the engine excessive rotation prevention valve 150 due to the rise in the engine revolution, the spool 150a of the engine excessive rotation prevention valve 150 is moved to the right when viewed in FIG. 16, causing the drain passage 120 to be closed. As a result, the discharge of oil from the hydraulic cylinder 25 of the primary pulley 21 is forcibly stopped. Therefore, the effective radius of the primary pulley 21 is fixed to the effective radius at that time, causing the further enlargement of the change ratio to be stopped. As a result, the engine revolution cannot be raised over the above-described predetermined revolution. Consequently, the excessive rotation of the engine A can assuredly be prevented.

EFFECTS OF THE EMBODIMENTS

According to the above-described two embodiments, the following effects can be obtained.

EFFECTS OF THE FIRST EMBODIMENT (1) The generation of the abnormal gear change is determined in accordance with the pulley revolution, the deviation from the target revolution, or the change rate of the deviation. That is, the generation of the abnormal status can be previously detected. If the previous status of the abnormal gear change is detected, the change ratio fixing valve 44 is turned off and the primary chamber 27 is closed. That is, the level of hydraulic pressure in the primary chamber is made to be a constant level, causing the change ratio to be fixed to the value when the failure has been detected regardless of the status of the gear change control valve 43. Therefore, in an accident, for example, in which a valve has become sticky, the generation of the abnormal gear change status can be prevented.

(2) The change ratio fixing valve 44 is designed so as to realize the safety status against a failure of the solenoid which controls the change ratio fixing valve 44. That is, the valve 44 is always urged by the spring (omitted from illustration) so as to close the line 107 which communicates with the primary chamber 27 when the wire in the solenoid 55 is broken.

(3) The excessive rotation prevention valve 150 according to the second embodiment corresponds to the change ratio fixing valve 44 according to the first embodiment. However, the change ratio fixing valve 44 according to the first embodiment is disposed upstream from the change ratio control valve 43. On the other hand, the engine excessive rotation prevention valve 150 according to the second embodiment is disposed in the downstream in the drain passage of the change ratio control valve 850. That is, according to the first embodiment, the change ratio can be assuredly fixed in comparison to the second embodiment since no element is disposed between the fixing valve 44 and the hydraulic cylinder 25.

EFFECTS OF SECOND EMBODIMENT (1) In the control apparatus according to the second embodiment, the engine revolution is converted into the pitot pressure with which the engine revolution is then detected. The pitot pressure is introduced into the engine excessive rotation prevention valve 150 disposed in the lower stream of the drain passage for the change ratio control valve 850. In the valve 150, when the engine revolution reaches a revolution which can be determined to be excessive rotation, the corresponding pitot pressure overcomes the urging force of the spring. As a result, the spool is moved, causing the valve 150 to close the drain passage for the change ratio control valve 850. Therefore, the cylinder chamber 25 of the primary pulley is closed, causing the change ratio to be fixed to a speed at which the engine does not reach the excessive rotation. That is, the excessive rotation of the engine can be prevented.

(2) According to the second embodiment, the control for preventing the excessive rotation of the engine is, different from the first embodiment, performed by a hydraulic pressure system. Although the accuracy is inferior to the electronic control according to the first embodiment, an improved control accuracy can be obtained.

MODIFICATION

A variety of changes and modifications can be made within the spirit and scope of the present invention.

For example, according to the first embodiment, the detection of the abnormal gear change is made in accordance with revolution speed $N_P$ of the primary pulley, deviation $\Delta N_P$ of $N_P$ from target speed PREVT or time deviation of $\Delta N_P$. The present invention is not limited to the above-described aspects.

According to the control apparatus according to the second embodiment, the pitot pressure which is in proportion to the engine revolution is utilized to operate the engine excessive rotation prevention valve 150. The present invention is not limited to this. Another structure may, of course, be employed which is arranged in a manner such that the engine revolution is detected and the engine excessive rotation prevention valve is electrically operated when the thus detected engine revolution reaches the revolution which is slightly lower than the excessive rotation of the engine so as to close the drain passage 120.

The present invention is not limited to the above embodiment and various changes and modifications can be made within the spirit and scope of the present invention. Therefore, to apprise the public of the scope of the present invention the following claims are made.

What is claimed is:

1. A control apparatus for controlling a stepless transmission in which a V-belt is arranged between a primary pulley and a secondary pulley the effective radius of each of which is changed in accordance with the variation of the supplied hydraulic pressure, where torque is supplied to said primary pulley and speed is converted by means of said secondary pulley, said control apparatus comprising:
   a change ratio control valve for controlling hydraulic pressure to be supplied to either of operation chambers for said two pulleys in accordance with change ratio;
   predicting means for predicting the generation of an abnormal gear change from the present gear change status; and
   change ratio fixing means for fixing said change ratio realized by said change ratio control valve to a fixed value when the generation of the abnormal gear change is predicted by said predicting means, wherein the change ratio fixing means includes a change ratio fixing valve, cooperating with said change ratio control valve, for fixing the change ratio realized by the change ratio control valve.

2. A control apparatus according to claim 1, wherein the hydraulic pressure level of said primary pulley is controlled by said change ratio control valve.

3. A control apparatus according to claim 2, wherein said
   change ratio fixing valve is disposed between said change ratio control valve and said operation chamber of said primary pulley and acts to fix the change ratio realized by said change ratio control valve by closing said operation chamber of the primary pulley; and
   wherein said change ratio fixing means further comprises control means for controlling the operation of said change ratio fixing valve in a manner such that, when a prediction is made that said change ratio fixing valve does not encounter the abnormal gear change, said control means allows said change ratio control valve and said operation chamber of the primary pulley to communicate with each other and when a prediction is made that the abnormal gear change takes place, said control means allows said change ratio control valve and said operation chamber of the primary pulley to be disconnected from each other.

4. A control apparatus according to claim 3, wherein said control means for performing a control in a manner such that said change ratio control valve and said operation chamber are disconnected to each other is a solenoid valve.

5. A control apparatus according to claim 4, wherein said change ratio fixing valve comprises:
   a spring;
   a spool urged by said spring; and
   a pilot chamber sectioned by said spool, whereby hydraulic pressure supplied from said solenoid valve is introduced into said pilot chamber so as to urge said spool against the force due to said spring.

6. A control apparatus according to claim 2, wherein said
   change ratio fixing valve is disposed in a drain passage for said change ratio control valve so as to open/close said drain passage; and
   wherein said change ratio fixing means further comprises control means for controlling the operation of said change ratio fixing valve in a manner such that, when prediction is made that said change ratio fixing valve does not encounter the abnormal gear change, said control means opens said drain passage and, when a prediction is made that the abnormal gear change takes place, said control means closes said drain passage.

7. A control apparatus according to claim 6, wherein said control means for controlling said change ratio fixing valve so as to close said drain passage comprises:
   means for generating pitot hydraulic pressure which corresponds to the engine revolution; and
   said change ratio fixing valve includes:
   a spring;
   a spool; and
   a pilot chamber sectioned by said spool, wherein said pilot hydraulic pressure is introduced into said pilot chamber in a manner such that said pitot hydraulic pressure pushes said spool against said spring.

8. A control apparatus according to claim 2, wherein said predicting means predicts the possibility of the generation of the abnormal gear change in accordance with revolution $N_p$ of a primary side pulley of said pair of pulleys.

9. A control apparatus according to claim 2, wherein said predicting means predicts the possibility of the generation of the abnormal gear change in accordance with a deviation of revolution $N_p$ of a primary side pulley of said pair of pulleys from a target revolution.

10. A control apparatus according to claim 2, wherein said predicting means predicts the possibility of the generation of the abnormal gear change in accordance with the time change of deviation of revolution $N_p$ of a primary side pulley of said pair of pulleys from a target revolution.

11. A control apparatus according to claim 2, wherein said change ratio control valve controls hydraulic pressure of a line which communicates with a hydraulic pressure operation chamber for the primary side pulley via said change ratio fixing valve; and said change ratio fixing valve is controlled by an ON/OFF type solenoid, wherein, when the change ratio is fixed, said solenoid is turned off so as to close a line which communicates with said hydraulic pressure operation chamber.

12. A control apparatus for controlling a stepless transmission in which a V-belt is arranged between a pressure-controlled primary pulley and a pressure-controlled secondary pulley, the effective radius of each of which is changed in accordance with variation of hydraulic pressure supplied to said primary pulley and/or said secondary pulley, the control apparatus comprising:

a change ratio control valve for controlling hydraulic pressure to be supplied to either of operation chambers for said primary and secondary pulleys in accordance with a desired change ratio;

predicting means for predicting the generation of an abnormal gear change from the present gear change status under different predetermined conditions; and change ratio fixing means for fixing said change ratio realized by said change ratio control valve to a fixed value when the generation of the abnormal gear change is predicted by said predicting means under the different predetermined conditions.

* * * * *

UNITED STATES PATENT AND TRADEMARK OFFICE
CERTIFICATE OF CORRECTION

PATENT NO. : 5,092,198

DATED : Mar. 3, 1992

INVENTOR(S) : Morishige et al

It is certified that error appears in the above-indentified patent and that said Letters Patent is hereby corrected as shown below:

The title page showing the illustrative figure should be deleted to be replaced with the attached title page.

Sheets 2, 4, 6, 7, 10, 11, 14, 19, 20 and 21, consisting of Figs. 2A, 3, 4A, 4B, 7B, 7C, 9, 14, 15, 16B, should be deleted to be replaced with the corrected Figs. 2A, 3, 4A, 4B, 7B, 7C, 9, 14, 15 and 16B, as shown on the attached pages.

Signed and Sealed this

Twenty-fifth Day of January, 1994

Attest:

BRUCE LEHMAN

Attesting Officer     Commissioner of Patents and Trademarks

United States Patent [19]

Morishige et al.

[11] Patent Number: 5,092,198

[45] Date of Patent: Mar. 3, 1992

[54] CONTROL APPARATUS FOR STEPLESS TRANSMISSION

[75] Inventors: Chitoshi Morishige; Tomoo Sawasaki, both of Hiroshima, Japan

[73] Assignee: Mazda Motor Corporation, Hiroshima, Japan

[21] Appl. No.: 631,291

[22] Filed: Dec. 19, 1990

[30] Foreign Application Priority Data

Dec. 19, 1989 [JP] Japan ............................... 1-329872
Jul. 5, 1990 [JP] Japan ............................... 2-176249

[51] Int. Cl.⁵ ..................... B60K 41/12; B60K 41/18
[52] U.S. Cl. .............................. 74/866; 74/867; 74/868; 364/424.1
[58] Field of Search .................... 74/866, 867, 868; 364/424.1

[56] References Cited

U.S. PATENT DOCUMENTS

| | | | |
|---|---|---|---|
| 4,736,655 | 4/1988 | Kumura et al. | 74/866 |
| 4,785,689 | 11/1988 | Tanaka et al. | 74/868 X |
| 4,811,224 | 3/1989 | Kuerschner et al. | 74/866 X |
| 4,846,021 | 7/1989 | Hamano et al. | 74/866 |
| 4,930,374 | 6/1990 | Simonyi et al. | 74/866 |
| 4,956,972 | 9/1990 | Sasajima et al. | 74/866 X |
| 4,995,283 | 2/1991 | Sawasaki et al. | 74/866 |
| 5,007,147 | 4/1991 | Imai et al. | 74/866 |

FOREIGN PATENT DOCUMENTS 62-4958 1/1987 Japan.
63-53356 3/1988 Japan.

OTHER PUBLICATIONS

U.S. patent application No. 07/466,231 to Morishige, filed Jan. 19, 1990.

Primary Examiner—Leslie A. Braun
Assistant Examiner—Daniel Wittels

[57] ABSTRACT

A control apparatus for a transmission apparatus which controls the change ratio by varying, by hydraulic pressure, the effective radius of a drive pulley (primary pulley) and that of a follower pulley (secondary pulley) with a belt arranged therebetween. The apparatus a change ratio control valve for controlling the change ratio and a change ratio fixing valve for forcibly fixing the change ratio if the engine is about to rotate excessively so that the excessive rotation of the engine is prevented.

12 Claims, 23 Drawing Sheets

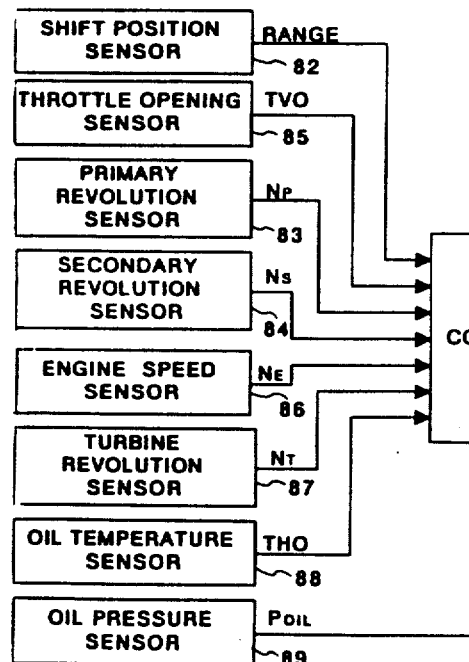
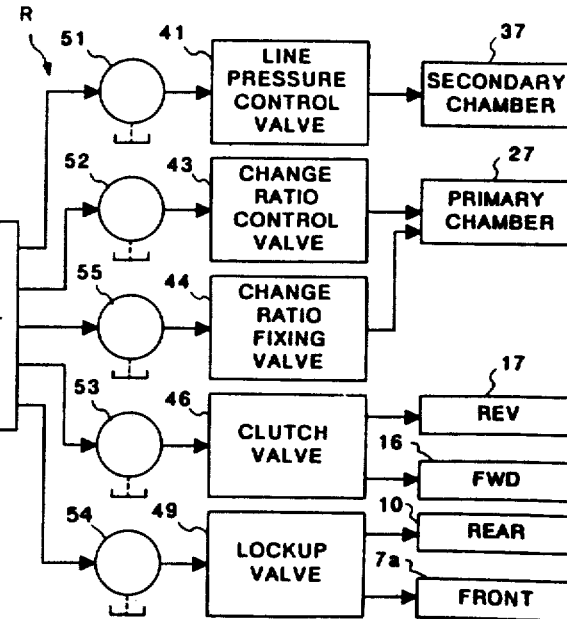

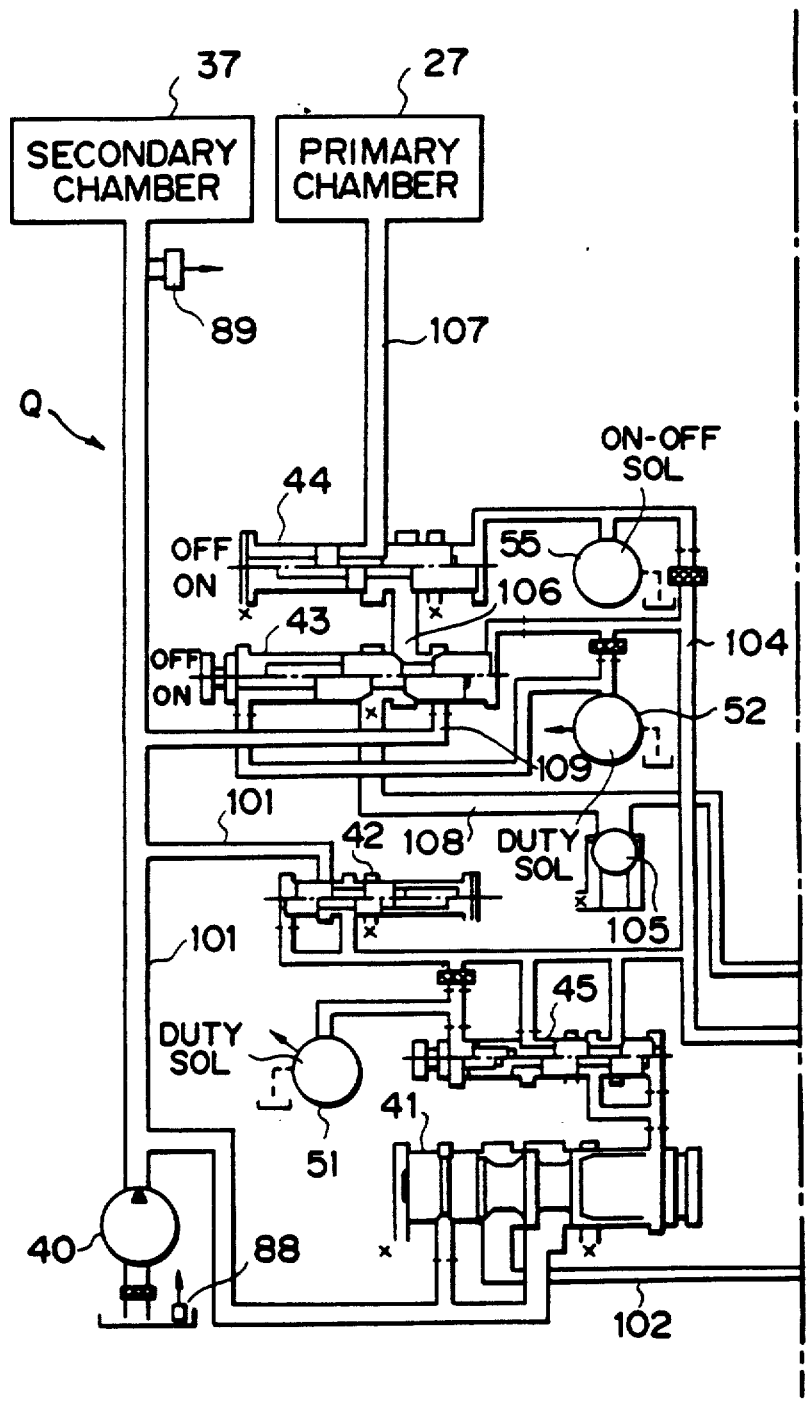
F I G. 2A

UNITED STATES PATENT AND TRADEMARK OFFICE
CERTIFICATE OF CORRECTION

PATENT NO. : 5,092,198

DATED : March 3, 1992

INVENTOR(S) : CHITOSHI MORISHIGE, et al.

It is certified that error appears in the above-identified patent and that said Letters Patent is hereby corrected as shown below:

| | | |
|---|---|---|
| Col. 5, | line 19, | "circuit" s/b --schematic--. |
| Col. 9, | line 59, | after "are" insert --schematic and--; |
| | line 60, | "which" s/b --that--. |
| Col. 10, | line 6, | "change ratio control" s/b --primary duty solenoid--; |
| | line 7, | delete "valve"; |
| | line 8, | "a clutch duty solenoid 53" s/b --an ON/OFF type solenoid 55--; |
| | line 51, | "27" s/b --44--. |
| Col. 12, | line 52, | "203" s/b --201--. |
| Col. 19, | line 16 | (after second equation in column), after "Then" insert --as shown in Fig. 7C(e),--; |
| | line 18, | delete "as show in Fig. 7C(e),"; |
| Col. 22 | line 16, | "$H_F,$" s/b --$H_F$--. |
| | line 58, | in title, "CHANCE" s/b --CHANGE--. |
| Col. 26, | line 68, | after "engine" insert --A--. |
| Col. 27, | line 15, | "822a" s/b --822a,--. |
| Col. 28, | line 63, | "1052" s/b --105a--. |
| Col. 29, | line 31, | "884" s/b --882--, and "883" s/b --884--. |
| Col. 32, | line 60, | delete second occurrence of "the". |
| Col. 33, | line 24, | "embodiment" s/b --embodiments--. |